United States Patent
Gao et al.

(10) Patent No.: US 11,088,746 B2
(45) Date of Patent: Aug. 10, 2021

(54) SIGNALING FOR MU INTERFERENCE MEASUREMENT WITH NZP CSI-RS

(71) Applicant: Telefonaktiebolaget LM Ericsson (publ), Stockholm (SE)

(72) Inventors: Shiwei Gao, Nepean (CA); Sebastian Faxér, Järfälla (SE); Siva Muruganathan, Stittsville (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/753,215

(22) PCT Filed: Oct. 2, 2018

(86) PCT No.: PCT/IB2018/057642
§ 371 (c)(1),
(2) Date: Apr. 2, 2020

(87) PCT Pub. No.: WO2019/069227
PCT Pub. Date: Apr. 11, 2019

(65) Prior Publication Data
US 2020/0322022 A1    Oct. 8, 2020

Related U.S. Application Data

(60) Provisional application No. 62/567,015, filed on Oct. 2, 2017.

(51) Int. Cl.
*H04W 4/00*    (2018.01)
*H04B 7/06*    (2006.01)
(Continued)

(52) U.S. Cl.
CPC ......... *H04B 7/0626* (2013.01); *H04B 7/0452* (2013.01); *H04B 17/336* (2015.01);
(Continued)

(58) Field of Classification Search
CPC .. H04B 7/0626; H04B 17/336; H04B 7/0452; H04B 7/0619; H04B 17/345;
(Continued)

(56) References Cited

U.S. PATENT DOCUMENTS

2015/0171948 A1   6/2015   Xiao et al.
2015/0263796 A1   9/2015   Nam et al.
(Continued)

FOREIGN PATENT DOCUMENTS

| RU | 2622864 C2 | 6/2017 |
| WO | 2012109037 A2 | 8/2012 |
| WO | 2016056980 A1 | 4/2016 |

OTHER PUBLICATIONS

Ericsson, "On CSI acquisition and reporting (R1-1708685)", May 15-19, 2017 (From Applicant's IDS filed on Apr. 2, 2020) (Year: 2017).*

(Continued)

*Primary Examiner* — Mang Hang Yeung
(74) *Attorney, Agent, or Firm* — Withrow & Terranova, PLLC

(57) ABSTRACT

Systems and methods are disclosed herein for determining Non-Zero Power (NZP) Channel State Information Reference Signal (CSI-RS) resources to be used for channel and interference measurement. In some embodiments, a method performed by a wireless device comprises receiving, from a network node, a semi-static indication of one or more first sets of NZP CSI-RS resources for channel measurement and a semi-static indication of one or more second sets of NZP CSI-RS resources for interference measurement. The method further comprises receiving, from the network node, one or more dynamic indications that indicate a first set of NZP CSI-RS resources from the one or more first sets of NZP CSI-RS resources to be used by the wireless device for channel measurement and a second set of NZP CSI-RS (Continued)

resources from the one or more second sets of NZP CSI-RS resources to be used by the wireless device for interference measurement.

13 Claims, 30 Drawing Sheets

(51) Int. Cl.
| | | |
|---|---|---|
| *H04B 17/336* | (2015.01) | |
| *H04B 7/0452* | (2017.01) | |
| *H04L 5/00* | (2006.01) | |
| *H04W 24/08* | (2009.01) | |

(52) U.S. Cl.
CPC .......... *H04L 5/0035* (2013.01); *H04L 5/0051* (2013.01); *H04W 24/08* (2013.01)

(58) Field of Classification Search
CPC ... H04L 5/0035; H04L 5/0051; H04L 5/0048; H04W 24/08
USPC .......................................................... 370/329
See application file for complete search history.

(56) References Cited

U.S. PATENT DOCUMENTS

| 2016/0149679 A1 | 5/2016 | Frenne et al. | |
|---|---|---|---|
| 2018/0076873 A1* | 3/2018 | Xiao | H04B 17/309 |

OTHER PUBLICATIONS

Author Unknown, "Technical Specification Group Radio Access Network; NR; Physical layer procedures for data (Release 15)," Technical Specification 38.214, Version 1.0.0, 3GPP Organizational Partners, Sep. 2017, 32 pages.
Author Unknown, "Technical Specification Group Radio Access Network; NR; Physical layer procedures for data (Release 15)," Technical Specification 38.214, Version 15.1.0, 3GPP Organizational Partners, Mar. 2018, 77 pages.
Author Unknown, "Technical Specification Group Radio Access Network; NR; Radio Resource Control (RRC); Protocol specification (Release 15)," Technical Specification 38.331, Version 0.1.0, 3GPP Organizational Partners, Oct. 2017, 42 pages.
Author Unknown, "Technical Specification Group Radio Access Network; NR; Radio Resource Control (RRC) protocol specification (Release 15)," Technical Specification 38.331, Version 15.1.0, 3GPP Organizational Partners, Mar. 2018, 268 pages.
Ericsson, "R1-1708685: On CSI acquisition and reporting," Third Generation Partnership Project (3GPP), TSG-RAN WG1 #89, May 15-19, 2017, 5 pages, Hangzhou, China.
Ericsson, "R1-1711025: On CSI acquisition and Reporting," Third Generation Partnership Project (3GPP), TSG-RAN WG1 #89ah-NR, Jun. 27-30, 2017, 7 pages, Qingdao, China.
Ericsson, "R1-1718431: On CSI measurement," Third Generation Partnership Project (3GPP), TSG-RAN WG1 #90bis, Oct. 9-13, 2017, 12 pages, Prague, Czech Republic.
Ericsson, "R1-1718440: Further details on measurement restriction configuration," Third Generation Partnership Project (3GPP), TSG-RAN WG1 #90bis, Oct. 9-13, 2017, 6 pages, Prague, Czech Republic.
LG Electronics, et al., "R1-1716902: WF on remaining issues on ZP CSI-RS based IMR," Third Generation Partnership Project (3GPP), TSG RAN WG1 Meeting NR#3, Sep. 18-21, 2017, 4 slides, Nagoya, Japan.
International Search Report and Written Opinion for International Patent Application No. PCT/IB2018/057642, dated Jan. 21, 2019, 15 pages.
International Preliminary Report on Patentability for International Patent Application No. PCT/IB2018/057642, dated Sep. 4, 2019, 23 pages.
Author Unknown, "RAN1 Chairman's Notes (final)," Third Generation Partnership Project (3GPP), TSG RAN WG1 Meeting NR #3, Sep. 18-21, 2017, 63 pages, Nagoya, Japan.
Examination Report for European Patent Application No. 18792509.4, dated Feb. 3, 2021, 6 pages.
Huawei, et al., "R1-1712227: Channel and interference measurement for CSI acquisition," 3GPP TSG RAN WG1 Meeting #90, Aug. 21-25, 2017, Prague, Czech Republic, 9 pages.
Official Action for Russian Patent Application No. 2020115084, dated Apr. 30, 2021, 12 pages.
Ericsson, "R1-1716348: On interference measurement and CSI for reciprocity based operation," 3GPP TSG-RAN WG1 Ad Hoc #3, Sep. 18-21, 2017, Nagoya, Japan, 10 pages.
Ntt Docomo Inc., "R1-1716080: Views on CSI measurement for NR," 3GPP TSG RAN WG1 Meeting NR#3, Sep. 18-21, 2017, Nagoya, Japan, 20 pages.
Oppo, "R1-1718053: Discussion on CSI Measurement," 3GPP TSG RAN WG1 Meeting 90bis, Oct. 9-13, 2017, Prague, Czech Republic, 5 pages.
Qualcomm Incorporated, "R1-1716394: Details of CSI Measurement," 3GPP TSG RAN WG1 NR Ad-Hoc #3, Sep. 18-21, 2017, Nagoya, Japan, 5 pages.
Notice of Reasons for Refusal for Japanese Patent Application No. 2020-518808, dated May 21, 2020, 60 pages.

* cited by examiner

One CSI-RS Resource

UE1 (2 ports)
UE2 (1 port)
UE3 (1 port)
UE4 (4 ports)

One set containing CSI-RS Resources

UE1 (NZP CSI-RS resource 1: 2 ports)
UE2 (NZP CSI-RS resource 2: 1 port)
UE3 (NZP CSI-RS resource 3: 1 port)
UE4 (NZP CSI-RS resource 4: 4 ports)

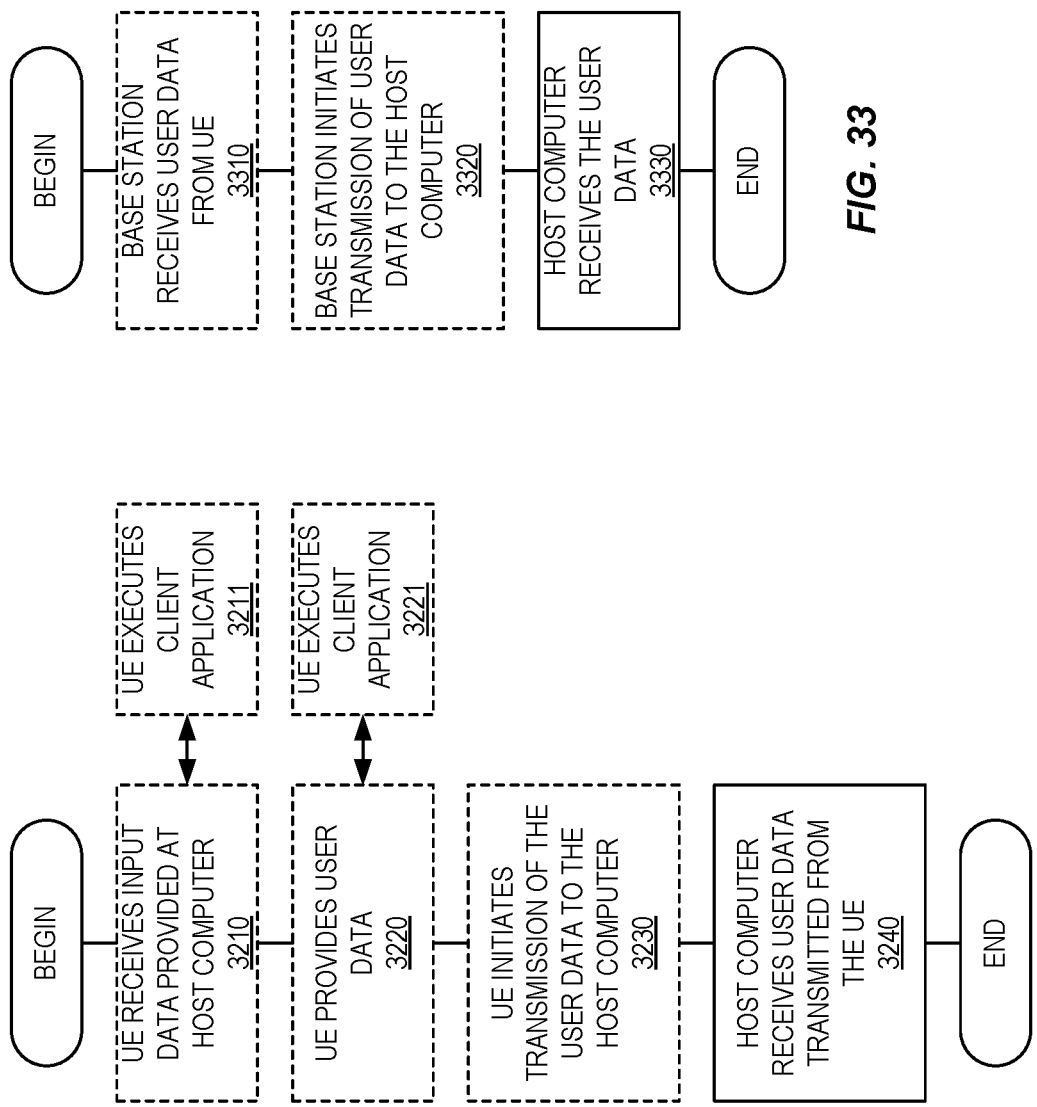

US 11,088,746 B2

SIGNALING FOR MU INTERFERENCE MEASUREMENT WITH NZP CSI-RS

RELATED APPLICATIONS

This application is a 35 U.S.C. § 371 national phase filing of International Application No. PCT/IB2018/057642, filed Oct. 2, 2018, which claims the benefit of provisional patent application Ser. No. 62/567,015, filed Oct. 2, 2017, the disclosures of which are hereby incorporated herein by reference in their entireties.

TECHNICAL FIELD

The present disclosure relates to Channel State Information Reference Signal (CSI-RS) measurements in a cellular communications network and more specifically relates to signaling of Non-Zero Power (NZP) CSI-RS resources to be used for channel measurement and Multiple User (MU) interference measurement.

BACKGROUND

The next generation mobile wireless communication system (Fifth Generation (5G)) or New Radio (NR) will support a diverse set of use cases and a diverse set of deployment scenarios. The latter includes deployment at both low frequencies, i.e., hundreds of Megahertz (MHz), similar to Long Term Evolution (LTE) today, and very high frequencies, i.e., millimeter (mm) wave in the tens of Gigahertz (GHz).

Similar to LTE, NR will use Orthogonal Frequency Division Multiplexing (OFDM) in the downlink from a network node, NR base station (which is referred to as a next generation Node B (gNB)), an evolved or enhanced Node B (eNB), or other base station to a User Equipment (UE). In the uplink from the UE to the network, both OFDM and Discrete Fourier Transform (DFT)-spread OFDM (DFT-S-OFDM), also known as Single Carrier Frequency Division Multiple Access (SC-FDMA) in LTE, will be supported.

The basic NR physical resource can thus be seen as a time-frequency grid as illustrated in FIG. 1, where a Resource Block (RB) with a 14-symbol slot is shown. A resource block corresponds to one slot in the time domain and 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f = (15 \times 2^\alpha)$ kHz where $\alpha$ is a non-negative integer. $\Delta f = 15$ kHz is the basic subcarrier spacing that is also used in LTE.

In the time domain, downlink and uplink transmissions in NR will be organized into equally-sized subframes of 1 ms each similar to LTE. A subframe is further divided into multiple slots of equal duration. The slot length at different subcarrier spacings is shown in Table 1. There is only one slot per subframe at $\Delta f = 15$ kHz and a slot consists of 14 OFDM symbols.

TABLE 1

Slot length at different numerologies.

| Numerology | Slot length | RB BW |
|---|---|---|
| 15 kHz | 1 ms | 180 kHz |
| 30 kHz | 0.5 ms | 360 kHz |
| 60 kHz | 0.25 ms | 720 kHz |
| 120 kHz | 125 μs | 1.44 MHz |
| 240 kHz | 62.5 μs | 2.88 MHz |

It is understood that data scheduling in NR can be in slot basis as in LTE. An example is shown in FIG. 2 with a 14-symbol slot, where the first two symbols contain control channel (Physical Downlink Control Channel (PDCCH)) and the rest contains data channel (Physical Downlink Shared Channel (PDSCH)). For convenience, one slot is referred to as a subframe throughout the following description.

Downlink transmissions are dynamically scheduled, i.e., in each subframe, the gNB transmits Downlink Control Information (DCI) about which UE data is to be transmitted to and which resource blocks in the current downlink subframe the data is transmitted on. This control signaling is typically transmitted in the first one or two OFDM symbols in each subframe in NR. The control information is carried on PDCCH and data is carried on PDSCH. A UE first detects and decodes PDCCH. If a PDCCH is decoded successfully, the UE then decodes the corresponding PDSCH based on the decoded control information in the PDCCH.

Uplink data transmissions are also dynamically scheduled using PDCCH. Similar to downlink, a UE first decodes uplink grants in PDCCH and then transmits data over the Physical Uplink Shared Channel (PUSCH) based on the decoded control information in the uplink grant such as modulation order, coding rate, uplink resource allocation, etc.

Spatial Multiplexing

Multi-antenna techniques can significantly increase the data rates and reliability of a wireless communication system. The performance is in particular improved if both the transmitter and the receiver are equipped with multiple antennas, which results in a Multiple Input Multiple Output (MIMO) communication channel. Such systems and/or related techniques are commonly referred to as MIMO.

A core component in LTE and NR is the support of MIMO antenna deployments and MIMO related techniques. Spatial multiplexing is one of the MIMO techniques used to achieve high data rates in favorable channel conditions. An illustration of the spatial multiplexing operation is provided in FIG. 3.

As seen, the information carrying symbol vector $s=[s_1, s_2, \ldots, s_r]^T$ is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a Precoder Matrix Indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency Resource Element (RE). The number of symbols r is typically adapted to suit the current channel properties.

The received signal at a UE with $N_R$ receive antennas at a certain RE n is given by $$y_n = H_n W s + e_n$$

where $y_n$ is a $N_R \times 1$ received signal vector, $H_n$ is a $N_R \times N_T$ channel matrix at the RE, and $e_n$ is a $N_R \times 1$ noise and interference vector received at the RE by the UE. The precoder W can be a wideband precoder, which is constant over frequency, or frequency selective, i.e. different over frequency.

The precoder matrix is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

The transmission rank, and thus the number of spatially multiplexed layers, is reflected in the number of columns of the precoder. The transmission rank is also dependent on the Signal to Interference plus Noise Ratio (SINR) observed at the UE. Typically, a higher SINR is required for transmissions with higher ranks. For efficient performance, it is important that a transmission rank that matches the channel properties as well as the interference is selected. The precoding matrix, the transmission rank, and the channel quality are part of Channel State Information (CSI), which is typically measured by a UE and fed back to a network node or gNB.

CSI Feedback

For CSI feedback, like in LTE, NR has adopted an implicit CSI mechanism where a UE feeds back the downlink CSI in terms of a transmission Rank Indicator (RI), a PMI, and one or two Channel Quality Indicator(s) (CQI). The CQI/RI/PMI report can be either wideband or subband based on configuration.

The RI corresponds to a recommended number of layers that are to be spatially multiplexed and thus transmitted in parallel over the effective channel; the PMI identifies a recommended precoder; the CQI represents a recommended modulation level (i.e. Quadrature Phase Shift Keying (QPSK), 16 Quadrature Amplitude Modulation (QAM), etc.) and coding rate for each transport block. NR supports transmission of one or two transport blocks to a UE in a slot. There is thus a relation between a CQI and a SINR of the spatial layers over which the transport block or blocks are transmitted.

Channel State Information Reference Signals (CSI-RS)

Similar to LTE, CSI-RS was introduced in NR for channel estimations in the downlink. A CSI-RS is transmitted on each transmit antenna (or antenna port) and is used by a UE to measure downlink channel associated with each of antenna ports. Up to 32 CSI-RSs are defined. The antenna ports are also referred to as CSI-RS ports. The supported number of antenna ports in NR are {1, 2, 4, 8, 12, 16, 24, 32}. By measuring the received CSI-RS, a UE can estimate the channel the CSI-RS is traversing, including the radio propagation channel and antenna gains. The CSI-RS is also referred to as Non-Zero Power (NZP) CSI-RS.

CSI-RSs are transmitted in certain REs and subframes. FIG. 4 shows one example of the REs used for CSI-RS with 12 antenna ports, where 1 RE per RB per port is shown. Note that it is also possible to have 12 port CSI-RS with 2 OFDM symbols.

In addition to NZP CSI-RS, Zero Power (ZP) CSI-RS was introduced in NR. The purpose was to indicate to a UE that the associated REs are muted at the gNB. If the ZP CSI-RS is allocated to be fully overlapping with NZP CSI-RS in an adjacent cell, it can be used to improve channel estimation by UEs in the adjacent cell since there is no interference created by this cell.

It was agreed that Interference Measurement Resource (IMR) will be used in NR for a UE to measure interference. ZP CSI-RS can be used as IMR. By measuring both the channel based on a NZP CSI-RS and the interference based on an IMR, a UE can estimate the effective channel and noise plus interference to determine the CSI, i.e. rank, precoding matrix, and the channel quality.

Non-Precoded Vs. Precoded or Beamformed CSI-RS

A beamformed (or precoded) CSI-RS concept was introduced in LTE Release 13 in which a CSI-RS is precoded and transmitted over more than one antenna port. This is in contrast with non-precoded CSI-RS in which each CSI-RS is transmitted on one antenna port. Beamformed CSI-RS can be used when the direction of a UE or UEs is roughly known so that CSI-RS can be transmitted in a narrow beam or beams to reach the UE or UEs. This can improve CSI-RS coverage with increased beamforming gain and also reduce CSI-RS resource and CSI feedback overhead. This beamformed or precoded CSI-RS is typically used in a UE specific manner and transmitted on an as needed basis, or aperiodically.

Multiple User MIMO (MU-MIMO)

When all the data layers are transmitted to one UE, it is referred to as Single User MIMO (SU-MIMO). On the other hand, when the data layers are transmitted to multiple UEs, it is referred to as MU-MIMO. MU-MIMO is possible when, for example, two UEs are in different areas of a cell such that they can be separated through different precoders (or beamforming) at the gNB. The two UEs may be served on the same time-frequency resources (i.e., Physical Resource Blocks (PRBs)) by using different precoders or beams.

MU-MIMO Interference

In a MU-MIMO scenario, in addition to interference from other cells (also referred to as inter-cell interference), interference among UEs participating in MU-MIMO will also be experienced by the UEs (also referred to as intra-cell interference or Multiple User (MU) interference). MU interference is more difficult to measure or estimate due to the dynamic nature of UEs being paired in MU-MIMO. Assuming there are K UEs sharing the same time-frequency resources in a data transmission, the received signal at the kth (k=1, 2, . . . , K) UE and at the ith RE can be expressed as:

$$y^k(i) = H^k(i) W^k(i) s^k(i) + H^k(i) \Sigma_{m \neq k}^{K} W^m(i) s^m(i) + e^k(i)$$

where $H^k(i)$, $W^k(i)$, and $s^k(i)$ are the channel matrix, the precoding matrix, and the data vector associated with the kth UE at the $i^{th}$ RE. $I_{MU}^k = H^k(i)\Sigma_{m \neq k}^K W^m(i)s^m(i)$ is the MU interference experienced at the kth UE, and $e^k(i)$ is the noise plus inter-cell interference received at the kth UE. Only $e^k(i)$ is typically considered in the existing CSI feedback assuming SU-MIMO at the UE side. Typically, an IMR based ZP CSI-RS resource is configured for a UE for inter-cell interference measurement.

MU Interference Measurement with NZP CSI-RS Based IMR

NZP CSI-RS based IMR has been proposed and agreed in NR for MU interference measurement. The typical use case is that the gNB already has some knowledge of the downlink channel for each UE that it serves through either CSI feedback or channel reciprocity and a MU-MIMO prescheduling is performed, i.e. a group of UEs are determined to be the candidates for a MU-MIMO transmission. The precoder for each of the UEs is known, but because MU interference is unknown, a further feedback on the rank and CQI based on the prescheduled MU-MIMO transmission are needed. For this purpose, MU interference is emulated by using precoded NZP CSI-RS, with each NZP CSI-RS port corresponding to one MU-MIMO layer.

There are two options being proposed in Third Generation Partnership Project (3GPP) Radio Access Network (RAN) 1:
Option 1: a single common NZP CSI-RS resource is configured for each UE in the prescheduled MU-MIMO (i.e., the NZP CSI-RS resource is common to the UEs prescheduled for MU-MIMO). In this case, a UE is also signaled with a subset of ports in the resource for channel measurement. An example is shown in FIG. 5.
Option 2: a common set of NZP CSI-RS resources is configured for each UE in the prescheduled MU-MIMO. In this option, a UE is also signaled with a NZP CSI-RS resource out of the common set for channel measurement. An example is shown in FIG. 6.

It has been agreed that in NR that a UE can be configured with N≥1 CSI reporting settings, M≥1 resource settings, and 1 CSI measurement setting, where the CSI measurement setting includes L≥1 links. Each of the L links corresponds to a CSI reporting setting and a resource setting.

At least the following configuration parameters are signaled via Radio Resource Control (RRC) at least for CSI acquisition:
N, M, and L—indicated either implicitly or explicitly
In each CSI reporting setting, at least: reported CSI parameter(s), CSI Type (I or II) if reported, codebook configuration including codebook subset restriction, time-domain behavior, frequency granularity for CQI and PMI, measurement restriction configurations
In each resource setting:
  A configuration of S≥1 CSI-RS resource set(s)
    Note: each set corresponds to different selections from a "pool" of all configured CSI-RS resources to the UE
  A configuration of $K_s \leq 1$ CSI-RS resources for each set s, including at least: mapping to REs, the number of ports, time-domain behavior, etc.
In each of the L links in CSI measurement setting: CSI reporting setting indication, resource setting indication, quantity to be measured (either channel or interference)
One CSI reporting setting can be linked with one or multiple resource settings
Multiple CSI reporting settings can be linked with the same resource setting
At least following are dynamically selected by L1 or L2 signaling, if applicable
One or multiple CSI reporting settings within the CSI measurement setting
One or multiple CSI-RS resource sets selected from at least one resource setting
One or multiple CSI-RS resources selected from at least one CSI-RS resource set.

There currently exist certain challenge(s). With NZP CSI-RS based IMR for MU interference measurement, a problem is how to signal the NZP CSI-RS resources for channel measurement and interference measurement to a UE effectively, with low signaling overhead.

SUMMARY

Systems and methods are disclosed herein for determining Non-Zero Power (NZP) Channel State Information Reference Signal (CSI-RS) resources to be used for channel measurements and interference measurement (e.g., Multiple User (MU) interference measurement). In some embodiments, a method performed by a wireless device for performing measurements in a wireless communication system comprises receiving, from a network node of the wireless communication system, a semi-static indication of one or more first sets of NZP CSI-RS resources for channel measurement and receiving, from the network node, a semi-static indication of one or more second sets of NZP CSI-RS resources for interference measurement. The method further comprises receiving, from the network node, one or more dynamic indications that indicate a first set of NZP CSI-RS resources from the one or more first sets of NZP CSI-RS resources to be used by the wireless device for channel measurement and a second set of NZP CSI-RS resources from the one or more second sets of NZP CSI resources to be used by the wireless device for interference measurement. In this manner, a NZP CSI-RS resource to be used for channel measurement and interference measurement can be efficiently signaled to and determined by the wireless device.

In some embodiments, the method further comprises performing channel measurement on the first set of NZP CSI-RS indicated by the one or more dynamic indications and performing interference measurement on the second set of NZP CSI resources indicated by the one or more dynamic indications.

In some embodiments, the one or more dynamic indications comprise a single dynamic indication that indicates both the first set of NZP CSI-RS resources from the one or more first sets of NZP CSI-RS resources to be used by the wireless device for channel measurement and the second set of NZP CSI-RS resources from the one or more second sets of NZP CSI resources to be used by the wireless device for interference measurement.

In some embodiments, the method further comprises reporting results of the channel measurement and the interference measurement to the network node.

In some embodiments, each NZP CSI-RS resource set in the one or more first NZP CSI-RS resource sets for channel measurement consists of a single NZP CSI-RS resource. In some other embodiments, each NZP CSI-RS resource in the one or more first NZP CSI-RS resource sets for channel measurement consists of one or multiple ports used for channel measurement purposes. In some other embodiments, each NZP CSI-RS resource in the one or more first NZP CSI-RS resource sets for channel measurement consists of one, two, or four ports used for channel measurement purposes.

In some embodiments, each NZP CSI-RS resource set in the one or more second NZP CSI-RS resource sets for interference measurement consists of a number, K, of NZP CSI-RS resources, wherein K is greater than or equal to 1.

Embodiments of a wireless device for performing measurements in a wireless communication system are also disclosed. In some embodiments, a wireless device for performing measurements in a wireless communication system is adapted to receive, from a network node of the wireless communication system, a semi-static indication of one or more first sets of NZP CSI-RS resources for channel measurement and receive, from the network node, a semi-static indication of one or more second sets of NZP CSI-RS resources for interference measurement. The wireless device is further adapted to receive, from the network node, one or more dynamic indications that indicate a first set of NZP CSI-RS resources from the one or more first sets of NZP CSI-RS resources to be used by the wireless device for channel measurement and a second set of NZP CSI-RS resources from the one or more second sets of NZP CSI-RS resources to be used by the wireless device for interference measurement.

In some embodiments, the wireless device is further adapted to perform channel measurement on the first set of NZP CSI-RS resources indicated by the one or more dynamic indications and perform interference measurement on the second set of NZP CSI resources indicated by the one or more dynamic indications.

In some embodiments, the one or more dynamic indications comprise a single dynamic indication that indicates both the first set of NZP CSI-RS resources from the one or more first sets of NZP CSI-RS resources to be used by the wireless device for channel measurement and the second set of NZP CSI-RS resources from the one or more second sets of NZP CSI resources to be used by the wireless device for interference measurement.

In some embodiments, the wireless device is further adapted to report Channel State Information (CSI) results based on the channel measurement and the interference measurement to the network node.

In some embodiments, a wireless device for performing measurements in a wireless communication system comprises an interface and processing circuitry whereby the wireless device is operable to receive, from a network node of the wireless communication system, a semi-static indication of one or more first sets of NZP CSI-RS resources for channel measurement; receive, from the network node, a semi-static indication of one or more second sets of NZP CSI-RS resources for interference measurement; and receive, from the network node, one or more dynamic indications that indicate a first set of NZP CSI-RS resources from the one or more first sets of NZP CSI-RS resources to be used by the wireless device for channel measurement and a second set of NZP CSI-RS resources from the one or more second sets of NZP CSI resources to be used by the wireless device for interference measurement.

Embodiments of a method performed by a network node are also disclosed. In some embodiments, a method performed by a network node for configuring a wireless device to perform measurements in a wireless communication system comprises sending, to a wireless device, a semi-static indication of one or more first sets of NZP CSI-RS resources for channel measurement and sending, to the wireless device, a semi-static indication of one or more second sets of NZP CSI-RS resources for interference measurement. The method further comprises sending, to the wireless device, one or more dynamic indications that indicate a first set of NZP CSI-RS resources from the one or more first sets of NZP CSI-RS resources to be used by the wireless device for channel measurement and a second set of NZP CSI-RS resources from the one or more second sets of NZP CSI-RS resources to be used by the wireless device for interference measurement.

In some embodiments, the method further comprises receiving, from the wireless device, results of channel measurement on the first set of NZP CSI-RS resources and interference measurement on the second set of NZP CSI-RS resources.

In some embodiments, the one or more dynamic indications comprise a single dynamic indication that indicates both the first set of NZP CSI-RS resources from the one or more first sets of NZP CSI-RS resources to be used by the wireless device for channel measurement and the second set of NZP CSI-RS resources from the one or more second sets of NZP CSI-RS resources to be used by the wireless device for interference measurement.

Embodiments of a network node are also disclosed. In some embodiments, a network node for configuring a wireless device to perform measurements in a wireless communication system is adapted to send, to a wireless device, a semi-static indication of one or more first sets of NZP CSI-RS resources for channel measurement and send, to a wireless device, a semi-static indication of one or more second sets of NZP CSI-RS resources for interference measurement. The network node is further adapted to send, to a wireless device, one or more dynamic indications that indicate a first set of NZP CSI-RS resources from the one or more first sets of NZP CSI-RS resources to be used by the wireless device for channel measurement and a second set of NZP CSI-RS resources from the one or more second sets of NZP CSI-RS resources to be used by the wireless device for interference measurement.

In some embodiments, the network node is further adapted to receive, from the wireless device, results of channel measurement on the first set of NZP CSI-RS resources and interference measurement on the second set of NZP CSI-RS resources.

In some embodiments, the one or more dynamic indications comprise a single dynamic indication that indicates both the first set of NZP CSI-RS resources from the one or more first sets of NZP CSI-RS resources to be used by the wireless device for channel measurement and the second set of NZP CSI-RS resources from the one or more second sets of NZP CSI-RS resources to be used by the wireless device for interference measurement.

In some embodiments, a network node for configuring a wireless device to perform measurements in a wireless communication system comprises an interface and processing circuitry whereby the network node is operable to send, to a wireless device, a semi-static indication of one or more first sets of NZP CSI-RS resources for channel measurement; send, to a wireless device, a semi-static indication of one or more second sets of NZP CSI-RS resources for interference measurement; and send, to a wireless device, one or more dynamic indications that indicate a first set of NZP CSI-RS resources from the one or more first sets of NZP CSI-RS resources to be used by the wireless device for channel measurement and a second set of NZP CSI-RS resources from the one or more second sets of NZP CSI-RS resources to be used by the wireless device for interference measurement.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 32 is a flow chart that illustrates methods implemented in a communication system including a host computer, a base station, and a UE in accordance with some embodiments of the present disclosure;

FIG. 33 is a flow chart that illustrates methods implemented in a communication system including a host computer, a base station, and a UE in accordance with some embodiments of the present disclosure.

DETAILED DESCRIPTION

Figure 1:
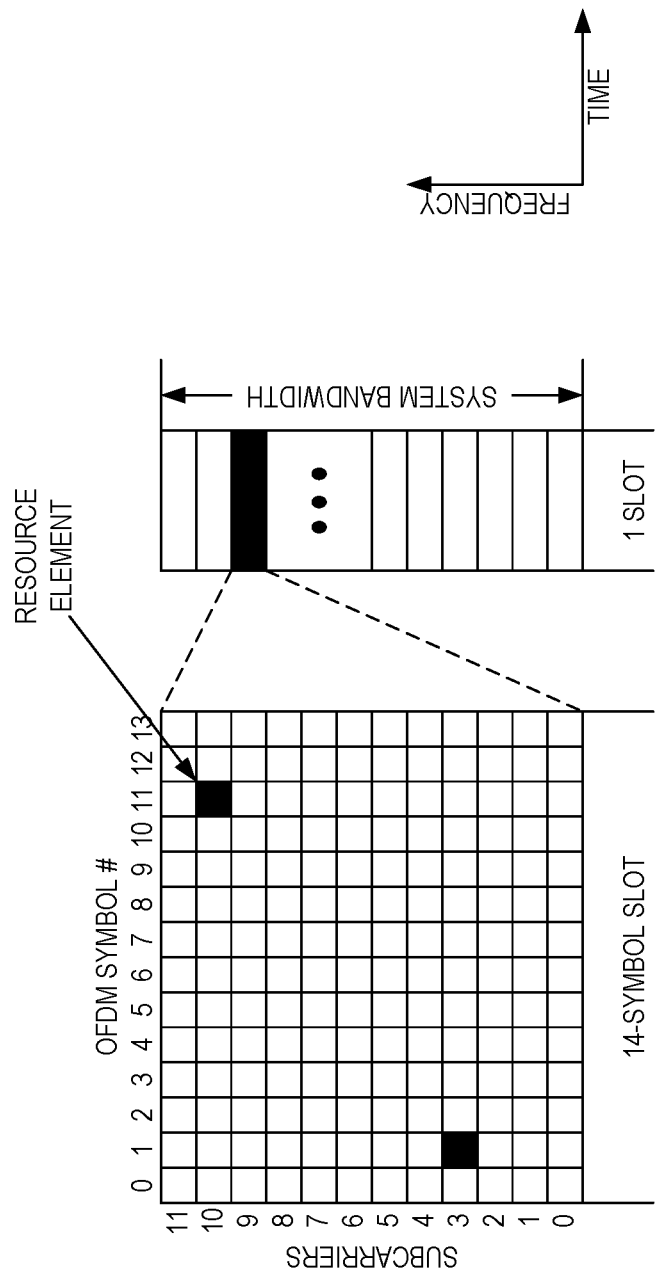
FIG. 1 illustrates the basic New Radio (NR) physical resource.
Figure 2:
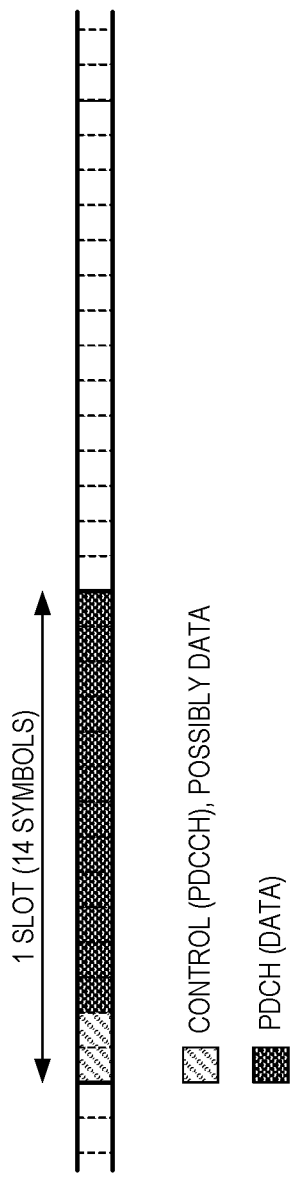
FIG. 2 illustrates the NR time-domain structure with 15 kilohertz (kHz) subcarrier spacing.
Figure 3:
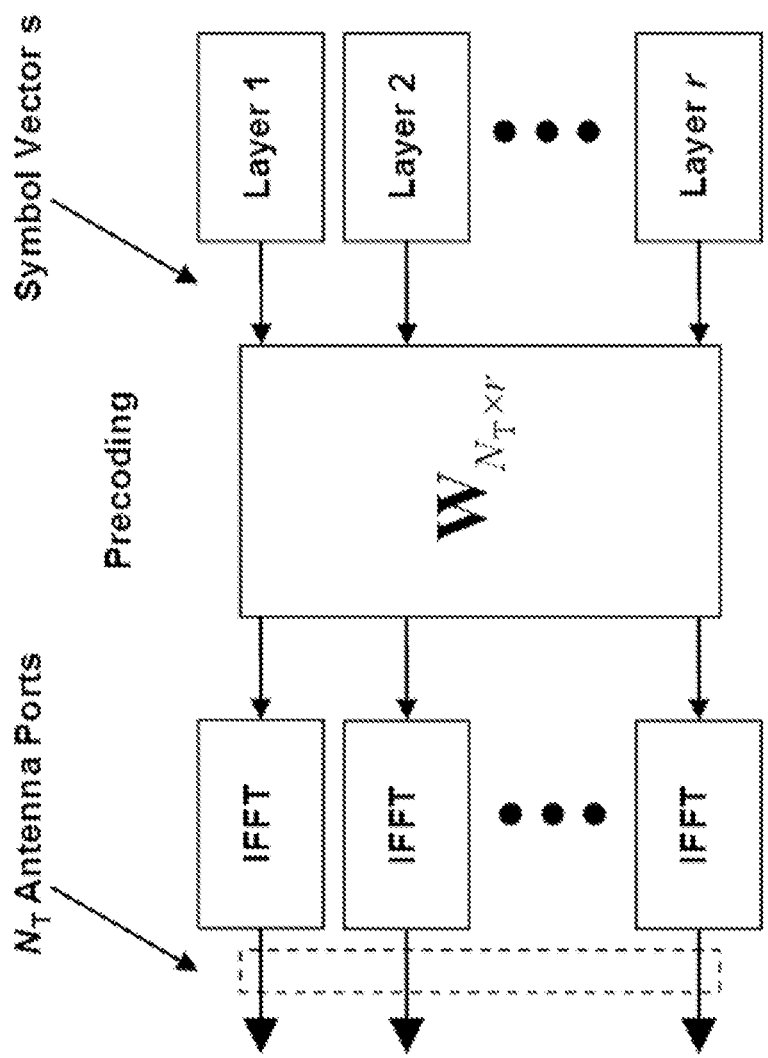
FIG. 3 illustrates a transmission structure of precoded spatial multiplexing mode in Long Term Evolution (LTE)
Figure 4:
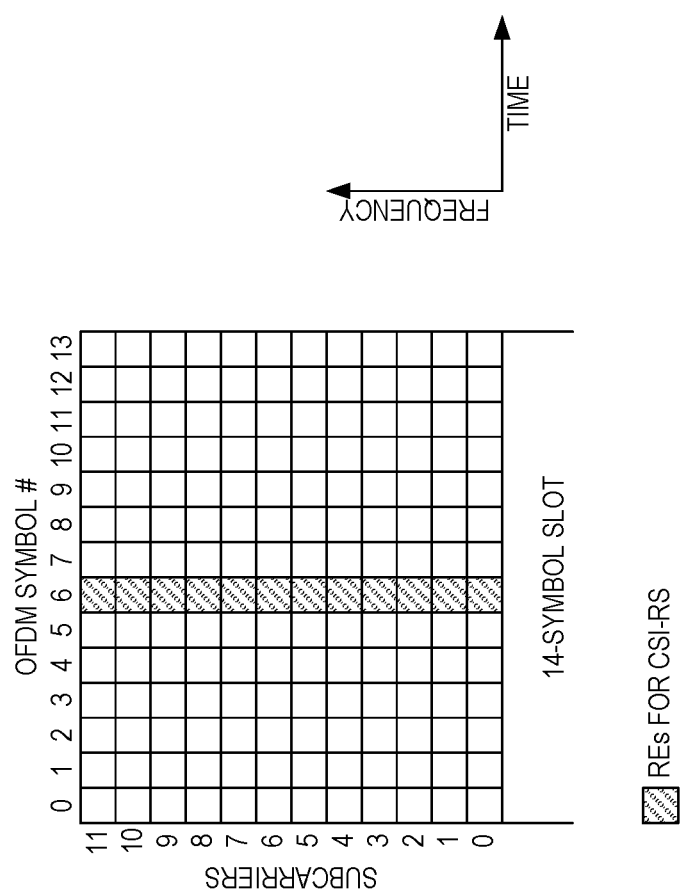
FIG. 4 illustrates an example Resource Element (RE) allocation for 12-port Channel State Information Reference Signal (CSI-RS) in NR.
Figure 5:
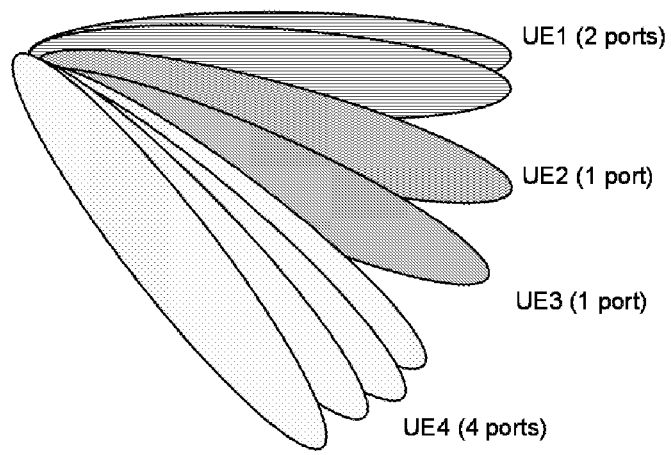
FIG. 5 illustrates an example of option 1 being proposed in Third Generation Partnership Project (3GPP) Working Group (WG) Radio Access Network (RAN) 1 with a single Non-Zero Power (NZP) CSI-RS resource.
Figure 6:
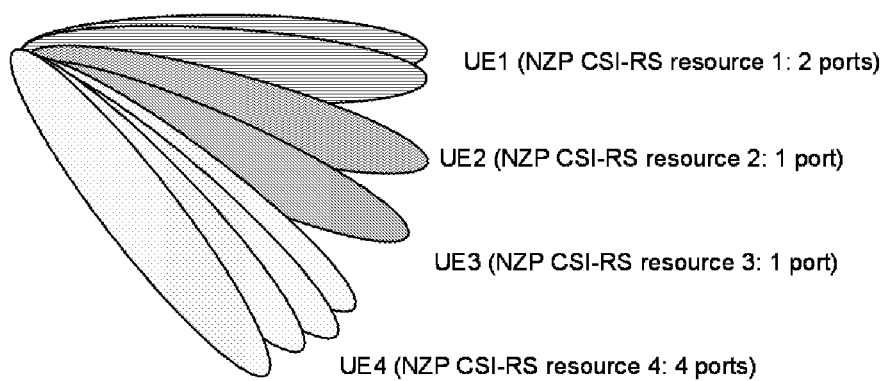
FIG. 6 illustrates an example of option 2 being proposed in 3GPP WG RAN1 with a CSI-RS resource set containing multiple NZP CSI-RS resources.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, and the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Note that although terminology from Third Generation Partnership Project (3GPP) Long Term Evolution (LTE) and New Radio (NR) has been used in this disclosure to exemplify the some embodiments of the disclosure, this should not be seen as limiting the scope of the some embodiments of the disclosure to only the aforementioned system. Other wireless systems may also benefit from exploiting the ideas covered within this disclosure.

Also note that terminology such as evolved or enhanced Node B (eNB)/New Radio Base Station (gNB) and User Equipment (UE) should be considering non-limiting and does in particular not imply a certain hierarchical relation between the two; in general "eNodeB" could be considered as device 1 and "UE" device 2, and these two devices communicate with each other over some radio channel. Herein, we also focus on wireless transmissions in the downlink, but the embodiments of the disclosure are equally applicable in the uplink.

There currently exist certain challenge(s). With Non-Zero Power (NZP) Channel State Information Reference Signal (CSI-RS) based Interference Measurement Resource (IMR) for Multiple User (MU) interference measurement, a problem is how to signal the NZP CSI-RS resources for channel measurement and interference measurement to a UE effectively, with low signaling overhead.

Certain aspects of the present disclosure and their embodiments may provide solutions to these or other challenges. In some embodiments, a network node (e.g., a base station such as e.g., a gNB) dynamically signals only the ports for channel measurement to a UE. The network node may also explicitly signal the ports for MU interference measurement to the UE. Alternatively, the ports for MU interference measurement may be implicitly signaled to the UE by the network node (e.g., the UE assumes that the complement ports (i.e., the ports other than the ones for channel measurement) are for MU interference measurement). Thus, in some embodiments, the ports for MU interference measurement are not dynamically signaled (explicitly).

In some other embodiments, a resource set is configured, where the resource set is of up to, e.g., six NZP CSI-RS resources, each with, e.g., two ports. A UE is dynamically signaled with a NZP CSI-RS resource for channel measurement and a NZP CSI-RS resource for MU measurement. Alternatively, the NZP CSI-RS resource for MU measurement may be implicitly signaled (e.g., the UE assumes the rest of the NZP CSI-RS resources in the resource set are for MU interference measurement).

Certain embodiments may provide one or more of the following technical advantage(s). Embodiments of the present disclosure enable efficient signaling of NZP CSI-RS resources for channel measurement and MU interference measurement. In some embodiments, there is no explicit signaling of the ports for NZP CSI-RS resources for MU interference measurement and thus signaling overhead is reduced.

Figure 7:
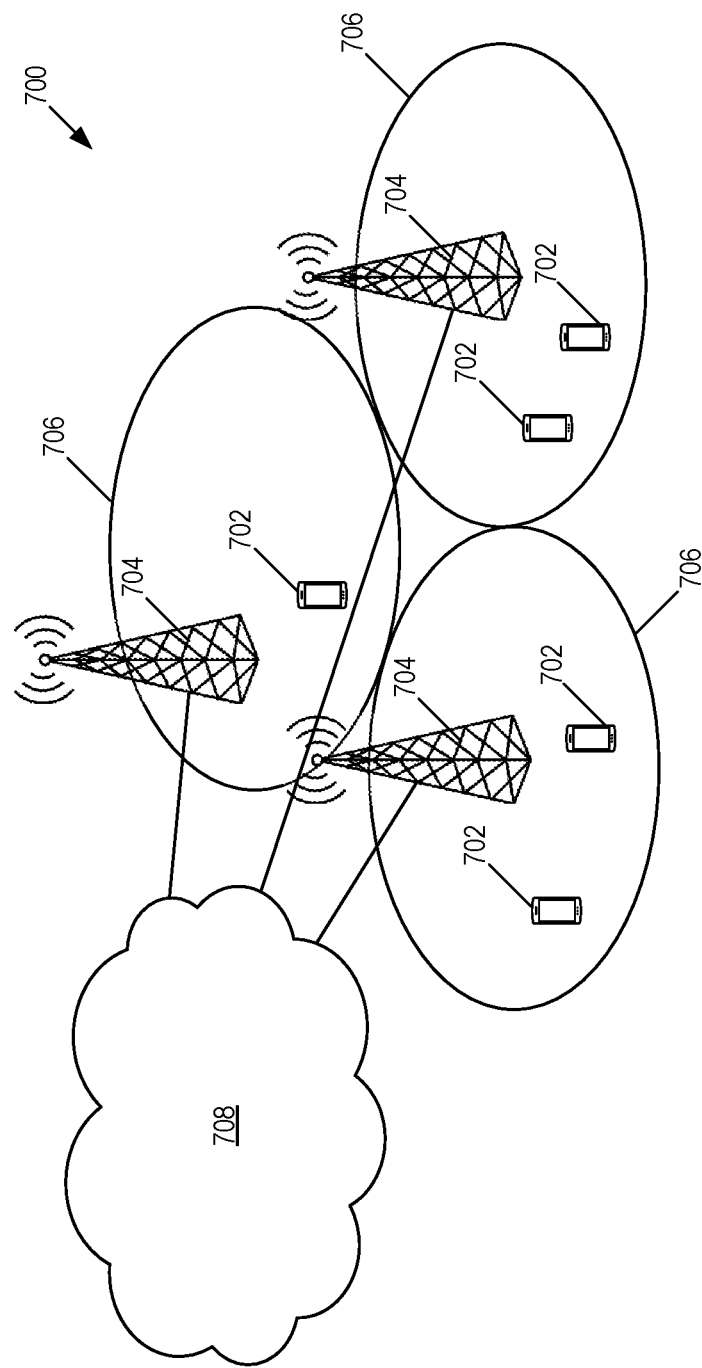
FIG. 7 illustrates one example of a wireless communication system in which embodiments of the present disclosure may be implemented.

In this regard, FIG. 7 illustrates one example of a wireless communication system 700 in which embodiments of the present disclosure may be implemented. In some embodiments, the wireless communication system 700 is a Fifth Generation (5G) NR system. However, the present disclosure is not limited thereto. As illustrated, the wireless communication system 700 includes a number of wireless devices 702 (which are also referred to herein as UEs) served by a Radio Access Network (RAN). The RAN includes a number of radio access nodes 704 (or more generally network nodes) having corresponding coverage areas (e.g., cells 706). The radio access nodes 704 may be base stations such as, e.g., a 5G NR Node B (gNB). The radio access nodes 704 are connected to a core network 708 (e.g., a 5G core network).

Figure 8:
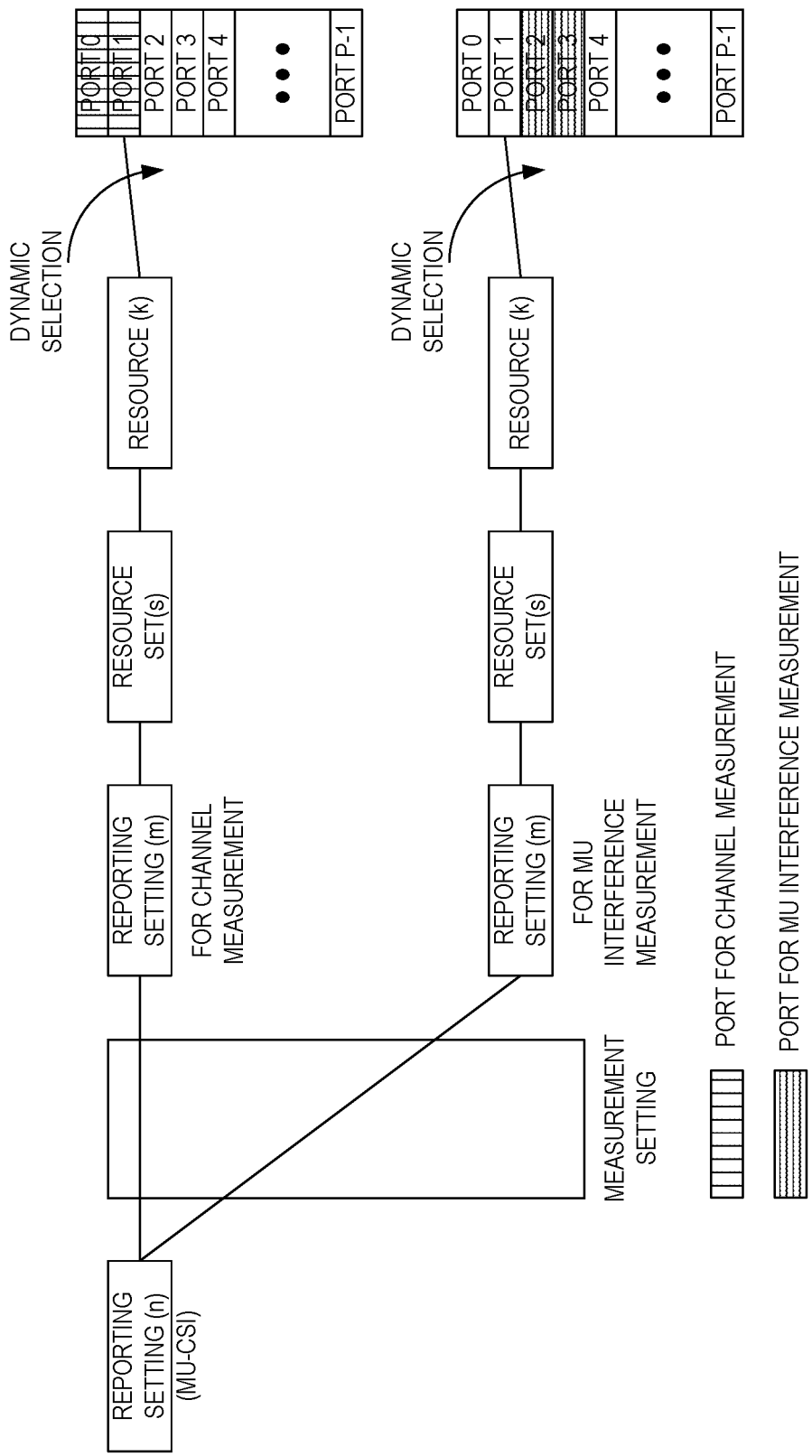
FIG. 8 illustrates a possible framework for option 1 for Multiple User (MU) interference measurement in accordance with some embodiments of the present disclosure.
Figure 9:
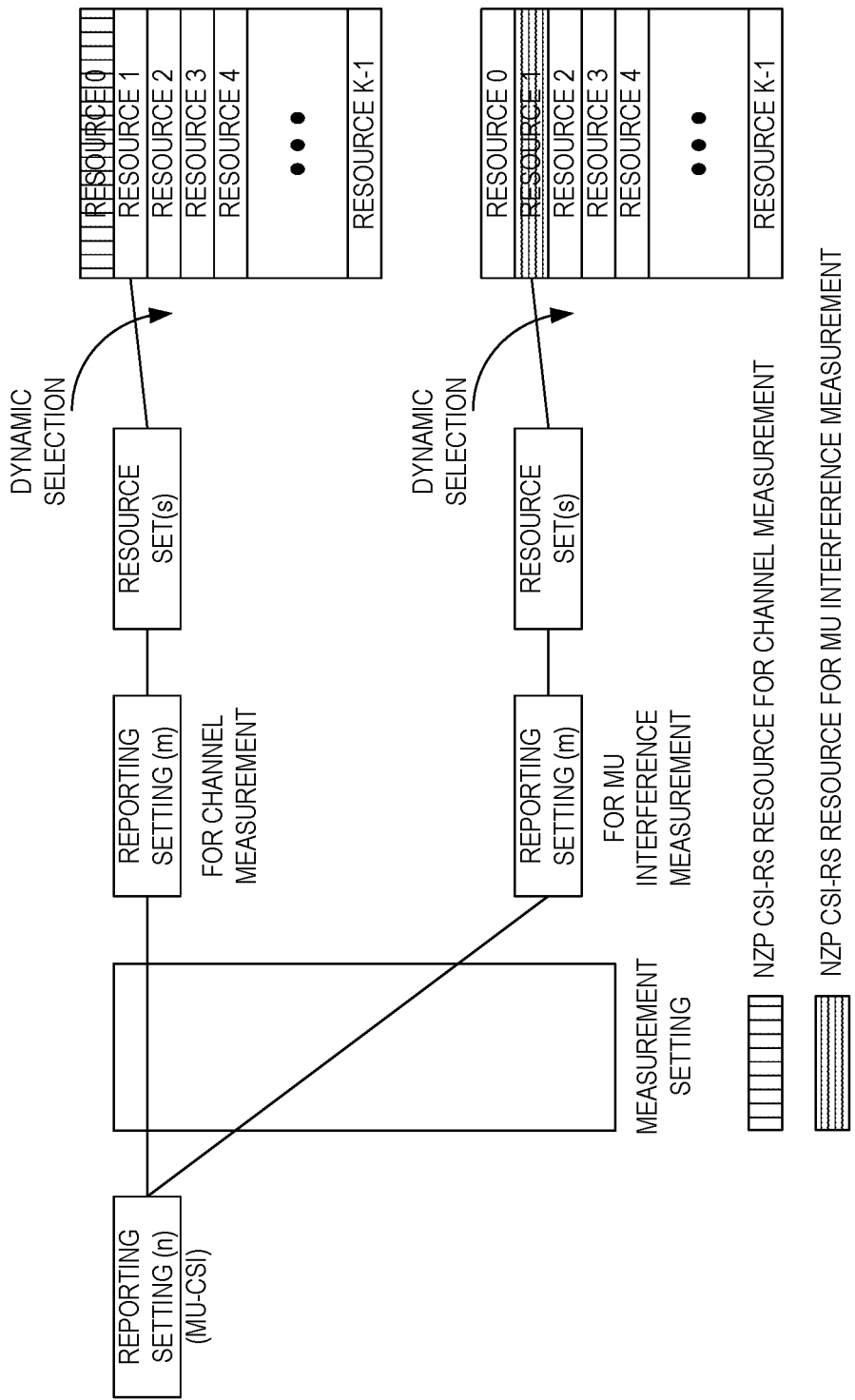
FIG. 9 illustrates a possible framework for option 2 for MU interference measurement in accordance with some other embodiments of the present disclosure.

With the agreed Channel State Information (CSI) framework for CSI reporting in NR, FIGS. 8 and 9 show, respectively, the possible reporting mechanisms for two options on MU interference measurement.

For option 1 (see, e.g., FIG. 8), a first subset of the CSI-RS ports in a common NZP CSI-RS resource set is dynamically signaled to a UE for channel measurement and a second subset of the ports are used for MU interference measurement.

For option 2 (see, e.g., FIG. 9), instead of signaling CSI-RS ports, a NZP CSI-RS resource is signaled to a UE for channel measurement and a subset of the NZP CSI-RS resources in a common resource set is signaled for MU interference measurement.

Signaling Methods for Option 1

In a first embodiment, a network node (e.g., the radio access node 704) configures (e.g., semi-statically via, e.g., Radio Resource Control (RRC) signaling) a UE (e.g., the wireless device 702) with a single NZP CSI-RS resource with up to, e.g., P=12 ports in the resource set.

In this first embodiment, a single NZP CSI-RS resource with up to 12 ports is configured (e.g., by RRC) for both channel measurement (i.e., MU CSI reporting) and MU interference measurement. The reporting setting for MU CSI is semi-statically configured with a measurement setting having at least two links pointing to the same resource setting and resource set. In some embodiments, the CSI-RS ports for channel measurement and the ports for MU interference measurement are dynamically signaled to the UE, e.g., as part of the Downlink Control Information (DCI) carried over Physical Downlink Control Channel (PDCCH).

Figure 10:
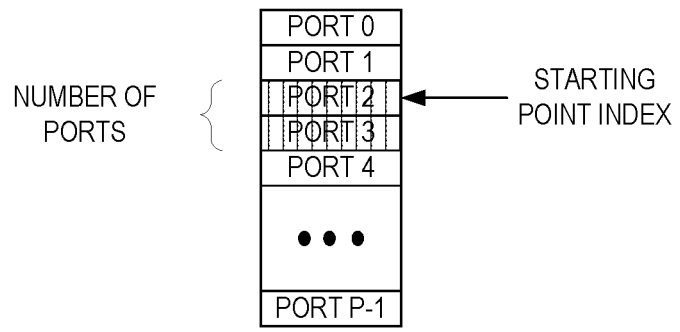
FIG. 10 illustrates signaling of the ports for channel measurement by signaling the starting index and the number of ports in accordance with some embodiments of the present disclosure.

For signaling the ports for channel measurement to a UE, two alternatives can be used:
1. Alternative 1, the ports are indicated by the starting port index in the NZP CSI-RS resource and the number of ports as shown in FIG. 10.
2. Alternative 2: Joint encoding is used; an example is shown in Table 3 to Table 6.

In Alternative 1, up to 4 DCI bits are need for signaling the starting CSI-RS ports and additional 2 DCI bits for signaling the number of ports (assuming a maximum of 4 antenna ports per UE), i.e. {1, 2, 3, 4}. So up to a total of 6 DCI bits are needed.

The total number of DCI bits can be different for different numbers of ports in the NZP CSI-RS resource. Table 2 shows DCI bits required for 2, 4, 8, and 12 ports.

TABLE 2

The required number of DCI bits for different NZP CSI-RS resource configurations with alternative 1.

|  | NZP CSI-RS resource configuration | | | |
| --- | --- | --- | --- | --- |
|  | 12 ports | 8 ports | 4 ports | 2 ports |
| DCI Bits for the starting port index | 4 | 3 | 2 | 1 |
| DCI Bits for the number of ports | 2 | 2 | 2 | 1 |
| Total number of DCI bits | 6 | 5 | 4 | 2 |

In Alternative 2, a joint encoding can be used for signaling the ports for channel measurement. An example of 12 port NZP CSI-RS is shown in Table 3. In this case, only 5 DCI bits are needed instead of 6 DCI bits. Examples for NZP CSI-RS resources with 8, 4, and 2 ports are shown in Table 4 to Table 6. With joint encoding, the number of DCI bits required for signaling the ports for channel measurement are reduced.

TABLE 3 an example of joint encoding for signaling ports for channel measurement with a 12-port NZP CSI-RS

| State | number of ports | starting port index | ports |
| --- | --- | --- | --- |
| 0 | 1 | port 0 | 0 |
| 1 | 1 | port 1 | 1 |
| 2 | 1 | port 2 | 2 |
| 3 | 1 | port 3 | 3 |
| 4 | 1 | port 4 | 4 |
| 5 | 1 | port 5 | 5 |
| 6 | 1 | port 6 | 6 |
| 7 | 1 | port 7 | 7 |
| 8 | 1 | port 8 | 8 |
| 9 | 1 | port 9 | 9 |
| 10 | 1 | port 10 | 10 |
| 11 | 1 | port 11 | 11 |
| 12 | 2 | port 0 | {0, 1} |
| 13 | 2 | port 2 | {2, 3} |
| 14 | 2 | port 4 | {4, 5} |
| 15 | 2 | port 6 | {6, 7} |
| 16 | 2 | port 8 | {8, 9} |
| 17 | 2 | port 10 | {10, 11} |
| 18 | 3 | port 0 | {0, 1, 2} |
| 19 | 3 | port 4 | {4, 5, 6} |
| 20 | 3 | port 8 | {8, 9, 10} |
| 21 | 4 | port 0 | {0, 1, 2, 3} |
| 22 | 4 | port 4 | {4, 5, 6, 7} |
| 23 | 4 | port 8 | {8, 9, 10, 11} |

TABLE 4 an example of joint encoding for signaling ports for channel measurement with an 8-port NZP CSI-RS.

| State | number of ports | starting port index | ports |
| --- | --- | --- | --- |
| 0 | 1 | port 0 | 0 |
| 1 | 1 | port 1 | 1 |
| 2 | 1 | port 2 | 2 |
| 3 | 1 | port 3 | 3 |
| 4 | 1 | port 4 | 4 |
| 5 | 1 | port 5 | 5 |
| 6 | 1 | port 6 | 6 |
| 7 | 1 | port 7 | 7 |
| 8 | 2 | port 0 | {0, 1} |
| 9 | 2 | port 2 | {2, 3} |
| 10 | 2 | port 4 | {4, 5} |
| 11 | 2 | port 6 | {6, 7} |
| 12 | 3 | port 0 | {0, 1, 2} |
| 13 | 3 | port 4 | {4, 5, 6} |
| 14 | 4 | port 0 | {0, 1, 2, 3} |
| 15 | 4 | port 4 | {4, 5, 6, 7} |

TABLE 5 an example of joint encoding for signaling ports for channel measurement with a 4-port NZP CSI-RS

| State | number of ports | starting port index | ports |
| --- | --- | --- | --- |
| 0 | 1 | port 0 | 0 |
| 1 | 1 | port 1 | 1 |
| 2 | 1 | port 2 | 2 |
| 3 | 1 | port 3 | 3 |
| 4 | 2 | port 0 | {0, 1} |
| 5 | 2 | port 2 | {2, 3} |
| 6 | 3 | port 0 | {0, 1, 2} |
| 7 | 4 | port 0 | {0, 1, 2, 3} |

TABLE 6 an example of joint encoding for signaling ports for channel measurement with a 2-port NZP CSI-RS

| State | number of ports | starting port index | ports |
| --- | --- | --- | --- |
| 0 | 1 | port 0 | 0 |
| 1 | 1 | port 1 | 1 |
| 2 | 2 | port 2 | {0, 1} |

For signaling ports for MU interference measurement, two methods can be used.
1. Use a bit map to signal the ports that are used by other interfering UEs. The bit map length is equal to the number of ports in the NZP CSI-RS resource. A port is included in interference measurement if the corresponding bit is set.
2. The ports for interference measurement is not explicitly signaled and is implicitly indicated by the ports signaled for channel measurement, i.e. the complement ports in the NZP CSI-RS resource are to be used by a UE for interference measurement. Stated differently, the ports not indicated/signaled for channel measurement are to be used for interference measurement.

Figure 11:
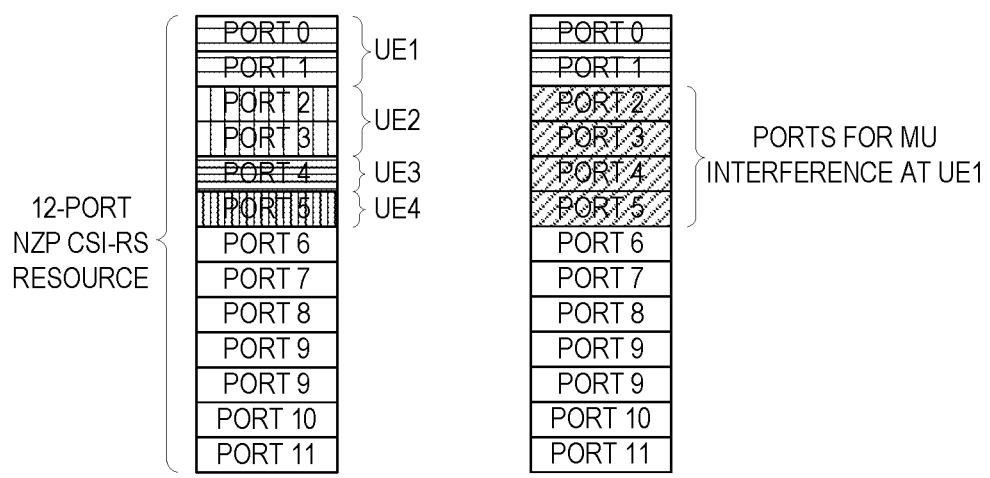
FIG. 11 illustrates an example of using a bit map to indicate the ports for MU interference measurement in accordance with some embodiments of the present disclosure.

For method 1, an example is shown in FIG. 11, where a 12 port NZP CSI-RS resource is configured, but a Multiple User Multiple Input Multiple Output (MU-MIMO) with 6 layers (ports 0 to 5) is scheduled for four UEs. The rest of the ports (ports 6 to 11) are not actually used. For UE1, the ports for MU interference measurement are ports 2 to 5, which are used by other UEs. So a bitmap of {001111000000} may be signaled to UE1. The bitmap would allow more accurate interference measurement. In this example, UE1 would not measure interference on ports 6 to 11. In order to further reduce overhead, the bitmap could always exclude the ports which were indicated as channel measurement ports for the UE. For instance, as UE2 is indicated with two ports (2 and 3) for channel measurement, a size-10 bitmap {1111000000} may be signaled, where each bit in the bitmap corresponds to a port, excluding ports 2 and 3. For example, the first two bits in the bitmap correspond to ports 1 and 2, while the remaining 8 bits in the bitmap correspond to ports 4-11.

Figure 12:
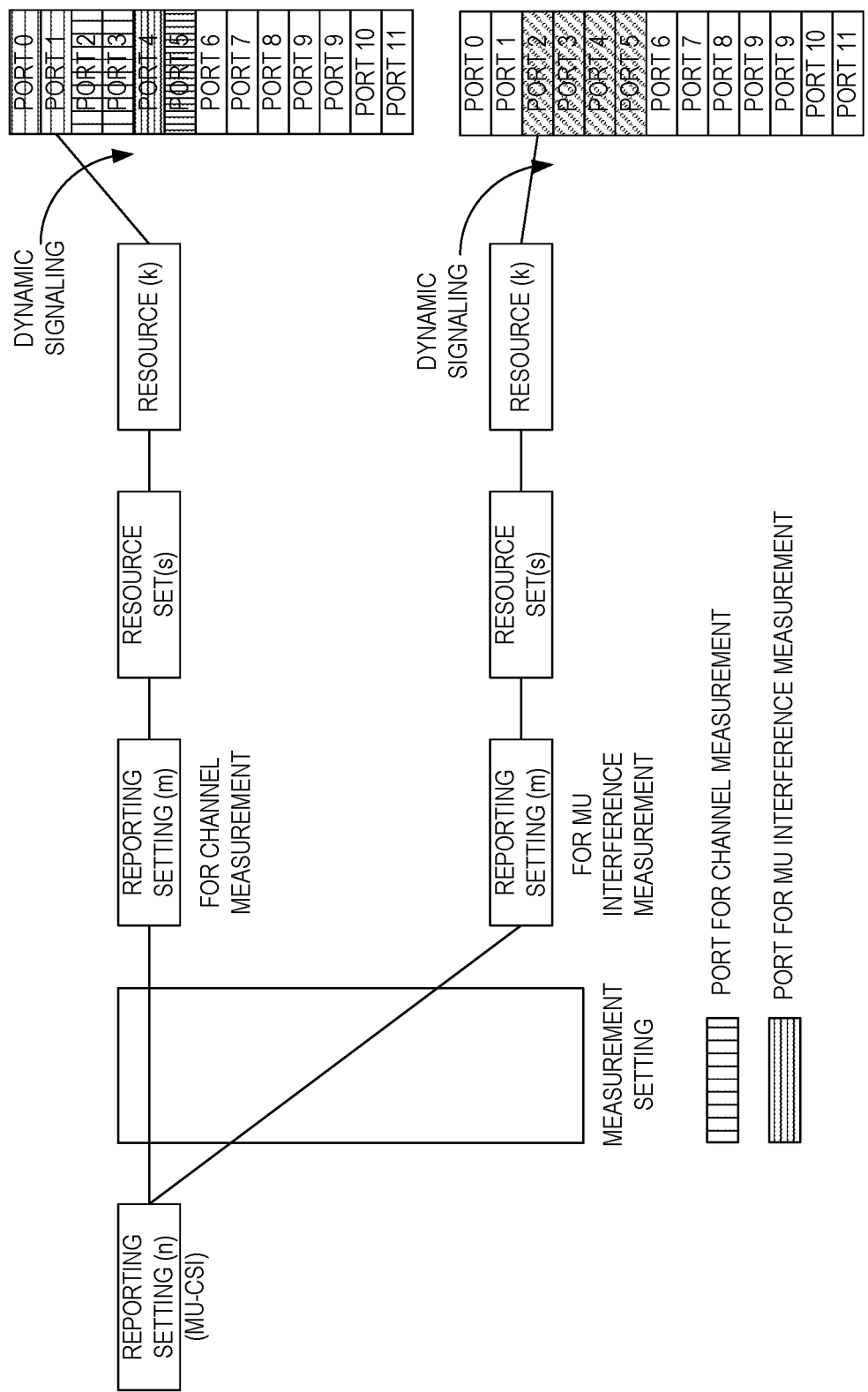
FIG. 12 illustrates an example framework for dynamic signaling of ports for both channel measurement and MU interference measurement to a User Equipment (UE) (UE1 in this example) in accordance with some embodiments of the present disclosure.

With method 1, the overall signaling scheme is shown in FIG. 12, where both the ports for channel measurement and ports for MU interference measurement are dynamically signaled.

Figure 13:
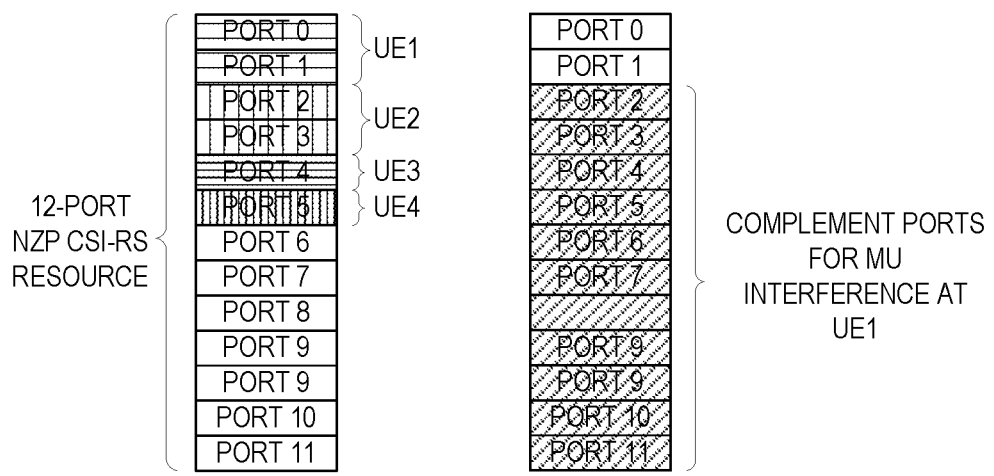
FIG. 13 illustrates an example of using the complement ports for MU interference measurement in accordance with some embodiments of the present disclosure.

In method 2, the ports for interference measurement are not explicitly signaled but are implicitly indicated by the ports signaled for channel measurement, i.e. all the complementary ports in the NZP CSI-RS resource are to be used by a UE for interference measurement. An example is shown in FIG. 13 where UE1 is signaled with ports 0 and 1 for channel measurement and measures MU interference on the ports other than ports 0 and 1 (i.e., ports 2 to 11).

Figure 14:
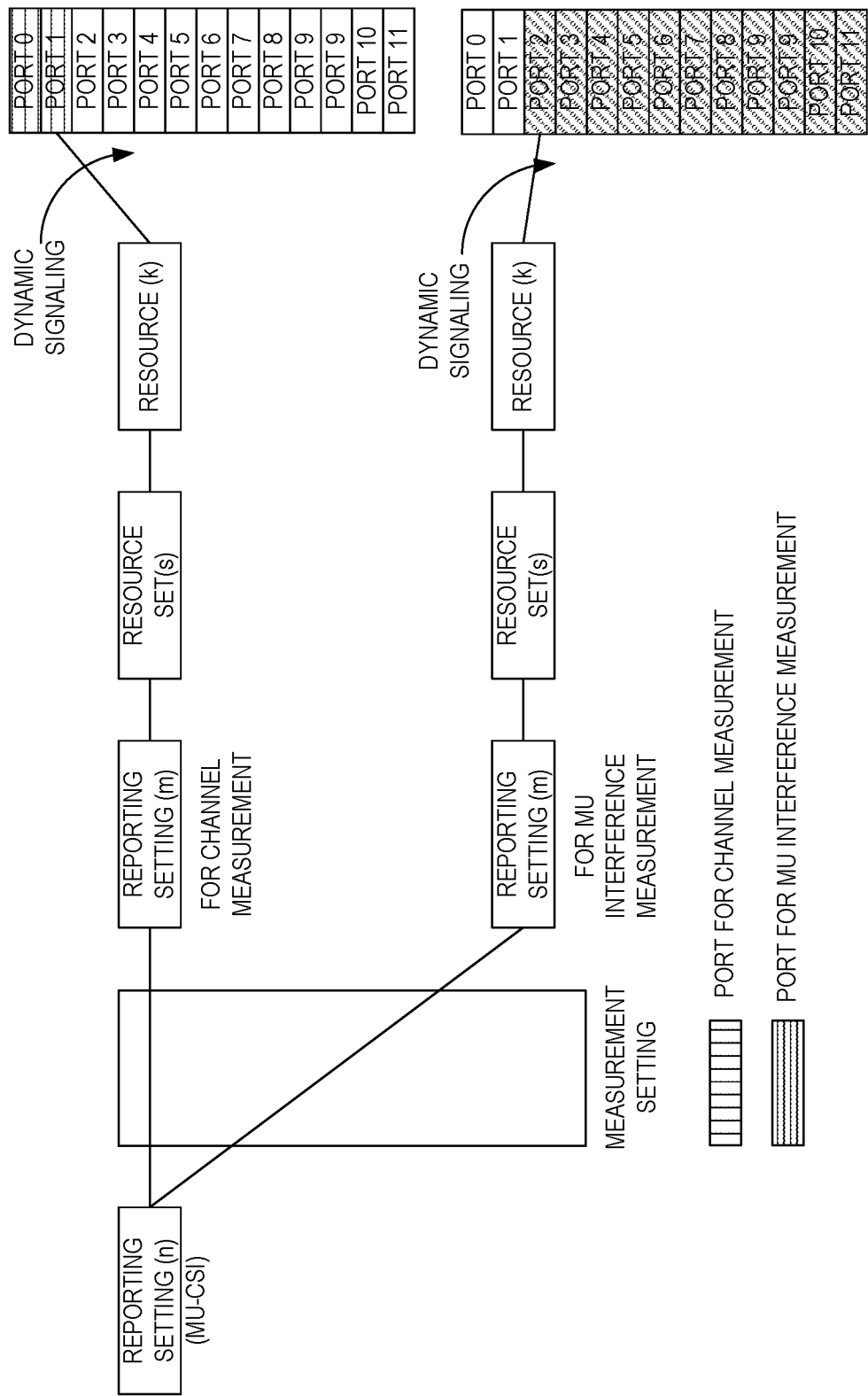
FIG. 14 illustrates an example of dynamic signaling of only the ports for channel measurement to a UE (UE1 in the example) where the rest of the ports in the NZP CSI-RS resource are for MU interference in accordance with some embodiments of the present disclosure.

The UE can perform channel estimation on each port and determine the interference power based on channel estimation for that port. Ports with no signal being transmitted (ports 6 to 12 in the example) would be either discarded for MU interference power estimation or can be used for inter-cell interference estimation. Method 2 saves the signaling overhead and is the preferred solution. The signaling scheme for this method is shown in FIG. 14, where only the ports for channel measurement are dynamically signaled.

In a further embodiment, instead of signaling the ports used for channel measurement, only the number of ports, $N_c$, for channel measurement are dynamically signaled to a UE in DCI. The UE identifies the ports for channel measurements by ordering the ports in the resource based on the received power and selects the port with the largest received power as the first port for channel measurement. In this case, only 2 bits are needed for dynamic signaling.

For example, let $N_c=2$ and there are 12 ports in the resource set. Assuming the port with the maximum received power is p=5, then the UE would use ports {5,6} for channel measurement and use the rest of the ports {0-4 and 7 to 11} in the resource for MU interference measurement. The UE also includes a Port Indication (PI) to indicate the starting port (port 5 in this example) in the CSI feedback so that the gNB can verify whether the correct ports are used by the UE.

Figure 15:
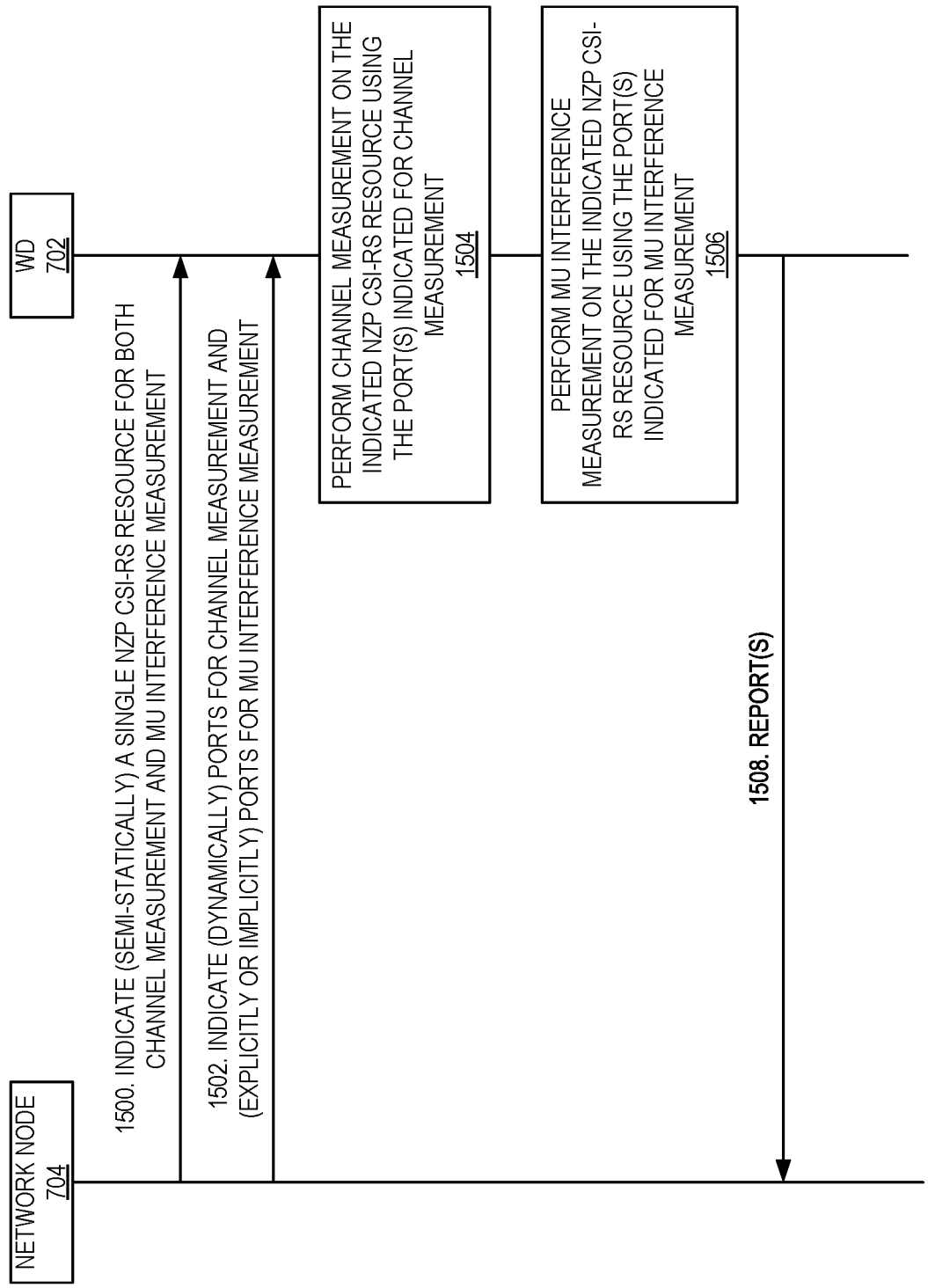
FIG. 15 illustrates the operation of a network node and a wireless device in accordance with at least some aspects of a first embodiment of the present disclosure.

FIG. 15 illustrates the operation of the network node 704 and the wireless device 702 in accordance with at least some of the aspects of the first embodiment described above. As illustrated, the network node 704 indicates (e.g., semi-statically), to the wireless device 702, a single NZP CSI-RS resource for both channel measurement and MU interference measurement (step 1500). The network node 704 indicates (e.g., dynamically), to the wireless device 702, ports for channel measurement and (explicitly or implicitly) ports for MU interference measurement on the indicated NZP CSI-RS resource (step 1502). The wireless device 702 performs channel measurement on the indicated NZP CSI-RS resource using the port(s) indicated for channel measurement (step 1504) and performs MU interference measurement on the indicated NZP CSI-RS resource using the port(s) indicated for MU interference measurement (step 1506). The wireless device 702 sends results of the measurements to the network node 704, e.g., in one or more reports (step 1508).

In a second embodiment, the network node 704 configures (e.g., via RRC signaling) the wireless device 702 with multiple NZP CSI-RS resources with a different number of ports in a resource set.

Figure 16:
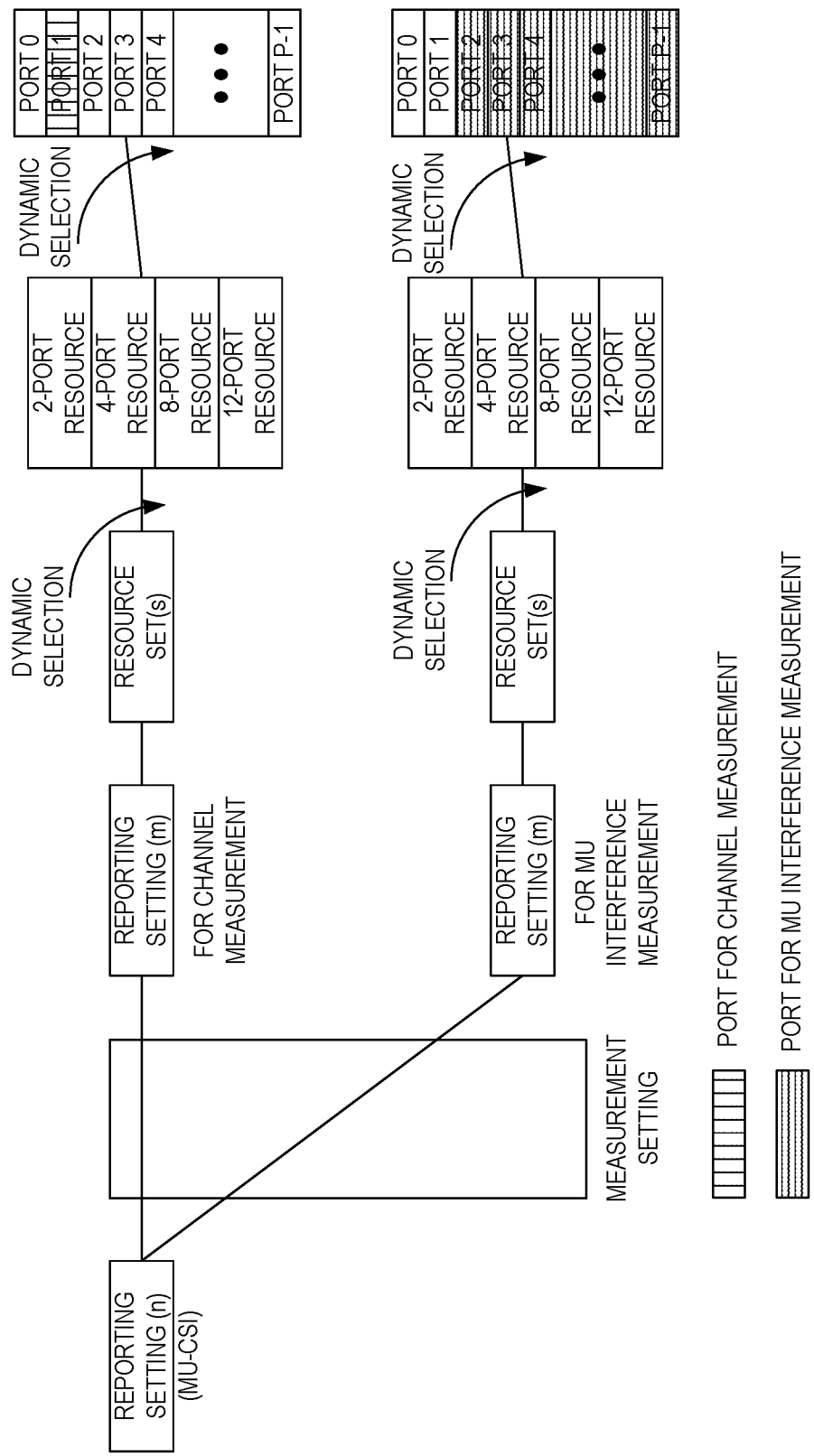
FIG. 16 illustrates an example of configuring multiple NZP CSI-RS resources and dynamically selecting a NZP CSI-RS resource in accordance with some embodiments of the present disclosure.

The drawback of the first embodiment with a single NZP CSI-RS resource is that, in order to support up to 12 layers of MU-MIMO, a NZP CSI-RS resource with 12 ports is needed. However, in some cases, not all 12 ports may be used. In this case, the NZP CSI-RS resource overhead is still 12 Resource Elements (REs) per Resource Block (RB). An alternative is to configure multiple NZP CSI-RS resources, for example, 4 NZP CSI-RS resources of 2, 4, 8, and 12 ports as shown in FIG. 16. Depending the number of MU-MIMO layers to be scheduled, the NZP CSI-RS resource of the correct size can be used. For example, if 4-layer MU-MIMO is to be scheduled, the NZP CSI-RS resource with 4 ports would be selected. In some embodiments, an extra number of DCI bits (e.g., 2 DCI bits) is used to for CSI-RS resource selection.

Figure 17:
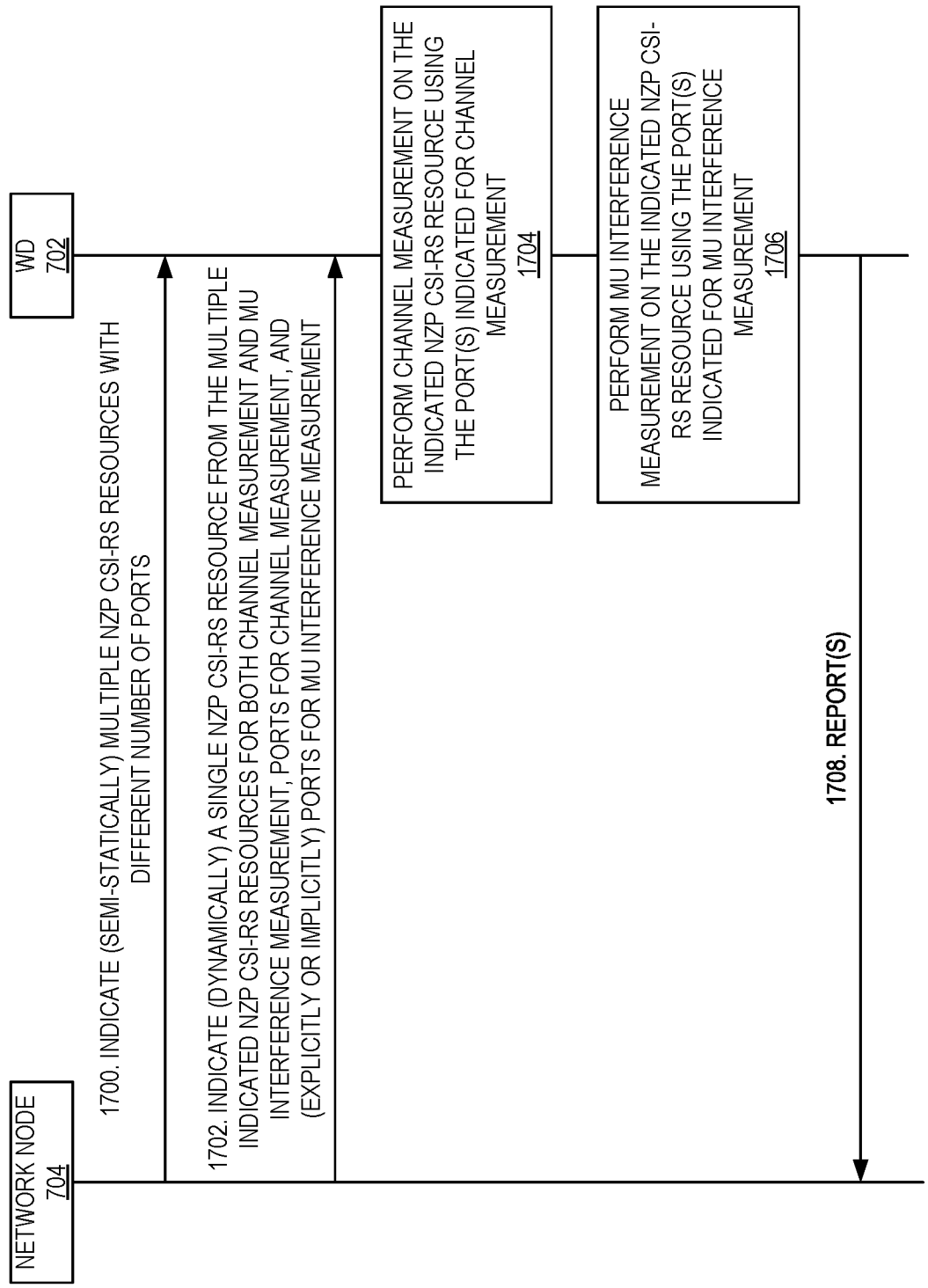
FIG. 17 illustrates the operation of a network node and a wireless device in accordance with at least some aspects of a second embodiment of the present disclosure.

FIG. 17 illustrates the operation of the network node 704 and the wireless device 702 in accordance with at least some of the aspects of the second embodiment described above. As illustrated, the network node 704 indicates (e.g., semi-statically), to the wireless device 702, multiple NZP CSI-RS resources with different numbers of ports (step 1700). The network node 704 indicates (e.g., dynamically), to the wireless device 702, a single NZP CSI-RS resource from the indicated set of NZP CSI-RS resources for both channel measurement and MU interference measurement, ports to use on the indicated NZP CSI-RS resource for channel measurement, and (explicitly or implicitly) ports to use on the indicated NZP CSI-RS resource for MU interference measurement (step 1702). The wireless device 702 performs channel measurement on the indicated NZP CSI-RS resource using the port(s) indicated for channel measurement (step 1704) and performs MU interference measurement on the indicated NZP CSI-RS resource using the port(s) indicated for MU interference measurement (step 1706). The wireless device 702 sends results of the measurements to the network node 704, e.g., in one or more reports (step 1708).

Signaling Methods for Option 2

In Option 2 (i.e., option where a NZP CSI-RS resource is signaled to a UE for channel measurement and a subset of the NZP CSI-RS resources in a common resource set is signaled for MU interference measurement), a UE is signaled with a NZP CSI-RS resource for channel measurement. Since up to 12 UEs, each with one layer, can be participating in downlink MU-MIMO, up to 12 single-port NZP CSI-RS resources need to be configured for a UE. To support MU-MIMO with different ranks (one to four), three sets of NZP CSI-RS resources can be configured for a UE, i.e.

Resource set 0: 12 single port CSI-RS resources {RS0_1, . . . , RS11_1};
Resource set 1: 6 two-port CSI-RS resources {RS0_2, . . . , RS5_2};
Resource set 2: 3 four-port CSI-RS resources {RS0_4, . . . , RS2_4};

For channel measurement, a UE is signaled with a resource set and a NZP CSI-RS resource in the resource set. 2 DCI bits are needed for selecting the resource set, and up to 4 DCI bits for selecting the CSI-RS resource, so a total of 6 DCI bits are needed for signaling the CSI-RS resource for channel measurement.

For signaling the CSI-RS resources for MU interference measurement, the NZP CSI-RS resources can be in all three resource sets. The combinations can be very large.

In a third embodiment, a network node configures (e.g., semi-statically via, e.g., RRC signaling) a single NZP CSI-RS resource set of multiple NZP CSI-RS resources.

In this embodiment, each UE is signaled with a NZP CSI-RS resource out of the resource set for channel measurement and one or multiple NZP CSI-RS resources in the resource set for MU interference measurement.

Figure 18:
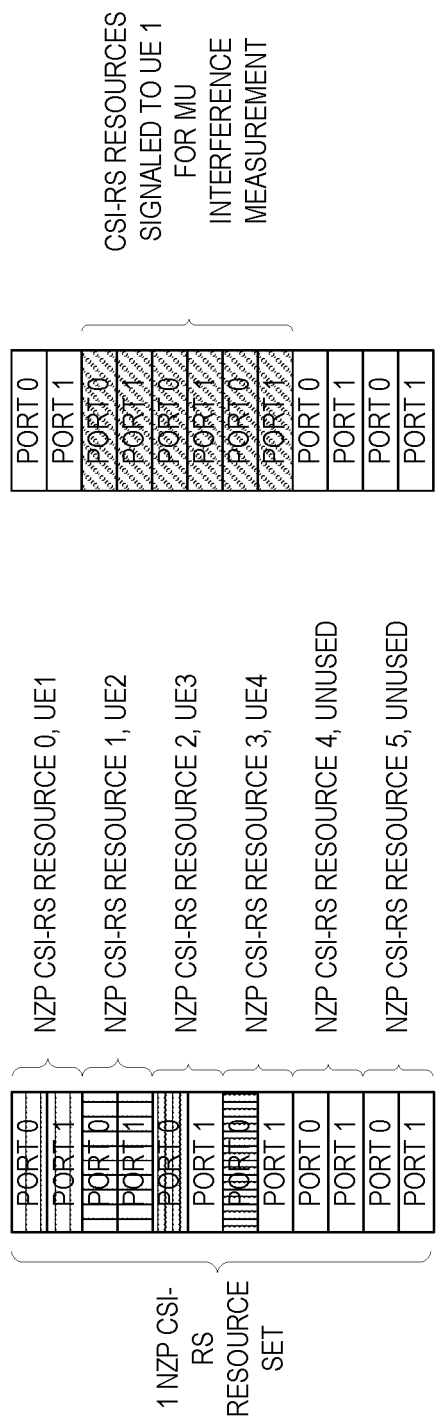
FIG. 18 illustrates an example of using a single resource set of six 2-port NZP CSI-RS resources for MU CSI measurement in accordance with some embodiments of the present disclosure.

To simplify the signaling, a single resource set of up to 6 CSI-RS resources each with 2 ports can be configured for a UE. An example is shown in FIG. 18, where six 2-port NZP CSI-RS resources are configured for each UE. NZP CSI-RS resource 0 is allocated to UE1 with rank 2; NZP CSI-RS resource 1 is allocated to UE2 also with rank 2; NZP CSI-RS resource 2 is allocated to UE3 with rank 1; NZP CSI-RS resource 3 is allocated to UE4 with rank 1; NZP CSI-RS resources 4 and 5 are not actually allocated in this example.

For signaling the NZP CSI-RS resource for channel measurement, 3 DCI bits can be used as shown in Table 7.

TABLE 7

Signaling NZP CSI-RS resource for channel measurement

| State | 3 bits | NZP CSI-RS resource |
|---|---|---|
| 0 | 000 | 0 |
| 1 | 001 | 1 |
| 2 | 010 | 2 |
| 3 | 011 | 3 |
| 4 | 100 | 4 |
| 5 | 101 | 5 |

For signaling the NZP CSI-RS resources for MU interference measurement, a 5-bit bitmap may be used, each bit is associated with a NZP CSI-RS resource other than the one for channel measurement. In this case, the maximum rank per UE is limited to 2 in MU-MIMO.

For UE3 and UE4 in FIG. 18, only one port in the allocated CSI-RS resources is actually transmitted. The UEs would measure on both ports and determine the actual rank.

For interference measurement in this example, the whole of NZP CSI-RS resources 2 and 3 are signaled to UE1 with a 5 bit bitmap in DCI. The measured interferences on port 1 of the two resources are not actual MU interference from UE 3 and UE 4. Unless coherent channel estimation is performed on the ports, there could be some measurement inaccuracy.

Alternatively, a 12 bit bitmap in DCI each associated to one port in the resource set may be used for signaling the resources for MU interference measurement, but with a cost of extra signaling overhead.

Figure 19:
FIG. 19 illustrates an example of a UE assuming complement NZP CSI-RS resources for MU interference measurement without signaling the resources in accordance with some embodiments of the present disclosure.

In another embodiment, the resources for MU interference measurement are not explicitly signaled. A UE assumes that other than the NZP CSI-RS resource indicated for channel measurement, all the remaining NZP CSI-RS resources in the resource set are for MU interference measurement. An example is shown in FIG. 19, where UE1 is signaled with NZP CSI-RS 0 for channel measurement. UE1 assumes NZP CSI-RS resources 1 to 5 for MU interference measurement. Coherent channel estimation can be used to eliminate the ports that are not actually used for CSI-RS transmission.

This saves the signaling overhead and is the preferred solution. With this approach, a maximum of six UEs can be scheduled for MU-MIMO CSI measurement.

Figure 20:
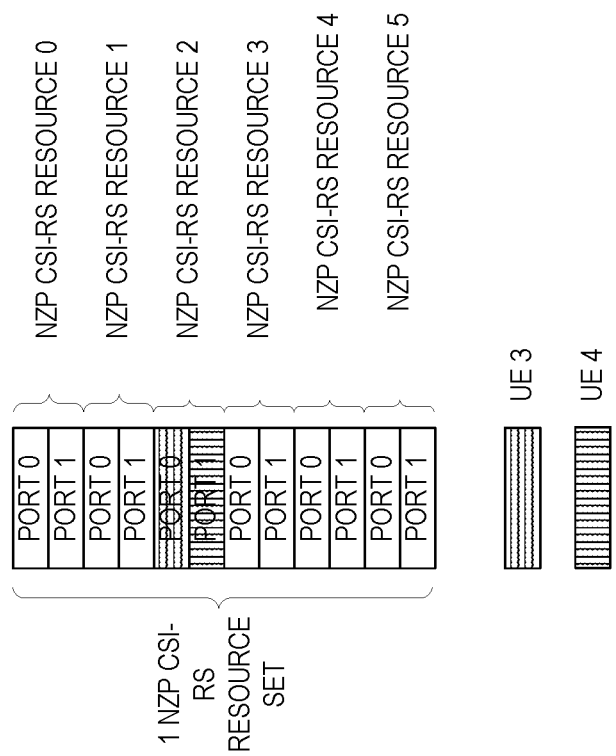
FIG. 20 illustrates an example of sharing a NZP CSI-RS resource by two UEs in accordance with some embodiments of the present disclosure.

To support more UEs in MU-MIMO, two additional DCI bits may be used to further select a port in each NZP CSI-RS resource for channel measurement signaling so that 2 UEs may share a NZP CSI-RS resource. An example is shown in FIG. 20, where UE3 and UE4 use different ports of NZP CSI-RS resource 2.

TABLE 8

An example of signaling NZP CSI-RS resource for channel measurement with port selection.

| State | bits | NZP CSI-RS resource | port # |
|---|---|---|---|
| 0 | 00000 | 0 | {0, 1} |
| 1 | 00001 | 1 | {0, 1} |
| 2 | 00010 | 2 | {0, 1} |
| 3 | 00011 | 3 | {0, 1} |
| 4 | 00100 | 4 | {0, 1} |
| 5 | 00101 | 5 | {0, 1} |
| 6 | 00110 | 0 | {0} |
| 7 | 00111 | 1 | {0} |
| 8 | 01000 | 2 | {0} |
| 9 | 01001 | 3 | {0} |
| 10 | 01010 | 4 | {0} |
| 11 | 01011 | 5 | {0} |
| 12 | 01100 | 0 | {1} |
| 13 | 01101 | 1 | {1} |
| 14 | 01110 | 2 | {1} |
| 15 | 01111 | 3 | {1} |
| 16 | 10000 | 4 | {1} |
| 17 | 10001 | 5 | {1} |

Figure 21:
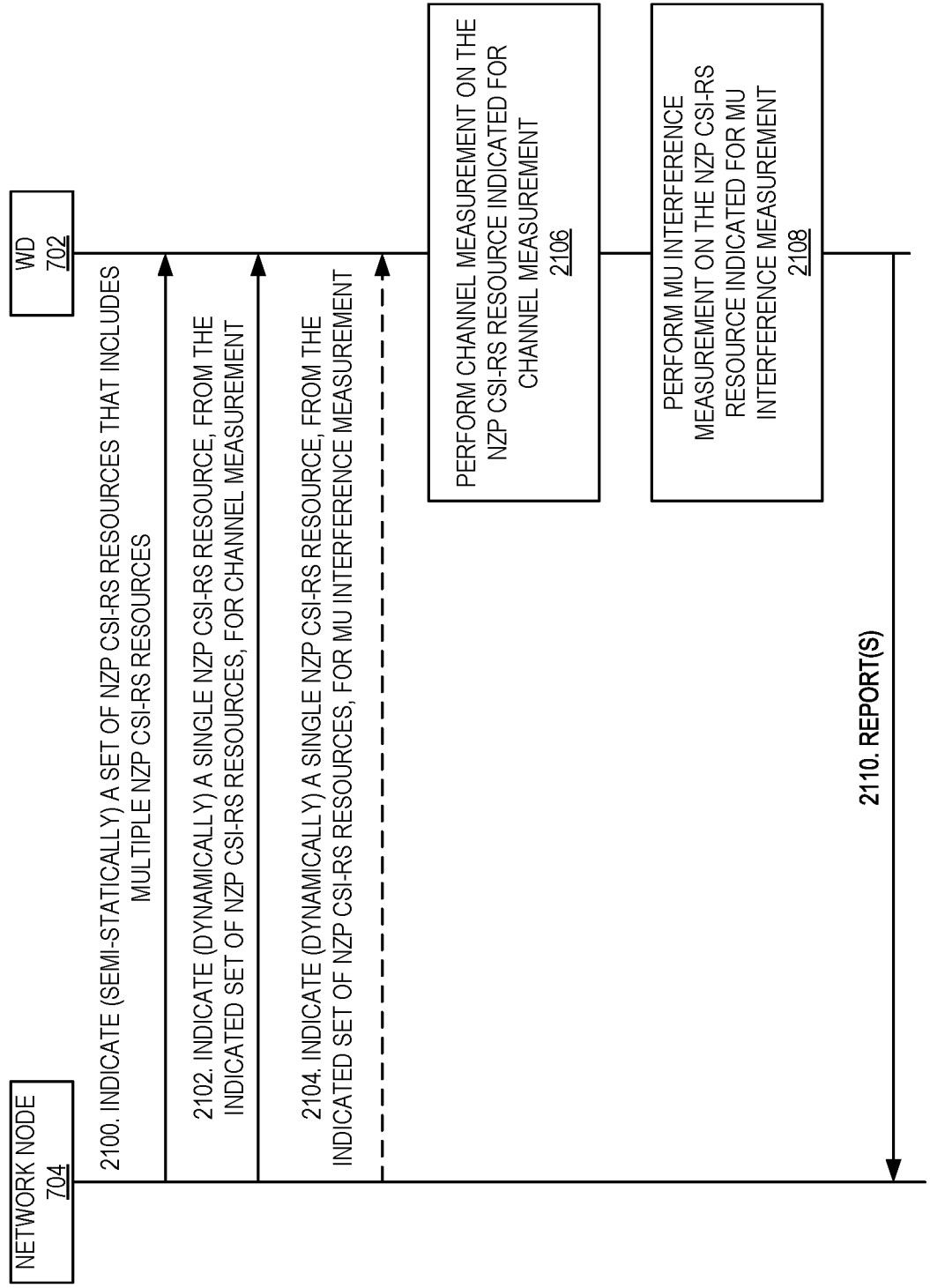
FIG. 21 illustrates the operation of a network node and a wireless device in accordance with at least some aspects of a third embodiment of the present disclosure.

FIG. 21 illustrates the operation of the network node 704 and the wireless device 702 in accordance with at least some of the aspects of the third embodiment described above. As illustrated, the network node 704 indicates (e.g., semi-statically), to the wireless device 702, a set of NZP CSI-RS resources that includes multiple NZP CSI-RS resources (step 2100). The network node 704 indicates (e.g., dynamically), to the wireless device 702, a single NZP CSI-RS resource from the indicated set of NZP CSI-RS resources for channel measurement (step 2102). Optionally, the network node 704 indicates (e.g., dynamically), to the wireless device 702, a single NZP CSI-RS resource from the indicated set of NZP CSI-RS resources for MU interference measurement (step 2104). In other embodiments, the single NZP CSI-RS resource from the indicated set of NZP CSI-RS resources for MU interference measurement is indicated implicitly. The wireless device 702 performs channel measurement on the indicated NZP CSI-RS resource for channel measurement (step 2106) and performs MU interference measurement on the indicated NZP CSI-RS resource for MU interference measurement (step 2108). The wireless device 702 sends results of the measurements to the network node 704, e.g., in one or more reports (step 2110).

In a fourth embodiment, each UE is configured with several NZP CSI-RS resource sets corresponding to different hypotheses of MU-MIMO co-scheduling. In this embodiment, each resource set of the NZP CSI-RS resource sets may comprise resources with, e.g., 4 antenna ports (even if the UE is only pre-scheduled with e.g. rank-2, the remaining ports in the resource are then empty).

Resource set 0: 4 four-port resources {RS0, . . . , RS3}
Resource set 1: 4 four-port resources {RS4, . . . , RS7}
Resource set 2: 4 four-port resources {RS8, . . . , RS11}
Resource set 3: 4 four-port resources {RS12, . . . , RS15}

In this case, the gNB can evaluate different co-scheduling hypotheses by allocating different UEs to different resource sets, as in Table 9 below.

TABLE 9

Example of resource set to UE mapping for embodiment 4

| Resource set | UEs |
|---|---|
| 0 | {UE1, UE3, UE5, XX} |
| 1 | {UE0, UE1, UE2, UE3} |
| 2 | {UE1, XX, UE2, UE3} |
| 3 | {UE2, UE3, XX, XX} |

Note that some resources in the resource set may be empty (indicated with XX) and not allocated to any UE. Note also that the physical NZP CSI-RS resources in the resource set may be overlapping so that the same resource is used in multiple sets.

To signal the resource for channel measurement, 2 DCI bits are required to select the resource set and another 2 DCI bits are required to select the resource within the set, requiring 4 DCI bits in total. The remaining resources in the selected set are used for interference measurement.

In another embodiment, the resource within the set the UE is supposed to use for channel measurement is not signaled; instead, the UE is instructed to select the preferred resource and report the selection back in the form of a CSI-RS Resource Indicator (CRI). Since the CSI-RS resources are beamformed, the UE will with very high probability select the CRI with the "intended resource" which the gNB has beamformed UE-specifically to that UE. The remaining resources in the selected set are used for interference measurement. Thus, with this approach, there is no need for signaling a specific resource in the set for channel measurement or for interference measurement, and only 2 bits to indicate a resource set is signaled in the DCI. As the UE needs to measure and estimate the channel for all the CSI-RS resources anyway, there is no additional UE complexity.

In yet another embodiment, only one resource set is configured and there is no need for dynamic signaling of the resource set.

Figure 22:
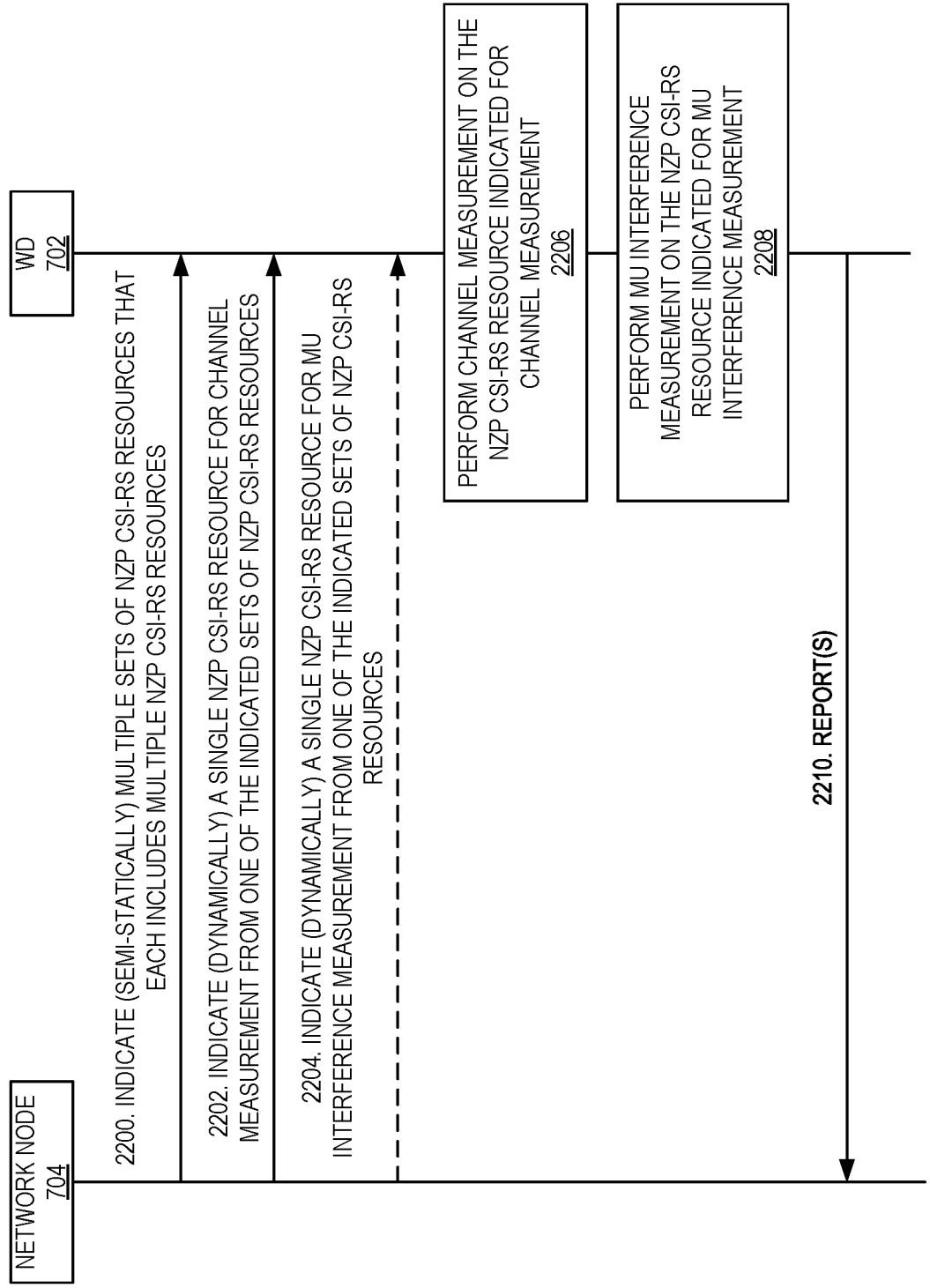
FIG. 22 illustrates the operation of a network node and a wireless device in accordance with at least some aspects of a fourth embodiment of the present disclosure.

FIG. 22 illustrates the operation of the network node 704 and the wireless device 702 in accordance with at least some of the aspects of the fourth embodiment described above. As illustrated, the network node 704 indicates (e.g., semi-statically), to the wireless device 702, multiple sets of NZP CSI-RS resources, each including multiple NZP CSI-RS resources (step 2200). The network node 704 indicates (e.g., dynamically), to the wireless device 702, a single NZP CSI-RS resource from one of the indicated sets of NZP CSI-RS resources for channel measurement (step 2202). Optionally, the network node 704 indicates (e.g., dynamically), to the wireless device 702, a single NZP CSI-RS resource from one of the indicated sets of NZP CSI-RS resources for MU interference measurement (step 2204). In other embodiments, the single NZP CSI-RS resource from one of the indicated sets of NZP CSI-RS resources for MU interference measurement is indicated implicitly. The wireless device 702 performs channel measurement on the indicated NZP CSI-RS resource for channel measurement (step 2206) and performs MU interference measurement on the configured NZP CSI-RS resource for MU interference measurement (step 2208). The wireless device 702 sends results of the measurements to the network node 704, e.g., in one or more reports (step 2210).

In a fifth embodiment, each UE is configured (e.g., semi-statically via, e.g., RRC signaling) with several NZP CSI-RS resource sets corresponding to different hypotheses of MU-MIMO co-scheduling. In this embodiment, the NZP CSI-RS resource sets for channel measurement and the NZP CSI-RS resource sets for interference measurement are configured (e.g., semi-statically via, e.g., RRC signaling) in different resource settings as shown in FIG. 23.

Figure 23:
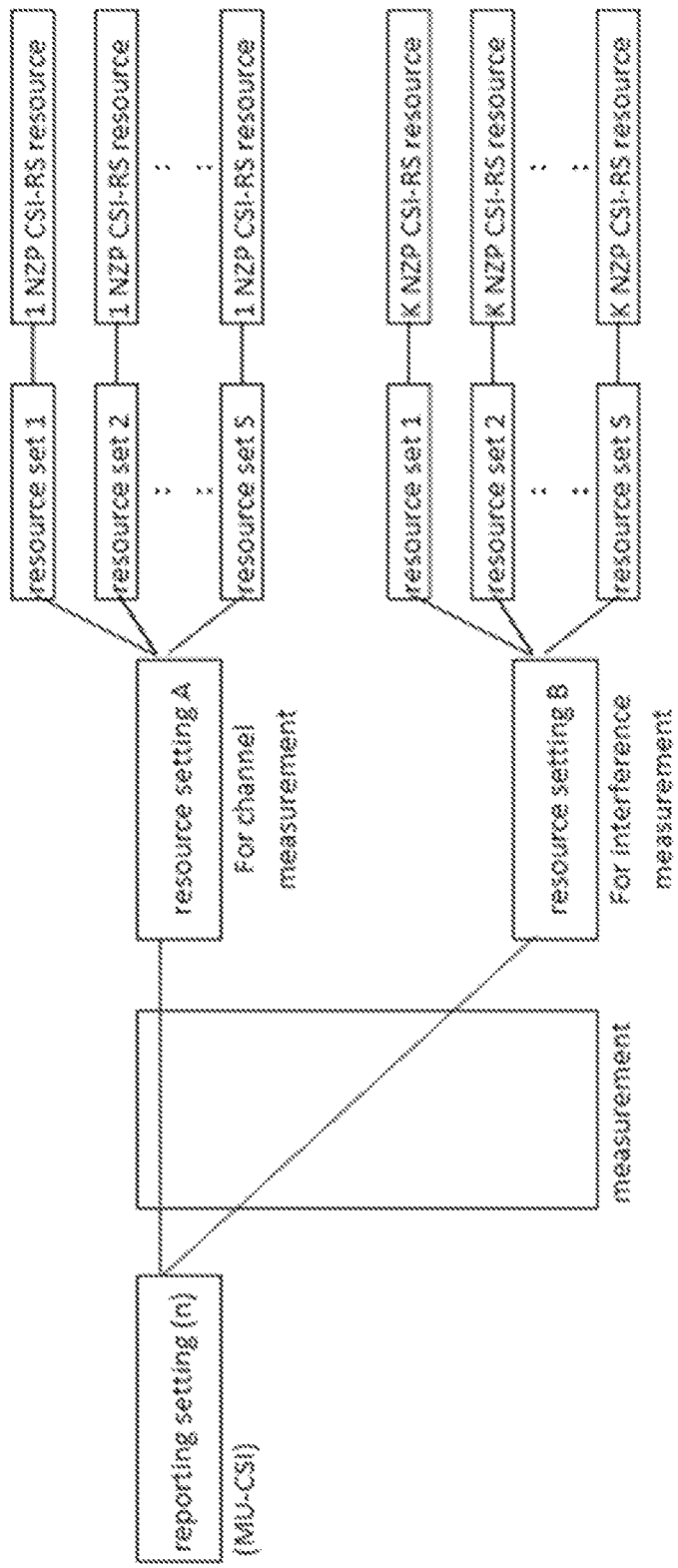
FIG. 23 illustrates an example of configuring NZP CSI-RS resource sets for channel measurement in one resource setting and the NZP CSI-RS resource sets for interference measurement in a different resource settings in accordance with some embodiments of the present disclosure.

In the example of FIG. 23, resource setting A consists of S different resource sets for channel measurement where each resource set consists of a single NZP CSI-RS resource. These NZP CSI-RS resources in each of the resource sets within resource setting A can consist of a different number of ports used for channel measurement purposes. In one example, all the NZP CSI-RS resources within the resource sets of resource setting A may be configured with 4 ports (even if the UE is only pre-scheduled with, e.g., rank-2, the remaining ports in the resource are then empty).

In FIG. 23, resource setting B consists of S different resource sets for interference measurement where each resource set consists of K NZP CSI-RS resources. Each of these K NZP CSI-RS resources may be allocated to a different UE by the gNB (i.e., up to K UEs producing MU interference is possible). Hence, the gNB can evaluate different co-scheduling hypotheses for MU-MIMO involving up to K+1 UEs. Note that it is possible that some NZP CSI-RS resources within one of the resource sets of resource setting B may not be allocated to any UE. Note that the physical NZP CSI-RS resources in the resource sets of resources setting B may be overlapping so that the same resource may be used in multiple resource sets.

In this embodiment, the UE is configured, e.g., dynamically with up to a $\log_2(S)$ DCI bit field to indicate which resource set within resource setting A should be used for channel measurement. Since the resource sets within resource setting A only contain a single NZP CSI-RS resource for channel measurement, additional signaling is not need to indicate this NZP CSI-RS resource. In some embodiments, the resource set from resource setting B to be used for interference measurement is implicitly indicated by the same DCI bit field that indicates which resource set from resource setting A should be used for channel measurement.

For example, if up to a $\log_2(S)$ DCI bit field is signaled to the UE to indicate resource set 2 from resource setting A should be used for channel measurement, then the UE assumes resource set 2 from resource setting B for interference measurement. Hence, no additional DCI bits are needed to explicitly indicate the resource set or NZP CSI-RS resources to be used for interference measurement. Alternatively stated, the resource set from resource setting A to be used for channel measurement, and the resource set from resource setting B to be used for interference measurement are jointly indicated by the same DCI field.

For a UE configured with S=4 resource sets in both resource setting A and resource setting B, the solution in this embodiment only needs up to 2 DCI bits, hence saving DCI signaling overhead.

In this embodiment, the UE can perform channel estimation on each of the K NZP CSI-RS resources of the resource set being used for interference measurement and determine the interference power based on channel estimation in each of the K NZP CSI-RS resources. The NZP CSI-RS resources with very low interference power can either be discarded from MU interference power estimation or can be used for inter-cell interference estimation.

Figure 24:
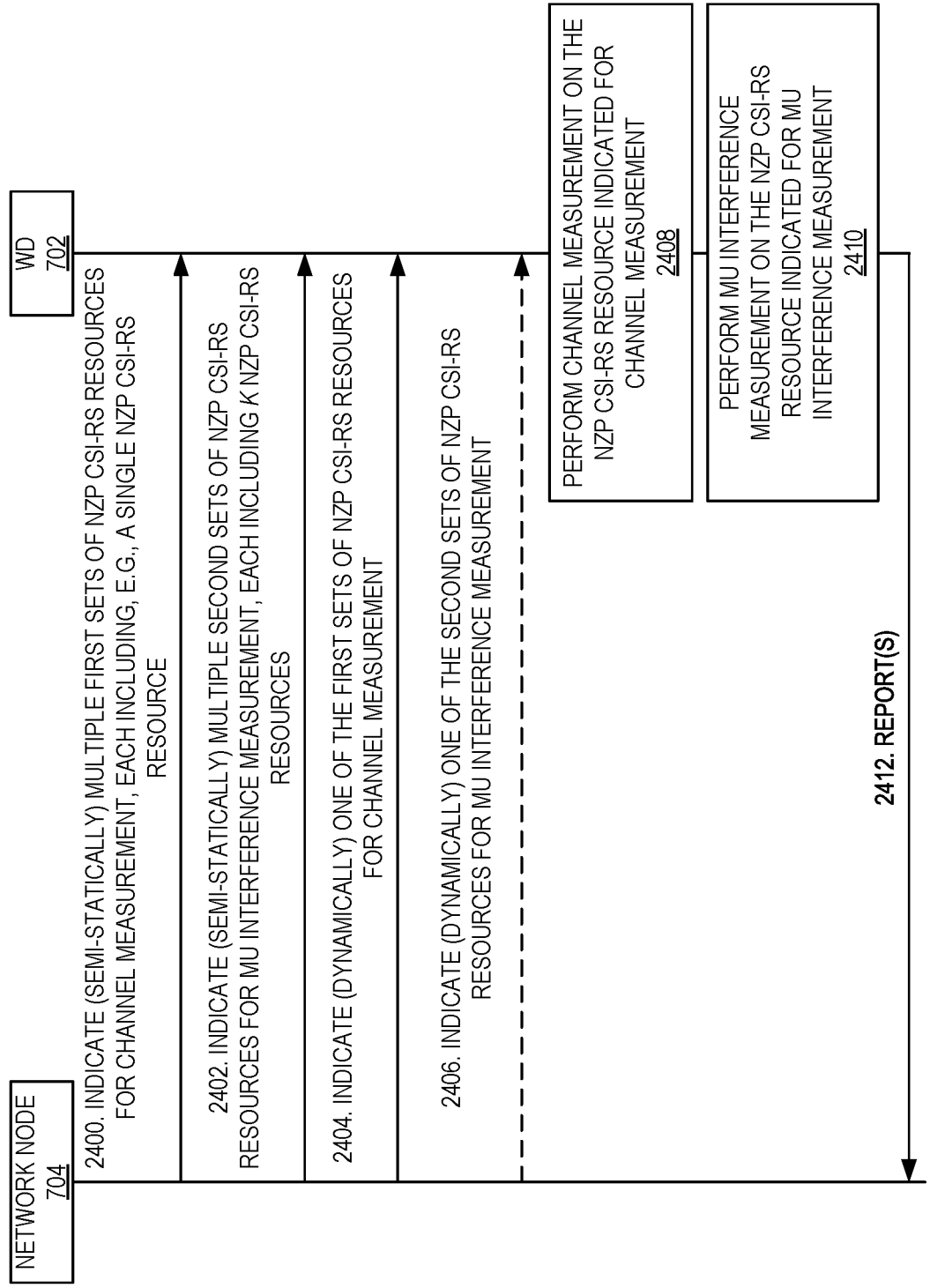
FIG. 24 illustrates the operation of a network node and a wireless device in accordance with at least some aspects of a fifth embodiment of the present disclosure.

FIG. 24 illustrates the operation of the network node 704 and the wireless device 702 in accordance with at least some of the aspects of the fifth embodiment described above. As illustrated, the network node 704 indicates (e.g., semi-statically), to the wireless device 702, multiple first sets of NZP CSI-RS resources for channel measurement, each including, e.g., a single NZP CSI-RS resource (step 2400). The network node 704 also indicates (e.g., semi-statically), to the wireless device 702, multiple second sets of NZP CSI-RS resources for channel measurement, each including, e.g., K NZP CSI-RS resources (step 2402). The network node 704 indicates (e.g., dynamically), to the wireless device 702, one of the first sets of NZP CSI-RS resources for channel measurement (step 2404). Optionally, the network node 704 indicates (e.g., dynamically), to the wireless device 702, one of the second sets of NZP-CSI resources for MU interference measurement (step 2406). In other embodiments, the one of second sets of NZP-CSI resources is indicated implicitly. The wireless device 702 performs channel measurement on the indicated NZP CSI-RS resource for channel measurement (step 2408) and performs MU interference measurement on the configured NZP CSI-RS resource for MU interference measurement (step 2410). The wireless device 702 sends results of the measurements to the network node 704, e.g., in one or more reports (step 2412).

Figure 25:
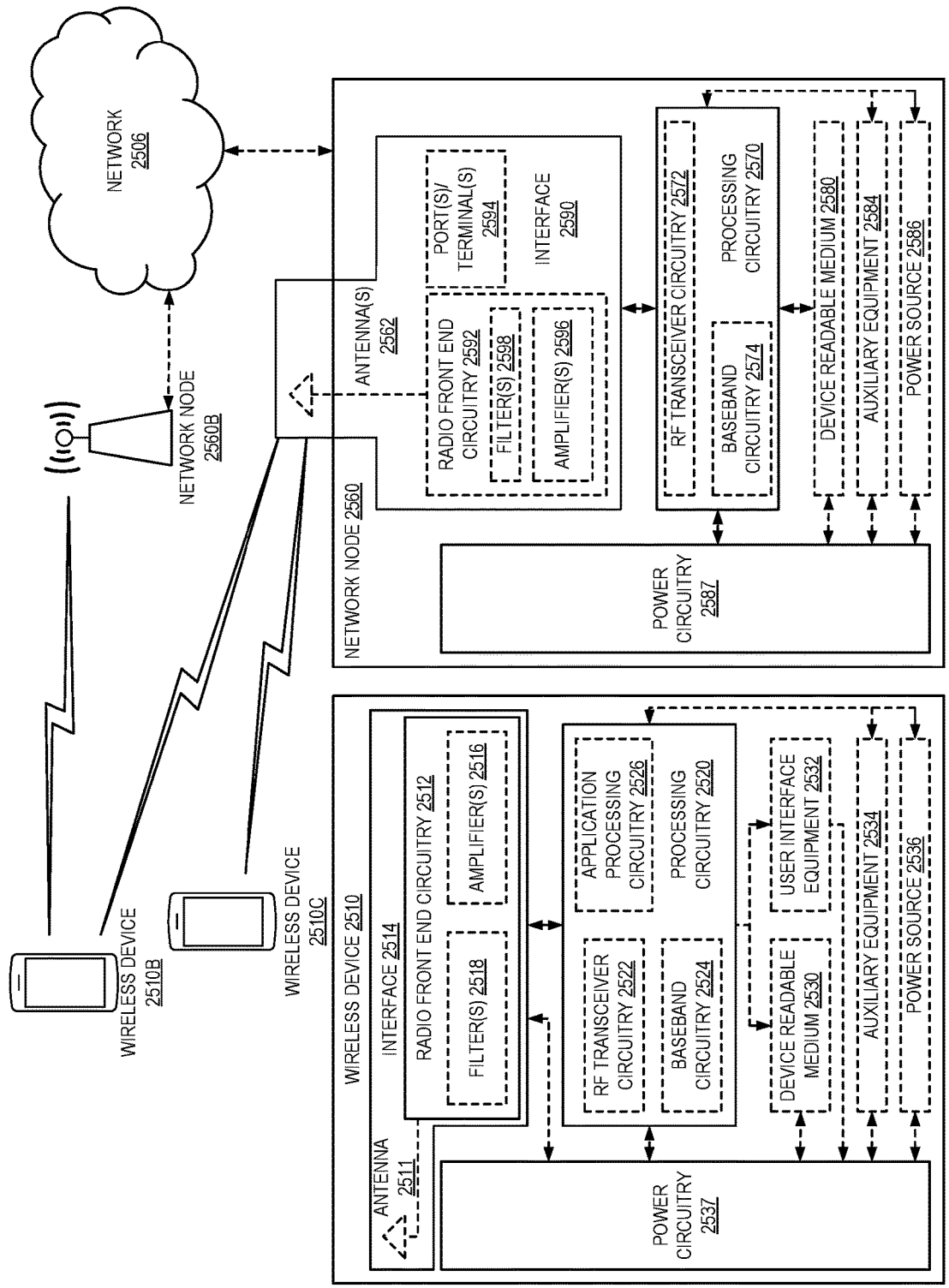
FIG. 25 illustrates an example wireless network in accordance with some embodiments of the present disclosure.

Although the subject matter described herein may be implemented in any appropriate type of system using any suitable components, the embodiments disclosed herein are described in relation to a wireless network, such as the example wireless network illustrated in FIG. 25. For simplicity, the wireless network of FIG. 25 only depicts network 2506, network nodes 2560 and 2560B, and Wireless Devices (WDs) 2510, 2510B, and 2510C. Note that the network nodes 2560 correspond to the network node 704 described above and may operate to provide the functionality of the network node 704 in accordance with any of the embodiments disclosed herein. Likewise, the WDs 2510 correspond to the wireless device 702 described above and may operate to provide the functionality of the wireless device 702 in accordance with any of the embodiments disclosed herein. In practice, a wireless network may further include any additional elements suitable to support communication between wireless devices or between a wireless device and another communication device, such as a landline telephone, a service provider, or any other network node or end device. Of the illustrated components, network node 2560 and WD 2510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2506 may comprise one or more backhaul networks, core networks, Internet Protocol (IP) networks, Public Switched Telephone Networks (PSTNs), packet data networks, optical networks, Wide-Area Networks (WANs), Local Area Networks (LANs), WLANs, wired networks, wireless networks, metropolitan area networks, and other networks to enable communication between devices.

Network node 2560 and WD 2510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (e.g., radio access points), Base Stations (BSs) (e.g., radio base stations, Node Bs, eNBs, and gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or Base Station Controllers (BSCs), Base Transceiver Stations (BTSs), transmission points, transmission nodes, Multi-cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self-Optimized Network (SON) nodes, positioning nodes (e.g., Evolved Serving Mobile Location Centers (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 25, network node 2560 includes processing circuitry 2570, device readable medium 2580, interface 2590, auxiliary equipment 2584, power source 2586, power circuitry 2587, and antenna 2562. Although network node 2560 illustrated in the example wireless network of FIG. 25 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 2560 are depicted as single boxes located within a larger box, or nested within multiple boxes, in practice, a network node may comprise multiple different physical components that make up a single illustrated component (e.g., device readable medium 2580 may comprise multiple separate hard drives as well as multiple Random Access Memory (RAM) modules).

Similarly, network node 2560 may be composed of multiple physically separate components (e.g., a NodeB component and a RNC component, or a BTS component and a BSC component, etc.), which may each have their own respective components. In certain scenarios in which network node 2560 comprises multiple separate components (e.g., BTS and BSC components), one or more of the separate components may be shared among several network nodes. For example, a single RNC may control multiple NodeBs. In such a scenario, each unique NodeB and RNC pair may in some instances be considered a single separate network node. In some embodiments, network node 2560 may be configured to support multiple Radio Access Technologies (RATs). In such embodiments, some components may be duplicated (e.g., separate device readable medium 2580 for the different RATs) and some components may be reused (e.g., the same antenna 2562 may be shared by the RATs). Network node 2560 may also include multiple sets of the various illustrated components for different wireless technologies integrated into network node 2560, such as, for example, GSM, Wide Code Division Multiplexing Access (WCDMA), LTE, NR, WiFi, or Bluetooth wireless technologies. These wireless technologies may be integrated into the same or different chip or set of chips and other components within network node 2560.

Processing circuitry 2570 is configured to perform any determining, calculating, or similar operations (e.g., certain obtaining operations) described herein as being provided by a network node. These operations performed by processing circuitry 2570 may include processing information obtained by processing circuitry 2570 by, for example, converting the obtained information into other information, comparing the obtained information or converted information to information stored in the network node, and/or performing one or more operations based on the obtained information or converted information, and as a result of said processing making a determination.

Processing circuitry 2570 may comprise a combination of one or more of a microprocessor, controller, microcontroller, Central Processing Unit (CPU), Digital Signal Processor (DSP), Application Specific Integrated Circuit (ASIC), Field Programmable Gate Array (FPGA), or any other suitable computing device, resource, or combination of hardware, software, and/or encoded logic operable to provide, either alone or in conjunction with other network node 2560 components, such as device readable medium 2580, network node 2560 functionality. For example, processing circuitry 2570 may execute instructions stored in device readable medium 2580 or in memory within processing circuitry 2570. Such functionality may include providing any of the various wireless features, functions, or benefits discussed herein. In some embodiments, processing circuitry 2570 may include a System on a Chip (SOC).

In some embodiments, processing circuitry 2570 may include one or more of Radio Frequency (RF) transceiver circuitry 2572 and baseband processing circuitry 2574. In some embodiments, RF transceiver circuitry 2572 and baseband processing circuitry 2574 may be on separate chips (or sets of chips), boards, or units, such as radio units and digital units. In alternative embodiments, part or all of RF transceiver circuitry 2572 and baseband processing circuitry 2574 may be on the same chip or set of chips, boards, or units.

In certain embodiments, some or all of the functionality described herein as being provided by a network node, base station, eNB, or other such network device may be performed by processing circuitry 2570 executing instructions stored on device readable medium 2580 or memory within processing circuitry 2570. In alternative embodiments, some or all of the functionality may be provided by processing circuitry 2570 without executing instructions stored on a separate or discrete device readable medium, such as in a hard-wired manner. In any of those embodiments, whether executing instructions stored on a device readable storage medium or not, processing circuitry 2570 can be configured to perform the described functionality. The benefits provided by such functionality are not limited to processing circuitry 2570 alone or to other components of network node 2560, but are enjoyed by network node 2560 as a whole, and/or by end users and the wireless network generally.

Device readable medium 2580 may comprise any form of volatile or non-volatile computer readable memory including, without limitation, persistent storage, solid-state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable, and/or computer-executable memory devices that store information, data, and/or instructions that may be used by processing circuitry 2570. Device readable medium 2580 may store any suitable instructions, data or information, including a computer program, software, an application including one or more of logic, rules, code, tables, etc., and/or other instructions capable of being executed by processing circuitry 2570 and, utilized by network node 2560. Device readable medium 2580 may be used to store any calculations made by processing circuitry 2570 and/or any data received via interface 2590. In some embodiments, processing circuitry 2570 and device readable medium 2580 may be considered to be integrated.

Interface 2590 is used in the wired or wireless communication of signaling and/or data between network node 2560, network 2506, and/or WDs 2510. As illustrated, interface 2590 comprises port(s)/terminal(s) 2594 to send and receive data, for example to and from network 2506 over a wired connection. Interface 2590 also includes radio front end circuitry 2592 that may be coupled to, or in certain embodiments a part of, antenna 2562. Radio front end circuitry 2592 comprises filters 2598 and amplifiers 2596. Radio front end circuitry 2592 may be connected to antenna 2562 and processing circuitry 2570. Radio front end circuitry may be configured to condition signals communicated between antenna 2562 and processing circuitry 2570. Radio front end circuitry 2592 may receive digital data that is to be sent out to other network nodes or WDs via a wireless connection. Radio front end circuitry 2592 may convert the digital data into a radio signal having the appropriate channel and bandwidth parameters using a combination of filters 2598 and/or amplifiers 2596. The radio signal may then be transmitted via antenna 2562. Similarly, when receiving data, antenna 2562 may collect radio signals which are then converted into digital data by radio front end circuitry 2592.

The digital data may be passed to processing circuitry 2570. In other embodiments, the interface may comprise different components and/or different combinations of components.

In certain alternative embodiments, network node 2560 may not include separate radio front end circuitry 2592; instead, processing circuitry 2570 may comprise radio front end circuitry and may be connected to antenna 2562 without separate radio front end circuitry 2592. Similarly, in some embodiments, all or some of RF transceiver circuitry 2572 may be considered a part of interface 2590. In still other embodiments, interface 2590 may include one or more ports or terminals 2594, radio front end circuitry 2592, and RF transceiver circuitry 2572, as part of a radio unit (not shown), and interface 2590 may communicate with baseband processing circuitry 2574, which is part of a digital unit (not shown).

Antenna 2562 may include one or more antennas, or antenna arrays, configured to send and/or receive wireless signals. Antenna 2562 may be coupled to radio front end circuitry 2592 and may be any type of antenna capable of transmitting and receiving data and/or signals wirelessly. In some embodiments, antenna 2562 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, antenna 2562 may be separate from network node 2560 and may be connectable to network node 2560 through an interface or port.

Antenna 2562, interface 2590, and/or processing circuitry 2570 may be configured to perform any receiving operations and/or certain obtaining operations described herein as being performed by a network node. Any information, data, and/or signals may be received from a wireless device, another network node, and/or any other network equipment. Similarly, antenna 2562, interface 2590, and/or processing circuitry 2570 may be configured to perform any transmitting operations described herein as being performed by a network node. Any information, data, and/or signals may be transmitted to a wireless device, another network node, and/or any other network equipment.

Power circuitry 2587 may comprise, or be coupled to, power management circuitry and is configured to supply the components of network node 2560 with power for performing the functionality described herein. Power circuitry 2587 may receive power from power source 2586. Power source 2586 and/or power circuitry 2587 may be configured to provide power to the various components of network node 2560 in a form suitable for the respective components (e.g., at a voltage and current level needed for each respective component). Power source 2586 may either be included in, or external to, power circuitry 2587 and/or network node 2560. For example, network node 2560 may be connectable to an external power source (e.g., an electricity outlet) via an input circuitry or interface such as an electrical cable, whereby the external power source supplies power to power circuitry 2587. As a further example, power source 2586 may comprise a source of power in the form of a battery or battery pack which is connected to, or integrated in, power circuitry 2587. The battery may provide backup power should the external power source fail. Other types of power sources, such as photovoltaic devices, may also be used.

Alternative embodiments of network node 2560 may include additional components beyond those shown in FIG. 25 that may be responsible for providing certain aspects of the network node's functionality, including any of the functionality described herein and/or any functionality necessary to support the subject matter described herein. For example, network node 2560 may include user interface equipment to allow input of information into network node 2560 and to allow output of information from network node 2560. This may allow a user to perform diagnostic, maintenance, repair, and other administrative functions for network node 2560.

As used herein, WD refers to a device capable, configured, arranged, and/or operable to communicate wirelessly with network nodes and/or other wireless devices. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice-Over IP (VoIP) phone, a wireless local loop phone, a desktop computer, a Personal Digital Assistant (PDA), a wireless cameras, a gaming console or device, a music storage device, a playback appliance, a wearable terminal device, a wireless endpoint, a mobile station, a tablet, a laptop, a Laptop Embedded Equipment (LEE), a Laptop Mounted Equipment (LME), a smart device, a wireless Customer Premise Equipment (CPE), a vehicle-mounted wireless terminal device, etc. A WD may support Device-to-Device (D2D) communication, for example by implementing a 3GPP standard for sidelink communication, Vehicle-to-Vehicle (V2V), Vehicle-to-Infrastructure (V2I), Vehicle-to-Everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g. refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2510 includes antenna 2511, interface 2514, processing circuitry 2520, device readable medium 2530, user interface equipment 2532, auxiliary equipment 2534, power source 2536, and power circuitry 2537. WD 2510 may include multiple sets of one or more of the illustrated components for different wireless technologies supported by WD 2510, such as, for example, GSM, WCDMA, LTE, NR, WiFi, WiMax, or Bluetooth wireless technologies, just to mention a few. These wireless technologies may be integrated into the same or different chips or set of chips as other components within WD 2510.

Antenna 2511 may include one or more antennas or antenna arrays, configured to send and/or receive wireless signals, and is connected to interface 2514. In certain alternative embodiments, antenna 2511 may be separate from WD 2510 and be connectable to WD 2510 through an interface or port. Antenna 2511, interface 2514, and/or processing circuitry 2520 may be configured to perform any receiving or transmitting operations described herein as being performed by a WD. Any information, data and/or signals may be received from a network node and/or another WD. In some embodiments, radio front end circuitry and/or antenna 2511 may be considered an interface.

As illustrated, interface 2514 comprises radio front end circuitry 2512 and antenna 2511. Radio front end circuitry 2512 comprise one or more filters 2518 and amplifiers 2516. Radio front end circuitry 2512 is connected to antenna 2511 and processing circuitry 2520, and is configured to condition signals communicated between antenna 2511 and processing circuitry 2520. Radio front end circuitry 2512 may be coupled to or a part of antenna 2511. In some embodiments, WD 2510 may not include separate radio front end circuitry 2512; rather, processing circuitry 2520 may comprise radio front end circuitry and may be connected to antenna 2511. Similarly, in some embodiments, some or all of RF transceiver circuitry 2522 may be considered a part of interface 2514. Radio front end circuitry 2512 may receive digital data that is to be sent out to other network nodes or WDs via a wireless connection. Radio front end circuitry 2512 may convert the digital data into a radio signal having the appropriate channel and bandwidth parameters using a combination of filters 2518 and/or amplifiers 2516. The radio signal may then be transmitted via antenna 2511. Similarly, when receiving data, antenna 2511 may collect radio signals which are then converted into digital data by radio front end circuitry 2512. The digital data may be passed to processing circuitry 2520. In other embodiments, the interface may comprise different components and/or different combinations of components.

Processing circuitry 2520 may comprise a combination of one or more of a microprocessor, controller, microcontroller, CPU, DSP, ASIC, FPGA, or any other suitable computing device, resource, or combination of hardware, software, and/or encoded logic operable to provide, either alone or in conjunction with other WD 2510 components, such as device readable medium 2530, WD 2510 functionality. Such functionality may include providing any of the various wireless features or benefits discussed herein. For example, processing circuitry 2520 may execute instructions stored in device readable medium 2530 or in memory within processing circuitry 2520 to provide the functionality disclosed herein.

As illustrated, processing circuitry 2520 includes one or more of RF transceiver circuitry 2522, baseband processing circuitry 2524, and application processing circuitry 2526. In other embodiments, the processing circuitry may comprise different components and/or different combinations of components. In certain embodiments processing circuitry 2520 of WD 2510 may comprise a SOC. In some embodiments, RF transceiver circuitry 2522, baseband processing circuitry 2524, and application processing circuitry 2526 may be on separate chips or sets of chips. In alternative embodiments, part or all of baseband processing circuitry 2524 and application processing circuitry 2526 may be combined into one chip or set of chips, and RF transceiver circuitry 2522 may be on a separate chip or set of chips. In still alternative embodiments, part or all of RF transceiver circuitry 2522 and baseband processing circuitry 2524 may be on the same chip or set of chips, and application processing circuitry 2526 may be on a separate chip or set of chips. In yet other alternative embodiments, part or all of RF transceiver circuitry 2522, baseband processing circuitry 2524, and application processing circuitry 2526 may be combined in the same chip or set of chips. In some embodiments, RF transceiver circuitry 2522 may be a part of interface 2514. RF transceiver circuitry 2522 may condition RF signals for processing circuitry 2520.

In certain embodiments, some or all of the functionality described herein as being performed by a WD may be provided by processing circuitry 2520 executing instructions stored on device readable medium 2530, which in certain embodiments may be a computer-readable storage medium. In alternative embodiments, some or all of the functionality may be provided by processing circuitry 2520 without executing instructions stored on a separate or discrete device readable storage medium, such as in a hard-wired manner. In any of those particular embodiments, whether executing instructions stored on a device readable storage medium or not, processing circuitry 2520 can be configured to perform the described functionality. The benefits provided by such functionality are not limited to processing circuitry 2520 alone or to other components of WD 2510, but are enjoyed by WD 2510 as a whole, and/or by end users and the wireless network generally.

Processing circuitry 2520 may be configured to perform any determining, calculating, or similar operations (e.g., certain obtaining operations) described herein as being performed by a WD. These operations, as performed by processing circuitry 2520, may include processing information obtained by processing circuitry 2520 by, for example, converting the obtained information into other information, comparing the obtained information or converted information to information stored by WD 2510, and/or performing one or more operations based on the obtained information or converted information, and as a result of said processing making a determination.

Device readable medium 2530 may be operable to store a computer program, software, an application including one or more of logic, rules, code, tables, etc. and/or other instructions capable of being executed by processing circuitry 2520. Device readable medium 2530 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by processing circuitry 2520. In some embodiments, processing circuitry 2520 and device readable medium 2530 may be considered to be integrated.

User interface equipment 2532 may provide components that allow for a human user to interact with WD 2510. Such interaction may be of many forms, such as visual, audial, tactile, etc. User interface equipment 2532 may be operable to produce output to the user and to allow the user to provide input to WD 2510. The type of interaction may vary depending on the type of user interface equipment 2532 installed in WD 2510. For example, if WD 2510 is a smart phone, the interaction may be via a touch screen; if WD 2510 is a smart meter, the interaction may be through a screen that provides usage (e.g., the number of gallons used) or a speaker that provides an audible alert (e.g., if smoke is detected). User interface equipment 2532 may include input interfaces, devices and circuits, and output interfaces, devices and circuits. User interface equipment 2532 is configured to allow input of information into WD 2510, and is connected to processing circuitry 2520 to allow processing circuitry 2520 to process the input information. User interface equipment 2532 may include, for example, a microphone, a proximity or other sensor, keys/buttons, a touch display, one or more cameras, a Universal Serial Bus (USB) port, or other input circuitry. User interface equipment 2532 is also configured to allow output of information from WD 2510, and to allow processing circuitry 2520 to output information from WD 2510. User interface equipment 2532 may include, for example, a speaker, a display, vibrating circuitry, a USB port, a headphone interface, or other output circuitry. Using one or more input and output interfaces, devices, and circuits, of user interface equipment 2532, WD 2510 may communicate with end users and/or the wireless network, and allow them to benefit from the functionality described herein.

Auxiliary equipment 2534 is operable to provide more specific functionality which may not be generally performed by WDs. This may comprise specialized sensors for doing measurements for various purposes, interfaces for additional types of communication such as wired communications, etc. The inclusion and type of components of auxiliary equipment 2534 may vary depending on the embodiment and/or scenario.

Power source 2536 may, in some embodiments, be in the form of a battery or battery pack. Other types of power sources, such as an external power source (e.g., an electricity outlet), photovoltaic devices or power cells, may also be used. WD 2510 may further comprise power circuitry 2537 for delivering power from power source 2536 to the various parts of WD 2510 which need power from power source 2536 to carry out any functionality described or indicated herein. Power circuitry 2537 may in certain embodiments comprise power management circuitry. Power circuitry 2537 may additionally or alternatively be operable to receive power from an external power source; in which case WD 2510 may be connectable to the external power source (such as an electricity outlet) via input circuitry or an interface such as an electrical power cable. Power circuitry 2537 may also in certain embodiments be operable to deliver power from an external power source to power source 2536. This may be, for example, for the charging of power source 2536. Power circuitry 2537 may perform any formatting, converting, or other modification to the power from power source 2536 to make the power suitable for the respective components of WD 2510 to which power is supplied.

Figure 26:
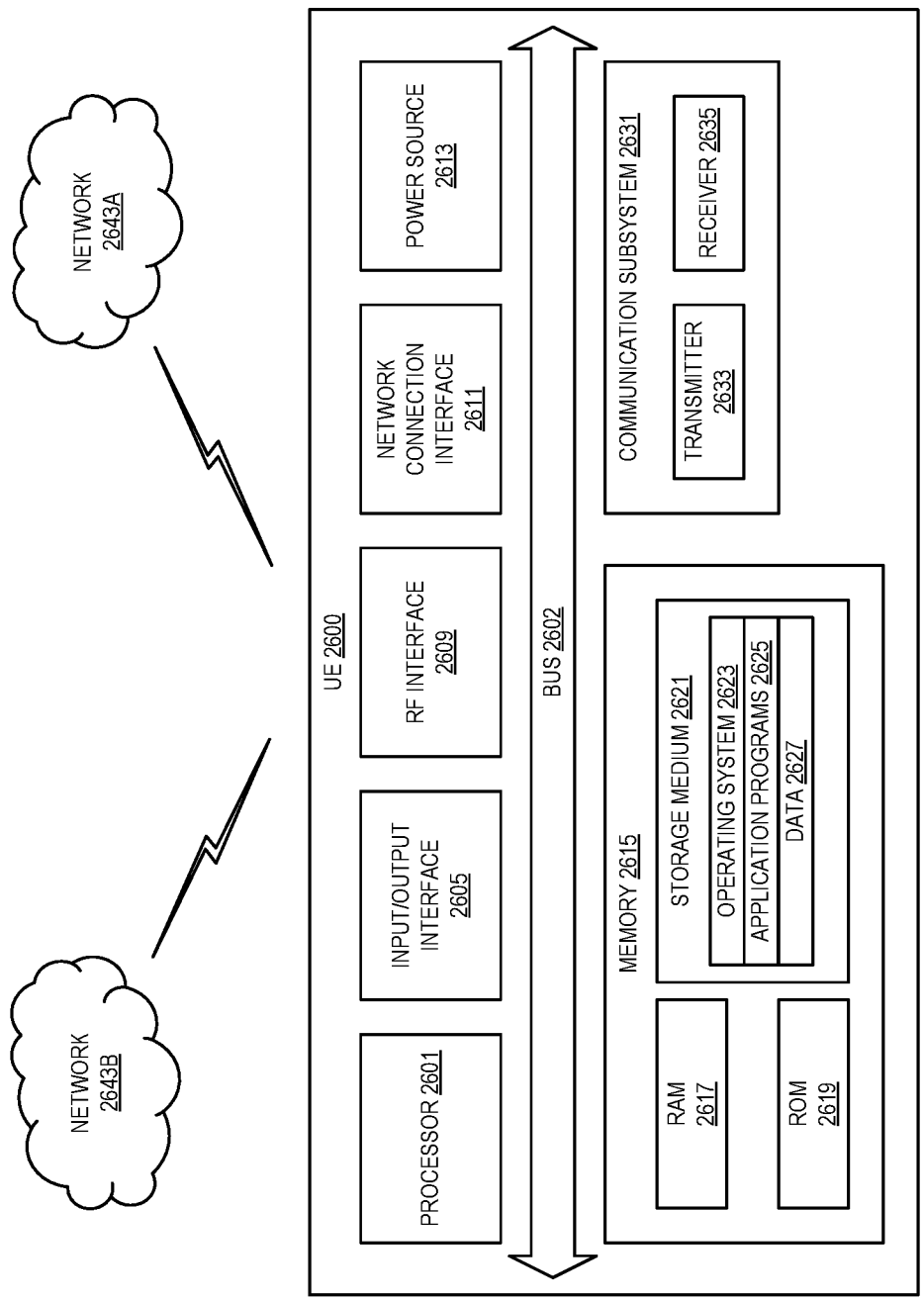
FIG. 26 illustrates an example UE in accordance with some embodiments of the present disclosure.

FIG. 26 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2600 may be any UE identified by the 3GPP, including a NB-IoT UE, a MTC UE, and/or an enhanced MTC (eMTC) UE. UE 2600, as illustrated in FIG. 26, is one example of a WD configured for communication in accordance with one or more communication standards promulgated by the 3GPP, such as 3GPP's GSM, UMTS, LTE, and/or 5G standards. As mentioned previously, the term WD and UE may be used interchangeably. Accordingly, although FIG. 26 is a UE, the components discussed herein are equally applicable to a WD, and vice-versa.

In FIG. 26, UE 2600 includes processing circuitry 2601 that is operatively coupled to input/output interface 2605, RF interface 2609, network connection interface 2611, memory 2615 including RAM 2617, ROM 2619, and storage medium 2621 or the like, communication subsystem 2631, power source 2613, and/or any other component, or any combination thereof. Storage medium 2621 includes operating system 2623, application program 2625, and data 2627. In other embodiments, storage medium 2621 may include other similar types of information. Certain UEs may utilize all of the components shown in FIG. 26, or only a subset of the components. The level of integration between the components may vary from one UE to another UE. Further, certain UEs may contain multiple instances of a component, such as multiple processors, memories, transceivers, transmitters, receivers, etc.

In FIG. 26, processing circuitry 2601 may be configured to process computer instructions and data. Processing circuitry 2601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or DSP, together with appropriate software; or any combination of the above. For example, the processing circuitry 2601 may include two CPUs. Data may be information in a form suitable for use by a computer.

In the depicted embodiment, input/output interface 2605 may be configured to provide a communication interface to an input device, output device, or input and output device. UE 2600 may be configured to use an output device via input/output interface 2605. An output device may use the same type of interface port as an input device. For example, a USB port may be used to provide input to and output from UE 2600. The output device may be a speaker, a sound card, a video card, a display, a monitor, a printer, an actuator, an emitter, a smartcard, another output device, or any combination thereof. UE 2600 may be configured to use an input device via input/output interface 2605 to allow a user to capture information into UE 2600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 26, RF interface 2609 may be configured to provide a communication interface to RF components such as a transmitter, a receiver, and an antenna. Network connection interface 2611 may be configured to provide a communication interface to network 2643A. Network 2643A may encompass wired and/or wireless networks such as a LAN, a WAN, a computer network, a wireless network, a telecommunications network, another like network or any combination thereof. For example, network 2643A may comprise a Wi-Fi network. Network connection interface 2611 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. Network connection interface 2611 may implement receiver and transmitter functionality appropriate to the communication network links (e.g., optical, electrical, and the like). The transmitter and receiver functions may share circuit components, software or firmware, or alternatively may be implemented separately.

RAM 2617 may be configured to interface via bus 2602 to processing circuitry 2601 to provide storage or caching of data or computer instructions during the execution of software programs such as the operating system, application programs, and device drivers. ROM 2619 may be configured to provide computer instructions or data to processing circuitry 2601. For example, ROM 2619 may be configured to store invariant low-level system code or data for basic system functions such as basic input and output (I/O), startup, or reception of keystrokes from a keyboard that are stored in a non-volatile memory. Storage medium 2621 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, storage medium 2621 may be configured to include operating system 2623, application program 2625 such as a web browser application, a widget or gadget engine or another application, and data file 2627. Storage medium 2621 may store, for use by UE 2600, any of a variety of various operating systems or combinations of operating systems.

Storage medium 2621 may be configured to include a number of physical drive units, such as Redundant Array of Independent Disks (RAID), floppy disk drive, flash memory, USB flash drive, external hard disk drive, thumb drive, pen drive, key drive, High-Density DVD (HD-DVD) optical disc drive, internal hard disk drive, Blu-Ray optical disc drive, Holographic Digital Data Storage (HDDS) optical disc drive, external mini-Dual In-line Memory Module (DIMM), Synchronous Dynamic RAM (SDRAM), external micro-DIMM SDRAM, smartcard memory such as a Subscriber Identity Module or a Removable User Identity Module (SIM/RUIM), other memory, or any combination thereof. Storage medium 2621 may allow UE 2600 to access computer-executable instructions, application programs or the like, stored on transitory or non-transitory memory media, to off-load data, or to upload data. An article of manufacture, such as one utilizing a communication system may be tangibly embodied in storage medium 2621, which may comprise a device readable medium.

In FIG. 26, processing circuitry 2601 may be configured to communicate with network 2643B using communication subsystem 2631. Network 2643A and network 2643B may be the same network or networks or different network or networks. Communication subsystem 2631 may be configured to include one or more transceivers used to communicate with network 2643B. For example, communication subsystem 2631 may be configured to include one or more transceivers used to communicate with one or more remote transceivers of another device capable of wireless communication such as another WD, UE, or base station of a RAN according to one or more communication protocols, such as IEEE 802.24, Code Division Multiple Access (CDMA), WCDMA, GSM, LTE, Universal Terrestrial Radio Access Network (UTRAN), WiMax, or the like. Each transceiver may include transmitter 2633 and/or receiver 2635 to implement transmitter or receiver functionality, respectively, appropriate to the RAN links (e.g., frequency allocations and the like). Further, transmitter 2633 and receiver 2635 of each transceiver may share circuit components, software or firmware, or alternatively may be implemented separately.

In the illustrated embodiment, the communication functions of communication subsystem 2631 may include data communication, voice communication, multimedia communication, short-range communications such as Bluetooth, near-field communication, location-based communication such as the use of the Global Positioning System (GPS) to determine a location, another like communication function, or any combination thereof. For example, communication subsystem 2631 may include cellular communication, WiFi communication, Bluetooth communication, and GPS communication. Network 2643B may encompass wired and/or wireless networks such as a LAN, a WAN, a computer network, a wireless network, a telecommunications network, another like network or any combination thereof. For example, network 2643B may be a cellular network, a WiFi network, and/or a near-field network. Power source 2613 may be configured to provide Alternating Current (AC) or Direct Current (DC) power to components of UE 2600.

The features, benefits, and/or functions described herein may be implemented in one of the components of UE 2600 or partitioned across multiple components of UE 2600. Further, the features, benefits, and/or functions described herein may be implemented in any combination of hardware, software, or firmware. In one example, communication subsystem 2631 may be configured to include any of the components described herein. Further, processing circuitry 2601 may be configured to communicate with any of such components over bus 2602. In another example, any of such components may be represented by program instructions stored in memory that when executed by processing circuitry 2601 perform the corresponding functions described herein. In another example, the functionality of any of such components may be partitioned between processing circuitry 2601 and communication subsystem 2631. In another example, the non-computationally intensive functions of any of such components may be implemented in software or firmware and the computationally intensive functions may be implemented in hardware.

Figure 27:
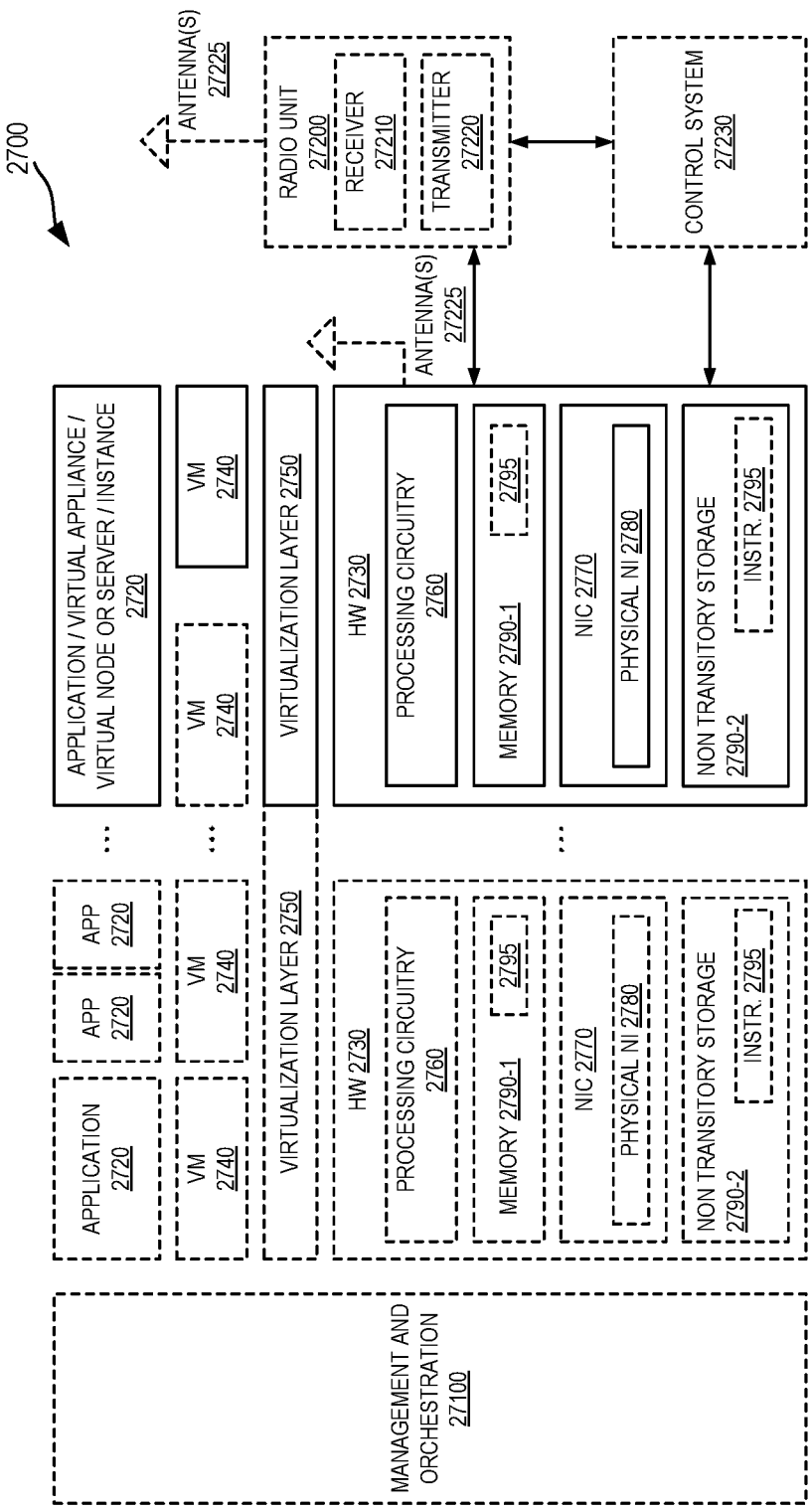
FIG. 27 illustrates a virtualization environment in accordance with some embodiments of the present disclosure.

FIG. 27 is a schematic block diagram illustrating a virtualization environment 2700 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 2700 hosted by one or more of hardware nodes 2730. Further, in embodiments in which the virtual node is not a radio access node or does not require radio connectivity (e.g., a core network node), then the network node may be entirely virtualized.

The functions may be implemented by one or more applications 2720 (which may alternatively be called software instances, virtual appliances, network functions, virtual nodes, virtual network functions, etc.) operative to implement some of the features, functions, and/or benefits of some of the embodiments disclosed herein. Applications 2720 are run in virtualization environment 2700 which provides hardware 2730 comprising processing circuitry 2760 and memory 2790. Memory 2790 contains instructions 2795 executable by processing circuitry 2760 whereby application 2720 is operative to provide one or more of the features, benefits, and/or functions disclosed herein.

Virtualization environment 2700, comprises general-purpose or special-purpose network hardware devices 2730 comprising a set of one or more processors or processing circuitry 2760, which may be Commercial Off-the-Shelf (COTS) processors, dedicated ASICs, or any other type of processing circuitry including digital or analog hardware components or special purpose processors. Each hardware device may comprise memory 2790-1 which may be non-persistent memory for temporarily storing instructions 2795 or software executed by processing circuitry 2760. Each hardware device may comprise one or more Network Interface Controllers (NICs) 2770, also known as network interface cards, which include physical network interface 2780. Each hardware device may also include non-transitory, persistent, machine-readable storage media 2790-2 having stored therein software 2795 and/or instructions executable by processing circuitry 2760. Software 2795 may include any type of software including software for instantiating one or more virtualization layers 2750 (also referred to as hypervisors), software to execute virtual machines 2740 as well as software allowing it to execute functions, features, and/or benefits described in relation with some embodiments described herein.

Virtual machines 2740 comprise virtual processing, virtual memory, virtual networking or interface, and virtual storage, and may be run by a corresponding virtualization layer 2750 or hypervisor. Different embodiments of the instance of virtual appliance 2720 may be implemented on one or more of virtual machines 2740, and the implementations may be made in different ways.

During operation, processing circuitry 2760 executes software 2795 to instantiate the hypervisor or virtualization layer 2750, which may sometimes be referred to as a Virtual Machine Monitor (VMM). Virtualization layer 2750 may present a virtual operating platform that appears like networking hardware to virtual machine 2740.

As shown in FIG. 27, hardware 2730 may be a standalone network node with generic or specific components. Hardware 2730 may comprise antenna 27225 and may implement some functions via virtualization. Alternatively, hardware 2730 may be part of a larger cluster of hardware (e.g., such as in a data center or CPE) where many hardware nodes work together and are managed via Management and Orchestration (MANO) 27100, which, among others, oversees lifecycle management of applications 2720.

Virtualization of the hardware is in some contexts referred to as Network Function Virtualization (NFV). NFV may be used to consolidate many network equipment types onto industry standard high volume server hardware, physical switches, and physical storage, which can be located in data centers, and CPE.

In the context of NFV, virtual machine 2740 may be a software implementation of a physical machine that runs programs as if they were executing on a physical, non-virtualized machine. Each of virtual machines 2740, and that part of hardware 2730 that executes that virtual machine, be it hardware dedicated to that virtual machine and/or hardware shared by that virtual machine with others of the virtual machines 2740, forms a separate Virtual Network Elements (VNE).

Still in the context of NFV, Virtual Network Function (VNF) is responsible for handling specific network functions that run in one or more virtual machines 2740 on top of hardware networking infrastructure 2730 and corresponds to application 2720 in FIG. 27.

In some embodiments, one or more radio units 27200 that each include one or more transmitters 27220 and one or more receivers 27210 may be coupled to one or more antennas 27225. Radio units 27200 may communicate directly with hardware nodes 2730 via one or more appropriate network interfaces and may be used in combination with the virtual components to provide a virtual node with radio capabilities, such as a radio access node or a base station.

In some embodiments, some signaling can be effected with the use of control system 27230 which may alternatively be used for communication between the hardware nodes 2730 and radio units 27200.

Figure 28:
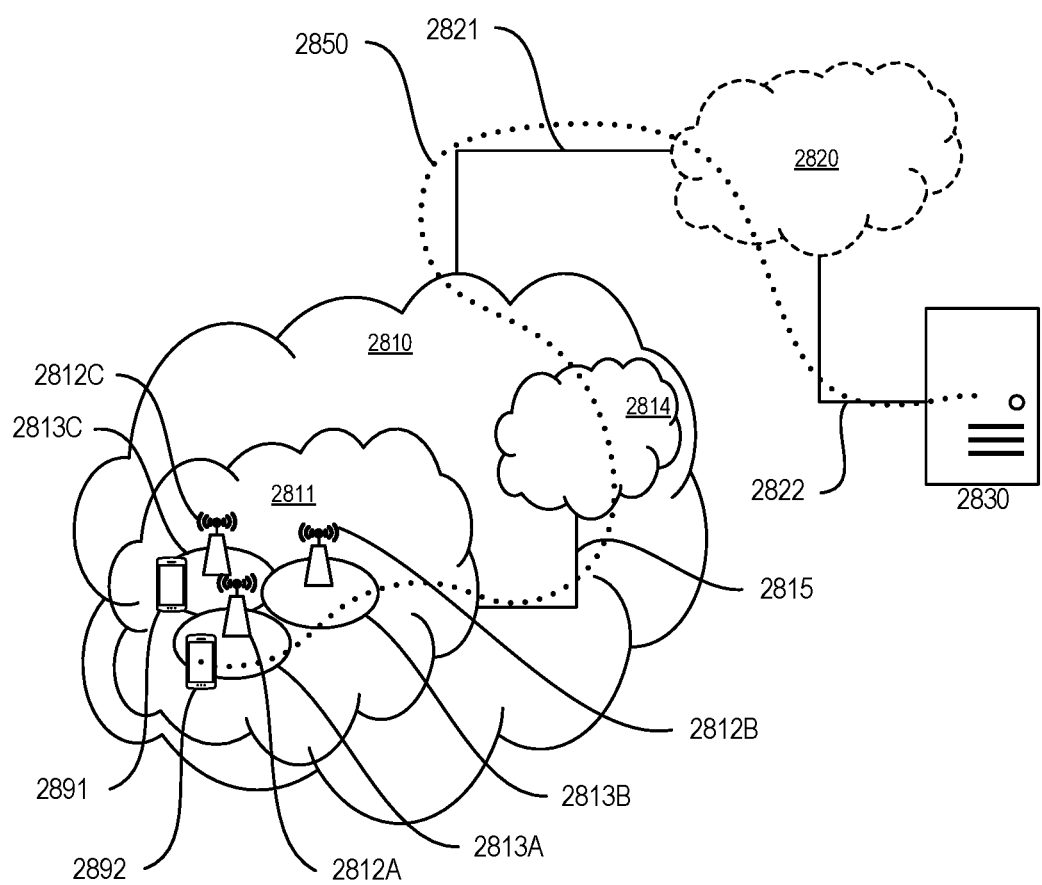
FIG. 28 illustrates a telecommunication network connected via an intermediate network to a host computer in accordance with some embodiments of the present disclosure.

With reference to FIG. 28, in accordance with an embodiment, a communication system includes telecommunication network 2810, such as a 3GPP-type cellular network, which comprises access network 2811, such as a radio access network, and core network 2814. Access network 2811 comprises a plurality of base stations 2812A, 2812B, 2812C, such as NBs, eNBs, gNBs, or other types of wireless access points, each defining a corresponding coverage area 2813A, 2813B, 2813C. Each base station 2812A, 2812B, 2812C is connectable to core network 2814 over a wired or wireless connection 2815. A first UE 2891 located in coverage area 2813c is configured to wirelessly connect to, or be paged by, the corresponding base station 2812C. A second UE 2892 in coverage area 2813A is wirelessly connectable to the corresponding base station 2812A. While a plurality of UEs 2891, 2892 are illustrated in this example, the disclosed embodiments are equally applicable to a situation where a sole UE is in the coverage area or where a sole UE is connecting to the corresponding base station 2812.

Telecommunication network 2810 is itself connected to host computer 2830, which may be embodied in the hardware and/or software of a standalone server, a cloud-implemented server, a distributed server, or as processing resources in a server farm. Host computer 2830 may be under the ownership or control of a service provider, or may be operated by the service provider or on behalf of the service provider. Connections 2821 and 2822 between telecommunication network 2810 and host computer 2830 may extend directly from core network 2814 to host computer 2830 or may go via an optional intermediate network 2820. Intermediate network 2820 may be one of, or a combination of more than one of, a public, private, or hosted network; intermediate network 2820, if any, may be a backbone network or the Internet; in particular, intermediate network 2820 may comprise two or more sub-networks (not shown).

The communication system of FIG. 28 as a whole enables connectivity between the connected UEs 2891, 2892 and host computer 2830. The connectivity may be described as an Over-the-Top (OTT) connection 2850. Host computer 2830 and the connected UEs 2891, 2892 are configured to communicate data and/or signaling via OTT connection 2850, using access network 2811, core network 2814, any intermediate network 2820 and possible further infrastructure (not shown) as intermediaries. OTT connection 2850 may be transparent in the sense that the participating communication devices through which OTT connection 2850 passes are unaware of routing of uplink and downlink communications. For example, base station 2812 may not or need not be informed about the past routing of an incoming downlink communication with data originating from host computer 2830 to be forwarded (e.g., handed over) to a connected UE 2891. Similarly, base station 2812 need not be aware of the future routing of an outgoing uplink communication originating from the UE 2891 towards the host computer 2830.

Example implementations, in accordance with an embodiment, of the UE, base station and host computer discussed in the preceding paragraphs will now be described with reference to FIG. 29. In communication system 2900, host computer 2910 comprises hardware 2915 including communication interface 2916 configured to set up and maintain a wired or wireless connection with an interface of a different communication device of communication system 2900. Host computer 2910 further comprises processing circuitry 2918, which may have storage and/or processing capabilities. In particular, processing circuitry 2918 may comprise one or more programmable processors, ASICs, FPGAs, or combinations of these (not shown) adapted to execute instructions. Host computer 2910 further comprises software 2911, which is stored in or accessible by host computer 2910 and executable by processing circuitry 2918. Software 2911 includes host application 2912. Host application 2912 may be operable to provide a service to a remote user, such as UE 2930 connecting via OTT connection 2950 terminating at UE 2930 and host computer 2910. In providing the service to the remote user, host application 2912 may provide user data which is transmitted using OTT connection 2950.

Communication system 2900 further includes base station 2920 provided in a telecommunication system and comprising hardware 2925 enabling it to communicate with host computer 2910 and with UE 2930. Hardware 2925 may include communication interface 2926 for setting up and maintaining a wired or wireless connection with an interface of a different communication device of communication system 2900, as well as radio interface 2927 for setting up and maintaining at least wireless connection 2970 with UE 2930 located in a coverage area (not shown in FIG. 29) served by base station 2920. Communication interface 2926 may be configured to facilitate connection 2960 to host computer 2910. Connection 2960 may be direct or it may pass through a core network (not shown in FIG. 29) of the telecommunication system and/or through one or more intermediate networks outside the telecommunication system. In the embodiment shown, hardware 2925 of base station 2920 further includes processing circuitry 2928, which may comprise one or more programmable processors, ASICs, FPGAs, or combinations of these (not shown) adapted to execute instructions. Base station 2920 further has software 2921 stored internally or accessible via an external connection.

Communication system 2900 further includes UE 2930 already referred to. Its hardware 2935 may include radio interface 2937 configured to set up and maintain wireless connection 2970 with a base station serving a coverage area in which UE 2930 is currently located. Hardware 2935 of UE 2930 further includes processing circuitry 2938, which may comprise one or more programmable processors, ASICs, FPGAs, or combinations of these (not shown) adapted to execute instructions. UE 2930 further comprises software 2931, which is stored in or accessible by UE 2930 and executable by processing circuitry 2938. Software 2931 includes client application 2932. Client application 2932 may be operable to provide a service to a human or non-human user via UE 2930, with the support of host computer 2910. In host computer 2910, an executing host application 2912 may communicate with the executing client application 2932 via OTT connection 2950 terminating at UE 2930 and host computer 2910. In providing the service to the user, client application 2932 may receive request data from host application 2912 and provide user data in response to the request data. OTT connection 2950 may transfer both the request data and the user data. Client application 2932 may interact with the user to generate the user data that it provides.

Figure 29:
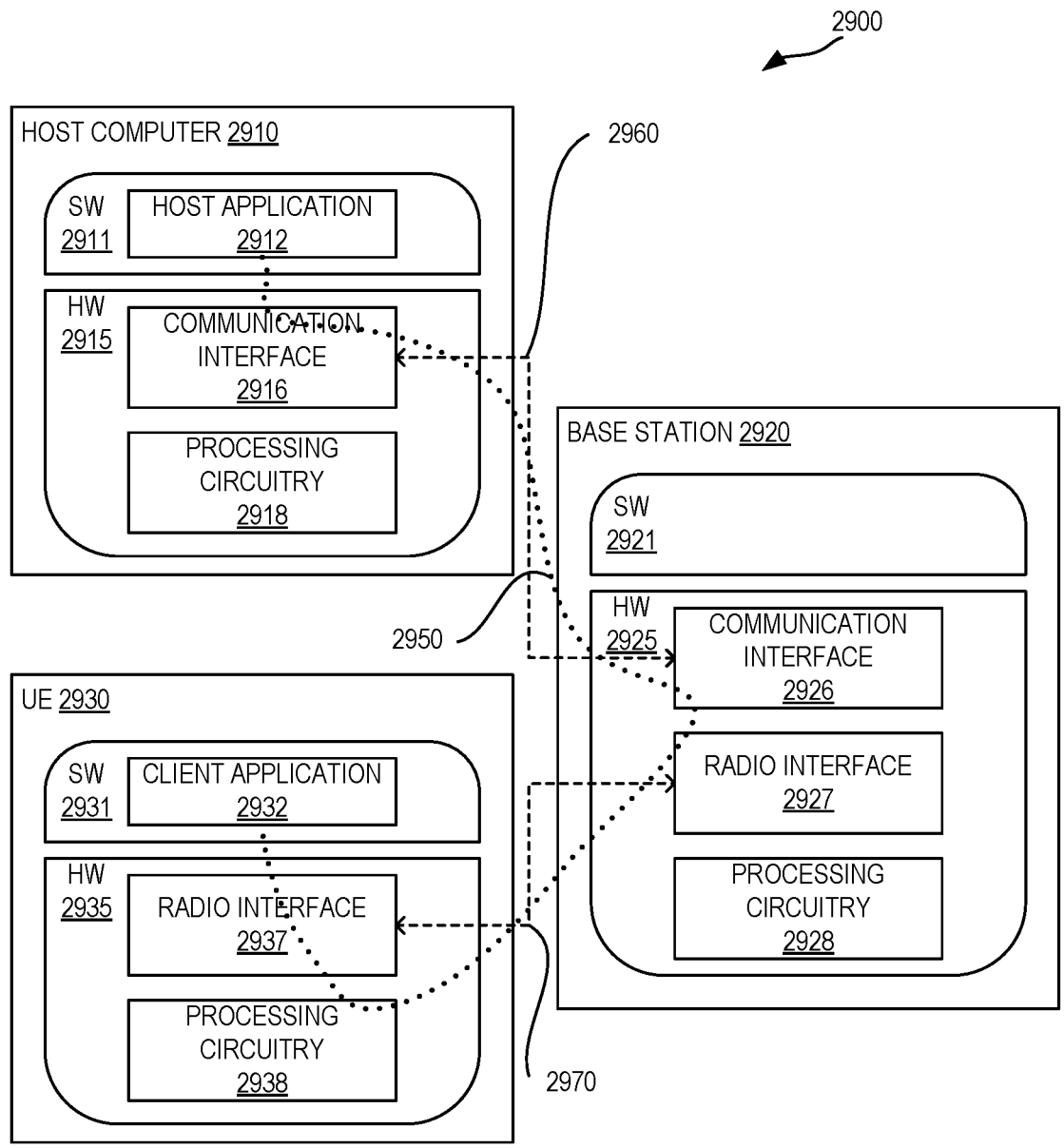
FIG. 29 illustrates a host computer communicating via a base station with a UE over a partially wireless connection in accordance with some embodiments of the present disclosure.

It is noted that host computer 2910, base station 2920, and UE 2930 illustrated in FIG. 29 may be similar or identical to host computer 2830, one of base stations 2812A, 28128, 2812C and one of UEs 2891, 2892 of FIG. 28, respectively. This is to say, the inner workings of these entities may be as shown in FIG. 29 and independently, the surrounding network topology may be that of FIG. 28.

In FIG. 29, OTT connection 2950 has been drawn abstractly to illustrate the communication between host computer 2910 and UE 2930 via base station 2920, without explicit reference to any intermediary devices and the precise routing of messages via these devices. Network infrastructure may determine the routing, which it may be configured to hide from UE 2930 or from the service provider operating host computer 2910, or both. While OTT connection 2950 is active, the network infrastructure may further take decisions by which it dynamically changes the routing (e.g., on the basis of load balancing consideration or reconfiguration of the network).

Wireless connection 2970 between UE 2930 and base station 2920 is in accordance with the teachings of the embodiments described throughout this disclosure. One or more of the various embodiments improve the performance of OTT services provided to UE 2930 using OTT connection 2950, in which wireless connection 2970 forms the last segment. More precisely, the teachings of these embodiments may improve the throughput (via reduced overhead) and thereby provide benefits such as improved user experience.

A measurement procedure may be provided for the purpose of monitoring data rate, latency, and other factors on which the one or more embodiments improve. There may further be an optional network functionality for reconfiguring OTT connection 2950 between host computer 2910 and UE 2930, in response to variations in the measurement results. The measurement procedure and/or the network functionality for reconfiguring OTT connection 2950 may be implemented in software 2911 and hardware 2915 of host computer 2910 or in software 2931 and hardware 2935 of UE 2930, or both. In embodiments, sensors (not shown) may be deployed in or in association with communication devices through which OTT connection 2950 passes; the sensors may participate in the measurement procedure by supplying values of the monitored quantities exemplified above, or supplying values of other physical quantities from which software 2911, 2931 may compute or estimate the monitored quantities. The reconfiguring of OTT connection 2950 may include message format, retransmission settings, preferred routing, etc.; the reconfiguring need not affect base station 2920, and it may be unknown or imperceptible to base station 2920. Such procedures and functionalities may be known and practiced in the art. In certain embodiments, measurements may involve proprietary UE signaling facilitating host computer 2910's measurements of throughput, propagation times, latency, and the like. The measurements may be implemented in that software 2911 and 2931 causes messages to be transmitted, in particular empty or 'dummy' messages, using OTT connection 2950 while it monitors propagation times, errors, etc.

Figures 30, 31:
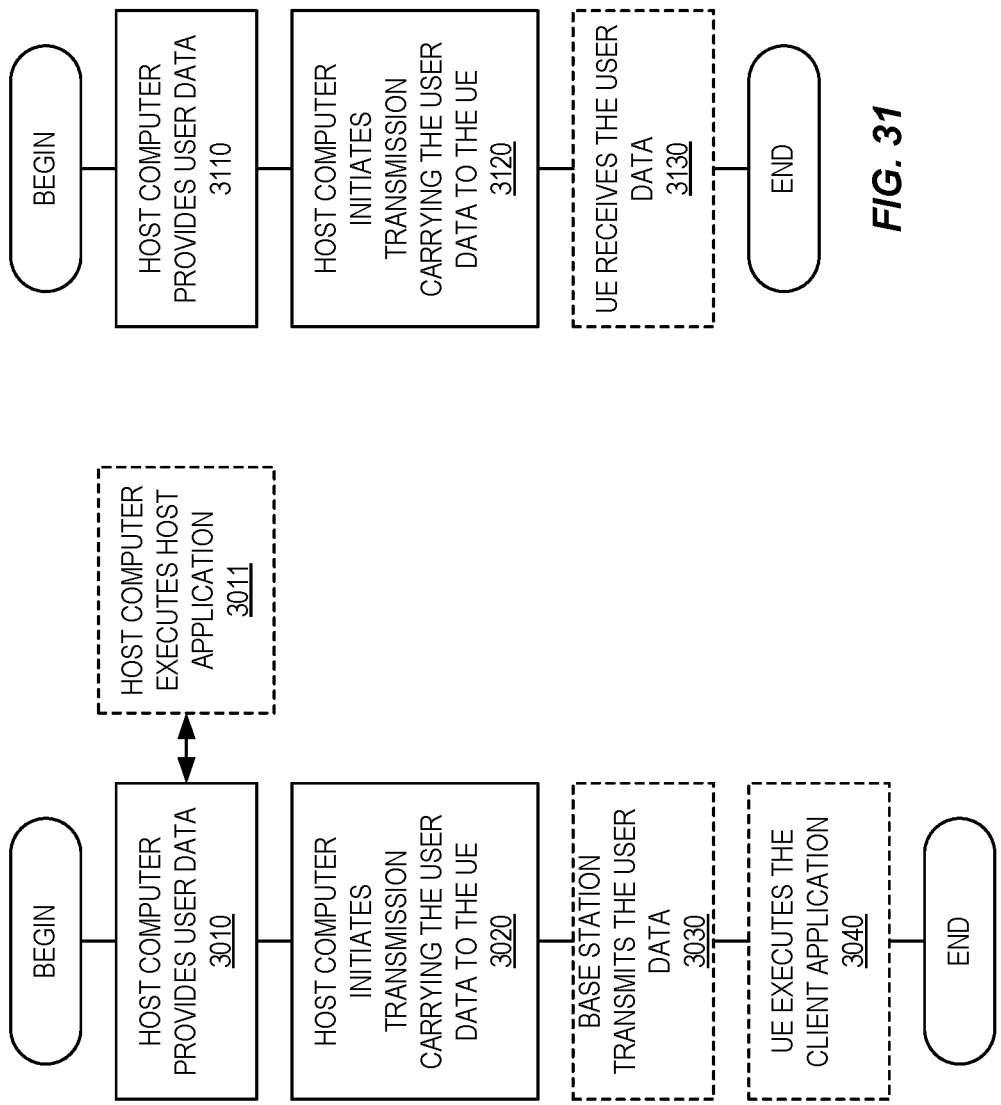
FIG. 30 is a flow chart that illustrates methods implemented in a communication system including a host computer, a base station, and a UE in accordance with some embodiments of the present disclosure.
FIG. 31 is a flow chart that illustrates methods implemented in a communication system including a host computer, a base station, and a UE in accordance with some embodiments of the present disclosure.

FIG. 30 is a flowchart illustrating a method implemented in a communication system, in accordance with one embodiment. The communication system includes a host computer, a base station, and a UE which may be those described with reference to FIGS. 28 and 29. For simplicity of the present disclosure, only drawing references to FIG. 30 will be included in this section. In step 3010, the host computer provides user data. In substep 3011 (which may be optional) of step 3010, the host computer provides the user data by executing a host application. In step 3020, the host computer initiates a transmission carrying the user data to the UE. In step 3030 (which may be optional), the base station transmits to the UE the user data which was carried in the transmission that the host computer initiated, in accordance with the teachings of the embodiments described throughout this disclosure. In step 3040 (which may also be optional), the UE executes a client application associated with the host application executed by the host computer.

FIG. 31 is a flowchart illustrating a method implemented in a communication system, in accordance with one embodiment. The communication system includes a host computer, a base station, and a UE which may be those described with reference to FIGS. 28 and 29. For simplicity of the present disclosure, only drawing references to FIG. 31 will be included in this section. In step 3110 of the method, the host computer provides user data. In an optional substep (not shown) the host computer provides the user data by executing a host application. In step 3120, the host computer initiates a transmission carrying the user data to the UE. The transmission may pass via the base station, in accordance with the teachings of the embodiments described throughout this disclosure. In step 3130 (which may be optional), the UE receives the user data carried in the transmission.

FIG. 32 is a flowchart illustrating a method implemented in a communication system, in accordance with one embodiment. The communication system includes a host computer, a base station, and a UE which may be those described with reference to FIGS. 28 and 29. For simplicity of the present disclosure, only drawing references to FIG. 32 will be included in this section. In step 3210 (which may be optional), the UE receives input data provided by the host computer. Additionally or alternatively, in step 3220, the UE provides user data. In substep 3221 (which may be optional) of step 3220, the UE provides the user data by executing a client application. In substep 3211 (which may be optional) of step 3210, the UE executes a client application which provides the user data in reaction to the received input data provided by the host computer. In providing the user data, the executed client application may further consider user input received from the user. Regardless of the specific manner in which the user data was provided, the UE initiates, in substep 3230 (which may be optional), transmission of the user data to the host computer. In step 3240 of the method, the host computer receives the user data transmitted from the UE, in accordance with the teachings of the embodiments described throughout this disclosure.

FIG. 33 is a flowchart illustrating a method implemented in a communication system, in accordance with one embodiment. The communication system includes a host computer, a base station, and a UE which may be those described with reference to FIGS. 28 and 29. For simplicity of the present disclosure, only drawing references to FIG. 33 will be included in this section. In step 3310 (which may be optional), in accordance with the teachings of the embodiments described throughout this disclosure, the base station receives user data from the UE. In step 3320 (which may be optional), the base station initiates transmission of the received user data to the host computer. In step 3330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 34:
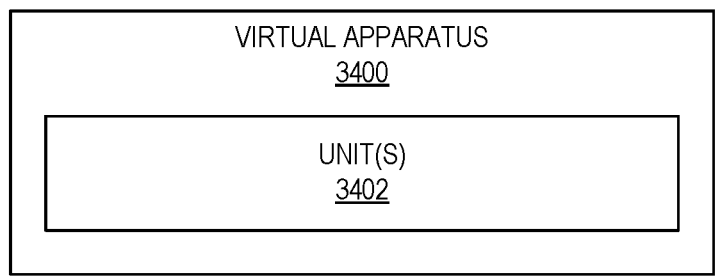
FIG. 34 illustrates a virtualization apparatus in accordance with some embodiments of the present disclosure.

FIG. 34 illustrates a schematic block diagram of an apparatus 3400 in a wireless network (for example, the wireless network shown in FIG. 25). The apparatus may be implemented in a wireless device or network node (e.g., wireless device 2510 or network node 2560 shown in FIG. 25). Apparatus 3400 is operable to carry out the example method described with reference to FIGS. 15, 17, 21, and/or 22 and possibly any other processes or methods disclosed herein. It is also to be understood that the method of FIGS. 15, 17, 21, and/or 22 are not necessarily carried out solely by apparatus 3400. At least some operations of the method can be performed by one or more other entities.

Virtual Apparatus 3400 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the apparatus 3400 is the network node 704, and the processing circuitry may be used to cause one or more units 3402 to perform the functions of the network node 704 described above with respect to FIGS. 15, 17, 21, and/or 22. In some other implementations, the apparatus 3400 is the wireless device 702, and the processing circuitry may be used to cause one or more units to perform the functions of the wireless device 702 described above with respect to FIGS. 15, 17, 21, and/or 22. The processing circuitry may be used to cause any other suitable units of apparatus 3400 to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The following is a description of some non-limiting embodiments of the present disclosure.

GROUP A EMBODIMENTS

Embodiment 1

A method performed by a wireless device for performing measurements in a wireless communication system, the method comprising: receiving an indication from a network node for channel measurement and Multiple User, MU, interference measurement; and performing channel measurements and MU interference measurements in accordance with the indication.

Embodiment 2

The method of embodiment 1 wherein the indication comprises at least one of: an (e.g., semi-static) indication of a NZP CSI-RS resource for both channel measurement and MU interference measurement, an (dynamic) indication of one or more first ports in the NZP CSI-RS resource to use for channel measurement, and an explicit or implicit (e.g., dynamic) indication of one or more second ports in the NZP CSI-RS resource to use for MU interference measurement, where the one or more first ports are different than the one or more second ports.

Embodiment 3

The method of embodiment 1 wherein the indication comprises at least one of: an (e.g., semi-static) indication of two or more NZP CSI-RS resources having different numbers of ports, an (dynamic) indication of one or more first ports to use on one of the two or more NZP CSI-RS resources for channel measurement, and an explicit or implicit (e.g., dynamic) indication of one or more second ports to use on one of the two or more NZP CSI-RS resources for MU interference measurement.

Embodiment 4

The method of embodiment 1 wherein the indication comprises at least one of: an (e.g., semi-static) indication of a set of NZP CSI-RS resources including two or more NZP CSI-RS resources, an (dynamic) indication of a first NZP CSI-RS resource from the set of NZP CSI-RS resources to use for channel measurement, and an explicit or implicit (e.g., dynamic) indication of a second NZP CSI-RS resource from the set of NZP CSI-RS resources to use for MU interference measurement.

Embodiment 5

The method of embodiment 1 wherein the indication comprises at least one of: an (e.g., semi-static) indication of two or more sets of NZP CSI-RS resources, an (dynamic) indication of a first NZP CSI-RS resource from one of the two or more sets of NZP CSI-RS resources to use for channel measurement, and an explicit or implicit (e.g., dynamic) indication of a second NZP CSI-RS resource from one of the two or more sets of NZP CSI-RS resources to use for MU interference measurement.

Embodiment 6

The method of embodiment 1 wherein the indication comprises at least one of: an (e.g., semi-static) indication of two or more first sets of NZP CSI-RS resources for channel measurement, an (e.g., semi-static) indication of two or more second sets of NZP CSI-RS resources for MU interference measurement, an (e.g., dynamic) indication of one of the two or more first sets of NZP CSI-RS resources for channel measurement, and an explicit or implicit (e.g., dynamic) indication of one of the two or more second sets of NZP CSI-RS resources for channel measurement.

Embodiment 7

The method of embodiment 6 wherein the two or more first sets of NZP CSI-RS resources each consist of a single NZP CSI-RS resource.

Embodiment 8

The method of embodiment 7 wherein the two or more second sets of NZP CSI-RS resources each consist of K NZP CSI-RS resources.

Embodiment 9

The method of any one of embodiments 6 to 8 wherein the indication of the one of the two or more first sets of NZP CSI-RS resources for channel estimation also serves as the indication of the one of the two or more second sets of NZP CSI-RS resources for interference measurement.

Embodiment 10

The method of any one of embodiments 1 to 9 further comprising reporting results of the channel measurements and the MU interference measurements to the network node.

Embodiment 11

The method of any one of embodiments 1 to 10, further comprising: providing user data; and forwarding the user data to a host computer via the transmission to the network node.

GROUP B EMBODIMENTS

Embodiment 12

A method performed by a network node for indicating a wireless device to perform channel measurements and Multiple User, MU, interference measurements, the method comprising: providing an indication to a wireless device for channel measurement and MU interference measurement.

Embodiment 13

The method of embodiment 12 wherein the indication comprises at least one of: an (e.g., semi-static) indication of a NZP CSI-RS resource for both channel measurement and MU interference measurement, an (dynamic) indication of one or more first ports to use on the NZP CSI-RS resource for channel measurement, and an explicit or implicit (e.g., dynamic) indication of one or more second ports to use on the NZP CSI-RS resource for MU interference measurement, where the one or more first ports are different than the one or more second ports.

Embodiment 14

The method of embodiment 12 wherein the indication comprises at least one of: an (e.g., semi-static) indication of two or more NZP CSI-RS resources having different numbers of ports, an (dynamic) indication of one or more first ports to use on one of the two or more NZP CSI-RS resources for channel measurement, and an explicit or implicit (e.g., dynamic) indication of one or more second ports to use on one of the two or more NZP CSI-RS resources for MU interference measurement.

Embodiment 15

The method of embodiment 12 wherein the indication comprises at least one of: an (e.g., semi-static) indication of a set of NZP CSI-RS resources including two or more NZP CSI-RS resources, an (dynamic) indication of a first NZP CSI-RS resource from the set of NZP CSI-RS resources to use for channel measurement, and an explicit or implicit (e.g., dynamic) indication of a second NZP CSI-RS resource from the set of NZP CSI-RS resources to use for MU interference measurement.

Embodiment 16

The method of embodiment 12 wherein the indication comprises at least one of: an (e.g., semi-static) indication of two or more sets of NZP CSI-RS resources, an (dynamic) indication of a first NZP CSI-RS resource from one of the two or more sets of NZP CSI-RS resources to use for channel measurement, and an explicit or implicit (e.g., dynamic) indication of a second NZP CSI-RS resource from one of the two or more sets of NZP CSI-RS resources to use for MU interference measurement.

Embodiment 17

The method of embodiment 12 wherein the indication comprises at least one of: an (e.g., semi-static) indication of two or more first sets of NZP CSI-RS resources for channel measurement, an (e.g., semi-static) indication of two or more second sets of NZP CSI-RS resources for MU interference measurement, an (e.g., dynamic) indication of one of the two or more first sets of NZP CSI-RS resources for channel measurement, and an explicit or implicit (e.g., dynamic) indication of one of the two or more second sets of NZP CSI-RS resources for channel measurement.

Embodiment 18

The method of embodiment 17 wherein the two or more first sets of NZP CSI-RS resources each consist of a single NZP CSI-RS resource.

Embodiment 19

The method of embodiment 18 wherein the two or more second sets of NZP CSI-RS resources each consist of K NZP CSI-RS resources.

Embodiment 20

The method of any one of embodiments 17 to 19 wherein the indication of the one of the two or more first sets of NZP CSI-RS resources for channel estimation also serves as the indication of the one of the two or more second sets of NZP CSI-RS resources for channel measurement.

Embodiment 21

The method of any one of embodiments 12 to 20 further comprising receiving, from the wireless device, results of the channel measurements and the MU interference measurements to the network node.

Embodiment 22

The method of any of the previous embodiments, further comprising: obtaining user data; and forwarding the user data to a host computer or the wireless device.

GROUP C EMBODIMENTS

Embodiment 23

A wireless device for performing measurements in a wireless communication system, the wireless device comprising: processing circuitry configured to perform any of the steps of any of the Group A embodiments; and power supply circuitry configured to supply power to the wireless device.

Embodiment 24

A network node for indicating to a wireless device to perform channel measurements and Multiple User, MU, interference measurements, the network node comprising: processing circuitry configured to perform any of the steps of any of the Group B embodiments; power supply circuitry configured to supply power to the wireless device.

Embodiment 25

A User Equipment, UE, for performing measurements in a wireless communication system, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 26

A communication system including a host computer comprising: processing circuitry configured to provide user data; and a communication interface configured to forward the user data to a cellular network for transmission to a User Equipment, UE, wherein the cellular network comprises a network node having a radio interface and processing circuitry, the network node's processing circuitry configured to perform any of the steps of any of the Group B embodiments.

Embodiment 27

The communication system of the previous embodiment further including the network node.

Embodiment 28

The communication system of the previous 2 embodiments, further including the UE, wherein the UE is configured to communicate with the network node.

Embodiment 29

The communication system of the previous 3 embodiments, wherein: the processing circuitry of the host computer is configured to execute a host application, thereby providing the user data; and the UE comprises processing circuitry configured to execute a client application associated with the host application.

Embodiment 30

A method implemented in a communication system including a host computer, a network node and a User Equipment, UE, the method comprising: at the host computer, providing user data; and at the host computer, initiating a transmission carrying the user data to the UE via a cellular network comprising the network node, wherein the network node performs any of the steps of any of the Group B embodiments.

Embodiment 31

The method of the previous embodiment, further comprising, at the network node, transmitting the user data.

Embodiment 32

The method of the previous 2 embodiments, wherein the user data is provided at the host computer by executing a host application, the method further comprising, at the UE, executing a client application associated with the host application.

Embodiment 33

A User Equipment, UE, configured to communicate with a network node, the UE comprising a radio interface and processing circuitry configured to performs the method of the previous 3 embodiments.

Embodiment 34

A communication system including a host computer comprising: processing circuitry configured to provide user data; and a communication interface configured to forward user data to a cellular network for transmission to a User Equipment, UE, wherein the UE comprises a radio interface and processing circuitry, the UE's components configured to perform any of the steps of any of the Group A embodiments.

Embodiment 35

The communication system of the previous embodiment, wherein the cellular network further includes a network node configured to communicate with the UE.

Embodiment 36

The communication system of the previous 2 embodiments, wherein: the processing circuitry of the host computer is configured to execute a host application, thereby providing the user data; and the UE's processing circuitry is configured to execute a client application associated with the host application.

Embodiment 37

A method implemented in a communication system including a host computer, a base station, and a User Equipment, UE, the method comprising: at the host computer, providing user data; and at the host computer, initiating a transmission carrying the user data to the UE via a cellular network comprising the network node, wherein the UE performs any of the steps of any of the Group A embodiments.

Embodiment 38

The method of the previous embodiment, further comprising at the UE, receiving the user data from the network node.

Embodiment 39

A communication system including a host computer comprising: communication interface configured to receive user data originating from a transmission from a User Equipment, UE, to a network node, wherein the UE comprises a radio interface and processing circuitry, the UE's processing circuitry configured to perform any of the steps of any of the Group A embodiments.

Embodiment 40

The communication system of the previous embodiment, further including the UE.

Embodiment 41

The communication system of the previous 2 embodiments, further including the network node, wherein the network node comprises a radio interface configured to communicate with the UE and a communication interface configured to forward to the host computer the user data carried by a transmission from the UE to the network node.

Embodiment 42

The communication system of the previous 3 embodiments, wherein: the processing circuitry of the host computer is configured to execute a host application; and the UE's processing circuitry is configured to execute a client application associated with the host application, thereby providing the user data.

Embodiment 43

The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 44

A method implemented in a communication system including a host computer, a network node, and a User Equipment, UE, the method comprising: at the host computer, receiving user data transmitted to the base station from the UE, wherein the UE performs any of the steps of any of the Group A embodiments.

Embodiment 45

The method of the previous embodiment, further comprising, at the UE, providing the user data to the base station.

Embodiment 46

The method of the previous 2 embodiments, further comprising: at the UE, executing a client application, thereby providing the user data to be transmitted; and at the host computer, executing a host application associated with the client application.

Embodiment 47

The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Embodiment 48

A communication system including a host computer comprising a communication interface configured to receive user data originating from a transmission from a User Equipment, UE, to a network node, wherein the network node comprises a radio interface and processing circuitry, the network node's processing circuitry configured to perform any of the steps of any of the Group B embodiments.

Embodiment 49

The communication system of the previous embodiment further including the network node.

Embodiment 50

The communication system of the previous 2 embodiments, further including the UE, wherein the UE is configured to communicate with the network node.

Embodiment 51

The communication system of the previous 3 embodiments, wherein: the processing circuitry of the host computer is configured to execute a host application; the UE is configured to execute a client application associated with the host application, thereby providing the user data to be received by the host computer.

Embodiment 52

A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 53

The method of the previous embodiment, further comprising at the network node, receiving the user data from the UE.

Embodiment 54

The method of the previous 2 embodiments, further comprising at the network node, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).
2G Second Generation
3G Third Generation
3GPP 3rd Generation Partnership Project
4G Fourth Generation
5G 5th Generation
AC Alternating Current
ASIC Application Specific Integrated Circuit
ATM Asynchronous Transfer Mode
BS Base Station
BSC Base Station Controller
BTS Base Transceiver Station
CD Compact Disk
CDMA Code Division Multiple Access
COTS Commercial Off-the-Shelf
CPE Customer Premise Equipment
CPU Central Processing Unit
CQI Channel Quality information
CRI Channel State Information Reference Signal Resource Index
CSI Channel State Information
CSI-RS Channel State Information Reference Signal
D2D Device-to-Device
DAS Distributed Antenna System
DC Direct Current
DCI Downlink Control Information
DFT Discrete Fourier Transform DFT-S-OFDM Discrete Fourier Transform Spread Orthogonal Frequency Division Multiplexing
DIMM Dual In-line Memory Module
DSP Digital Signal Processor
DVD Digital Video Disk
EEPROM Electrically Erasable Programmable Read-Only Medium
eMTC Enhanced Machine Type Communication
EPROM Erasable Programmable Read-Only Medium
eNB Evolved or Enhanced NodeB
E-SMLC Evolved Serving Mobile Location Center
FPGA Field Programmable Gate Array
GHz Gigahertz
GPS Global Positioning System
gNB New Radio Base Station
GSM Global System for Mobile communication
HDDS Holographic Digital Data Storage
HD-DVD High Density Digital Video Disk
IMR Interference Measurement Resource
I/O Input and Output
IoT Internet of Things
IP Internet Protocol
kHz Kilohertz
LAN Local Area Network
LEE Laptop Embedded Equipment
LME Laptop Mounted Equipment
LTE Long-Term Evolution
M2M Machine-to-Machine
MANO Management and Orchestration
MCE Multi-cell/Multicast Coordination Entity
MDT Minimization of Drive Tests
MHz Megahertz
MIMO Multiple Input Multiple Output
mm Millimeter
MME Mobility Management Entity
MSC Mobile Switching Center
MSR Multi-Standard Radio
MTC Machine Type Communication
MU Multiple User
MU-MIMO Multiple User Multiple Input Multiple Output
NB-IoT Narrowband Internet of Things
NFV Network Function Virtualization
NIC Network Interface Controller
NR New Radio
NZP Non-Zero Power
NZP-CSI on-Zero Power Channel State Information
OFDM Orthogonal Frequency Division Multiplexing
OSS Operations Support System
OTT Over-the-Top
O&M Operation and Maintenance
PDA Personal Digital Assistant
PDCCH Physical Downlink Control Channel
PDSCH Physical Downlink Shared Channel
PI Port Indication
PMI Precoder Matrix Indicator
PRB Physical Resource Block
PROM Programmable Read-Only Medium
PSTN Public Switched Telephone Network
PUSCH Physical Uplink Shared Channel
QAM Quadrature Amplitude Modulation
QPSK Quadrature Phase Shift Keying
RAID Redundant Array of Independent Disk
RAM Random Access Memory
RAN Radio Access Network
RAT Radio Access Technology
RB Resource Block
RE Resource Element
RF Radio Frequency
RI Rank Indicator
RNC Radio Network Controller
ROM Read Only Memory
RRC Radio Resource Control
RRH Remote Radio Head
RRU Remote Radio Unit
RUIM Removable User Identity Module
SC-FDMA Single Carrier Frequency Division Multiple Access
SDRAM Synchronous Dynamic Radio Access Memory
SIM Subscriber Identity Module
SINR Signal to Interference plus Noise Ratio
SOC System on a Chip
SON Self-Optimized Network
SONET Synchronous Optical Networking
SU-MIMO Single User Multiple Input Multiple Output
TCP Transmission Control Protocol
UE User Equipment
UMTS Universal Mobile Telecommunication System
USB Universal Serial Bus
UTRAN Universal Terrestrial Radio Access Network
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice-Over Internet Protocol
WAN Wide-Area Network
WCDMA Wide Code Division Multiplexing Access
WD Wireless Device
WG Working Group
WiMax Worldwide Interoperability for Microwave Access
WLAN Wide Local Area Network
ZP Zero-Power Those skilled in the art will recognize improvements and modifications to the embodiments of the present disclosure. All such improvements and modifications are considered within the scope of the concepts disclosed herein.

What is claimed is:

1. A method for a user equipment, the method comprising:
receiving, from a base station of a wireless communication system, a semi-static indication of a Channel State Information, CSI, reporting setting comprising one or more sets of aperiodic Non-Zero Power, NZP, Channel State Information Reference Signal, CSI-RS, resources for channel measurement wherein each of the one or more sets of aperiodic NZP CSI-RS resources contains a single aperiodic NZP CSI-RS resource with precoded CSI-RS port(s), and one or more sets of aperiodic NZP CSI-RS resources for interference measurement, wherein each of the one or more sets of aperiodic NZP CSI-RS resources contain one or more NZP CSI-RS resources and each CSI-RS port in the one or more sets of aperiodic NZP CSI-RS resources corresponds to a Multiple User Multiple Input Multiple Output, MU-MIMO, interference layer associated with a co-scheduled user equipment;
receiving, from the base station, a dynamic indication requesting a CSI report according to the CSI reporting setting and a first set of aperiodic NZP CSI-RS resources from the one or more sets of aperiodic NZP CSI-RS resources for channel measurement and a second set of aperiodic NZP CSI-RS resources from the one or more sets of aperiodic NZP CSI-RS resources for interference measurement; and reporting a CSI comprising a rank and a Channel Quality Indicator, CQI.

2. The method of claim 1 further comprising:
performing channel measurement on the first set of aperiodic NZP CSI-RS resources; and
performing interference measurement on the second set of aperiodic NZP CSI-RS resources.

3. The method of claim 1 wherein each aperiodic NZP CSI-RS resource consists of one or multiple CSI-RS ports.

4. The method of claim 1 wherein each aperiodic NZP CSI-RS resource consists of one, two, or four ports.

5. The method of claim 1 wherein each aperiodic NZP CSI-RS resource set in the one or more sets of aperiodic NZP CSI-RS resources for interference measurement consists of a number, K, of aperiodic NZP CSI-RS resources, wherein K is greater than or equal to 1.

6. The method of claim 1 wherein the one or more sets of aperiodic NZP CSI-RS resources for channel measurement are associated with a first resource setting and the one or more sets of aperiodic NZP CSI-RS resources for interference measurement are associated with a second resource setting, the first resource setting being different than the second resources setting.

7. The method of claim 1 wherein the dynamic indication is contained in Downlink Control Information, DCI.

8. The method of claim 1 wherein the first set of aperiodic NZP CSI-RS resource and the second set of aperiodic NZP CSI-RS resources are jointly indicated by a same Downlink Control Information, DCI, field.

9. A user equipment comprising an interface and processing circuitry whereby the user equipment is operable to:
receive, from a base station of the wireless communication system, a semi-static indication of a Channel State Information, CSI, reporting setting comprising one or more sets of aperiodic Non-Zero Power, NZP, Channel State Information Reference Signal, CSI-RS, resources for channel measurement wherein each of the one or more sets of aperiodic NZP CSI-RS resources contains a single aperiodic NZP CSI-RS resource with precoded CSI-RS port(s), and one or more sets of aperiodic NZP CSI-RS resources for interference measurement, wherein each of the one or more sets of aperiodic NZP CSI-RS resources contain one or more NZP CSI-RS resources and each CSI-RS port in the one or more NZP CSI-RS resources corresponds to a Multiple User Multiple Input Multiple Output, MU-MIMO, interference layer associated with a co-scheduled user equipment;
receive, from the base station, a dynamic indication requesting a CSI report according to the CSI reporting setting and a first set of aperiodic NZP CSI-RS resources from the one or more sets of aperiodic NZP CSI-RS resources for channel measurement and a second set of aperiodic NZP CSI-RS resources from the one or more sets of aperiodic NZP CSI-RS resources for interference measurement; and
report a CSI comprising a rank and a Channel Quality Indicator, CQI.

10. The user equipment of claim 9 wherein, via the interface and the processing circuitry, the user equipment is further operable to:
perform channel measurement on the first set of aperiodic NZP CSI-RS resources; and
perform interference measurement on the second set of aperiodic NZP CSI-RS resources.

11. The user equipment of claim 9 wherein, via the interface and the processing circuitry, the user equipment is further operable to report results of the channel measurement and the interference measurement to the base station.

12. A method performed by a base station for configuring a user equipment, the method comprising:
sending, to the user equipment, a semi-static indication of a Channel State Information, CSI, reporting setting comprising one or more sets of aperiodic Non-Zero Power, NZP, Channel State Information Reference Signal, CSI-RS, resources for channel measurement, wherein each of the one or more sets of aperiodic NZP CSI-RS resources contains a single aperiodic NZP CSI-RS resource with precoded CSI-RS port(s), and one or more sets of aperiodic NZP CSI-RS resources for interference measurement, wherein each of the one or more sets of aperiodic NZP CSI-RS resources contain one or more NZP CSI-RS resources and each CSI-RS port in the one or more NZP CSI-RS resources corresponds to a Multiple User Multiple Input Multiple Output, MU-MIMO, interference layer associated with a co-scheduled user equipment;
sending, to the user equipment, a dynamic indication requesting a CSI report according to the CSI reporting setting and a first set of aperiodic NZP CSI-RS resources from the one or more sets of aperiodic NZP CSI-RS resources for channel measurement and a second set of aperiodic NZP CSI-RS resources from the one or more sets of aperiodic NZP CSI-RS resources for interference measurement; and
receiving, from the user equipment, a CSI report comprising a rank and a Channel Quality Indicator, CQI.

13. A base station for configuring a user equipment comprising an interface and processing circuitry whereby the base station is operable to:
send, to the user equipment, a semi-static indication of a Channel State Information, CSI, reporting setting comprising one or more sets of aperiodic Non-Zero Power, NZP, Channel State Information Reference Signal, CSI-RS, resources for channel measurement, wherein each of the one or more sets of aperiodic NZP CSI-RS resources contains a single aperiodic NZP CSI-RS resource with precoded CSI-RS port(s), and one or more sets of aperiodic NZP CSI-RS resources for interference measurement, wherein each of the one or more sets of aperiodic NZP CSI-RS resources contain one or more NZP CSI-RS resources and each CSI-RS port in the one or more NZP CSI-RS resources corresponds to a Multiple User Multiple Input Multiple Output, MU-MIMO, interference layer associated with a co-scheduled user equipment;
send, to the user equipment, a dynamic indication requesting a CSI report according to the CSI reporting setting and a first set of aperiodic NZP CSI-RS resources from the one or more sets of aperiodic NZP CSI-RS resources for channel measurement and a second set of aperiodic NZP CSI-RS resources from the one or more sets of aperiodic NZP CSI-RS resources for interference measurement; and
receive, from the user equipment, a CSI report comprising a rank and a Channel Quality Indicator, CQI.

* * * * *